US00RE43505E

(19) United States
(12) Reissued Patent
Asakura et al.

(10) Patent Number: US RE43,505 E
(45) Date of Reissued Patent: Jul. 10, 2012

(54) LIQUID CRYSTAL DISPLAY DEVICE WITH PARTICULAR ON SUBSTRATE WIRING, PORTABLE TERMINAL AND DISPLAY EQUIPMENT PROVIDED WITH THE LIQUID CRYSTAL DISPLAY DEVICE

(75) Inventors: Shinji Asakura, Kirishima (JP); Toshirou Motomura, Kirishima (JP); Hiromi Fukuoka, Kirishima (JP)

(73) Assignee: Kyocera Corporation, Kyoto (JP)

(21) Appl. No.: 11/408,273

(22) Filed: Apr. 19, 2006

Related U.S. Patent Documents

Reissue of:
(64) Patent No.: 6,806,938
Issued: Oct. 19, 2004
Appl. No.: 10/165,431
Filed: Jun. 6, 2002

(30) Foreign Application Priority Data

| | | |
|---|---|---|
| Aug. 30, 2001 | (JP) | 2001-261510 |
| Sep. 27, 2001 | (JP) | 2001-298550 |
| Nov. 19, 2001 | (JP) | 2001-352822 |
| Nov. 26, 2001 | (JP) | 2001-358717 |
| Nov. 27, 2001 | (JP) | 2001-361553 |
| Dec. 12, 2001 | (JP) | 2001-378905 |

(51) Int. Cl.
*G02F 1/1345* (2006.01)
(52) U.S. Cl. ..... 349/151; 349/149
(58) Field of Classification Search ..... 349/149, 349/151, 152
See application file for complete search history.

(56) References Cited

U.S. PATENT DOCUMENTS

| | | | | |
|---|---|---|---|---|
| 5,640,216 | A | 6/1997 | Hasegawa et al. | |
| 5,689,352 | A | 11/1997 | Kishigami | |
| 5,805,249 | A | 9/1998 | Hasegawa et al. | |
| 5,815,224 | A | 9/1998 | Hasegawa et al. | |
| 5,872,610 | A | 2/1999 | Kobayashi | |
| 5,946,062 | A | 8/1999 | Hasegawa et al. | |
| 5,959,713 | A | 9/1999 | Kobayashi | |
| 6,473,147 | B1 * | 10/2002 | Nakahara et al. | 349/153 |
| 6,493,056 | B2 | 12/2002 | Bjorkengren et al. | |
| 6,515,729 | B1 | 2/2003 | Hoshino | |
| 6,646,708 | B1 | 11/2003 | Muramatsu | |
| RE38,516 | E | 5/2004 | Hasegawa et al. | |

(Continued)

FOREIGN PATENT DOCUMENTS

| | | |
|---|---|---|
| EP | 1 077 389 | 2/2001 |

(Continued)

*Primary Examiner* — Timothy L Rude
(74) *Attorney, Agent, or Firm* — DLA Piper LLP (US)

(57) ABSTRACT

A segment electrode group 10 is passed through a lower side portion of a sealing resin 7 to be connected to a connection terminal group for segment electrode 8. A connection terminal group for common electrode 6 is juxtaposed to the connection terminal group for segment electrode 8 along the lower side portion of the sealing resin 7. The connection terminal group for common electrode 6 is connected to a wiring pattern 5 through the lower side portion of the sealing resin 7. The wiring pattern 5 passes through an area between a right side portion of the sealing resin 7 and a display area 3 to be connected to a conduction portion between substrates Q1. The conduction portion between substrates Q1 contains numerous conductive particles so as to electrically connect the wiring pattern 5 and a common electrode group 4 to each other. By this arrangement, downsizing of a liquid crystal display device can be accomplished.

16 Claims, 45 Drawing Sheets

U.S. PATENT DOCUMENTS

| | | | | |
|---|---|---|---|---|
| 6,744,484 | B1 | 6/2004 | Yoshino et al. | |
| 6,806,938 | B2 * | 10/2004 | Asakura et al. | 349/151 |
| 2002/0060767 | A1 | 5/2002 | Muramatsu et al. | |
| 2002/0100974 | A1 | 8/2002 | Uchiyama | |
| 2003/0058395 | A1 | 3/2003 | Hagiwara | |

FOREIGN PATENT DOCUMENTS

| | | |
|---|---|---|
| JP | 02-287433 | 11/1970 |
| JP | 57-101883 | 6/1982 |
| JP | 60-140927 | 9/1985 |
| JP | 61-290425 | 12/1986 |
| JP | 63-029729 | 2/1988 |
| JP | 02-287433 | 11/1990 |
| JP | 03-209426 | 9/1991 |
| JP | 03-239225 | 10/1991 |
| JP | 05-165060 | 6/1993 |
| JP | 07-134300 | 5/1995 |
| JP | 08-179348 | 7/1996 |
| JP | 09-179116 | 7/1997 |
| JP | 09-329799 | 12/1997 |
| JP | 10-048646 | 2/1998 |
| JP | 10-161079 | 6/1998 |
| JP | 10-339866 | 12/1998 |
| JP | 11-153806 | 6/1999 |
| JP | 11-183924 | 7/1999 |
| JP | 11-288001 | 10/1999 |
| JP | 11-305248 | 11/1999 |
| JP | 11-337953 | 12/1999 |
| JP | 2000-221534 | 8/2000 |
| JP | 2000-275672 | 10/2000 |
| JP | 2001-051259 | 2/2001 |
| JP | 2001-083475 | 3/2001 |
| JP | 2001-154208 | 6/2001 |
| JP | 2001-174842 | 6/2001 |
| JP | 2002-082351 | 3/2002 |
| JP | 2002-258308 | 9/2002 |
| JP | 2003-057680 | 2/2003 |
| JP | 2003-084292 | 3/2003 |
| JP | 2003-098511 | 4/2003 |
| KR | 1995-0033579 | 12/1995 |
| WO | 98/48321 | 10/1998 |
| WO | 99/35532 | 7/1999 |

* cited by examiner

LIQUID CRYSTAL DISPLAY DEVICE WITH PARTICULAR ON SUBSTRATE WIRING, PORTABLE TERMINAL AND DISPLAY EQUIPMENT PROVIDED WITH THE LIQUID CRYSTAL DISPLAY DEVICE

Matter enclosed in heavy brackets [ ] appears in the original patent but forms no part of this reissue specification; matter printed in italics indicates the additions made by reissue.

This application is based on applications Nos. 2001-261510, 2001-298550, 2001-352822, 2001-358717, 2001-361553, and 2001-378905 filed in Japan, the content of which is incorporated hereinto by reference.

BACKGROUND OF THE INVENTION

Field of the Invention

The present invention relates to a small size liquid crystal display device, a portable terminal and display equipment provided with such a liquid crystal display device.

Description of the Related Art

Conventional STN type liquid crystal displays P1 and P2 are now discussed referring to FIGS. 47-52.

FIG. 47A is a plan view of the liquid crystal display P1. FIG. 47B is a right-side view of the same, and FIG. 47C is an upper-side view of the same. The liquid crystal display P1 is arranged such that two rectangularly shaped glass substrates are joined together. There are provided two driver ICs (not shown) one of which is for segment electrodes, and the other is for common electrodes. The driver ICs are disposed along two sides of the glass substrate 1 external to the respective sides. When mounting the driver ICs on the body substrate, TCP (Tape Carrier Package) or COF (Chip on Film) is used. (Refer to Japanese Unexamined Patent Publication H08-179348.)

On the glass substrate 2, a group of transparent common electrodes 4 and a wiring pattern 5 with a trapezoidal shape which extends from the transparent common electrode group 4 are provided. On the other glass substrate 1, there are provided a group of transparent segment electrodes 10, and a wiring pattern 9 with a trapezoidal shape which extends from the transparent segment electrode group 10. The area where the transparent common electrode group 4 and the transparent segment electrode group 10 cross each other form a display area 3.

On edges of two sides of the glass substrate 1, there are provided common-side terminal group 6 connected with the wiring pattern 5, and segment-side terminal group 8 connected with the wiring pattern 9. TCPs or COFs are mounted on the common-side terminal group 6 and segment-side terminal group 8 by thermal pressure using an anisotropic conductive film.

A sealing resin 7 is provided external to the display area 3 so as to surround the display area 3. The glass substrates 1 and 2 are bonded together with the sealing resin 7, and the internal space between them is filled with a liquid crystal 12 by injecting it through an injection inlet 13. Then, it is sealed with a UV curable resin 11.

When the number of pixels is represented by m×n, since one pixel is constituted of three kinds of colors i.e. R (red), G (green) and B (blue) in the colorized liquid crystal display device P, the number of transparent segment electrodes 10 to be provided is 3m. The numbers of wires in the wiring patterns 9 and segment-side terminals 8 are also 3m. The numbers of transparent common electrodes 4, wires in the wiring pattern 5 and common-side terminals 6 are n, respectively. These are shown with a part thereof omitted in the drawings.

FIG. 48 is a cross-sectional view taken along the line a-a in FIG. 47A.

The sealing resin 7 contains conductive particles 14. The common-side terminal group 6 and the wiring pattern 5 are connected vertically by the conductive particles 14. The portions connecting them vertically are referred to as "conduction portions between substrates."

On the transparent common electrode group 4, an alignment film 23 for aligning the liquid crystal 12 is formed. Also, an alignment film 24 is formed on the transparent segment electrode group 10. Between the alignment films 23 and 24, spacers 45 are dispersed in order to keep the gap S between the substrates at a constant distance.

In the above-mentioned liquid crystal display device P1, however, the arrangement is such that two driver ICs one of which is for segment electrodes and the other for common electrodes are mounted along and external to two sides of the assembly of two rectangularly shaped glass substrates bonded together. Accordingly, two driver ICs are required in this structure.

Accordingly, it has been desired to integrate the functions of both of the driver ICs into one driver IC thereby reducing the IC cost and the mounting cost.

A liquid crystal display device P2 provided with one driver IC prepared in the above-mentioned way is now described.

FIG. 49A is a plan view of the liquid crystal display device P2. FIG. 49B is a right-side view of the same, and FIG. 49C is an upper-side view of the same. FIG. 50 is an enlarged view of an essential part B shown in FIG. 49A. FIG. 51 is a cross-sectional view taken along the line c-c in FIG. 50. FIG. 52 is a cross-sectional view taken along the line d-d in FIG. 50. In these drawings, parts corresponding to those in the liquid crystal display device P1 described above are denoted by the same reference characters.

As shown in FIG. 49A, the display area 3 is divided into the upper area and the lower area. The transparent common electrode group 4 in the upper area is drawn to the right side, and the transparent common electrode group 4 in the lower area is drawn to the left side. They are connected to the wiring patterns 5A and 5B, respectively, on the glass substrate 2. These wiring patterns 5A and 5B are extended to the conduction portions between substrates Q21 and Q22, respectively.

The conduction portions between substrates Q21 and Q22 are provided for electrically connecting the wiring patterns 5A, 5B on the glass substrate 2 to the wiring pattern 20 on the glass substrate 1. In this example, the sealing resin 7 containing conductive particles 14 is used for these portions as shown in FIG. 51.

The wiring pattern 20 is a pattern made of ITO, which spreads in the form of a trapezoid. The wiring pattern 20 is connected to the common-side terminal group 6 disposed on the both sides of the segment-side terminal group 8. In the conduction portions between substrates Q21 and Q22, in order to stably connect the upper and lower electrodes to each other with low resistance to conduction by bringing them into contact with many conductive particles 14, the wiring width D of the wiring patterns 5 and 20 needs to be as large as possible. In addition, in order to prevent the conductive particles 14 from causing short-circuit among adjacent wires, a spacing S larger than a specific distance is required between each of the wires (See FIG. 52).

Accordingly, under the present circumstances, wiring pitch P (P=wiring width D+wiring spacing S) in the conduction portions between substrates Q21 and Q22 is made larger than the wiring pitch (in the order of 60 μm) of the common-side terminal group 6.

It is therefore necessary to provide an area (represented by the size L in FIG. 49A) for routing the wiring pattern 20 spreading from the common-side terminal group 6 in the form of a sector.

This makes the longitudinal size of the panel large, failing to meet the recent market demand for downsizing. For example, such a panel is inconvenient to be used as LCD panel for mobile phone in which the panel dimensions are restricted.

In addition, regarding small size liquid crystal display devices for mobile phones, it is often the case that wiring patterns 5 and 9 are viewable from the display surface due to its small area. When the wiring patterns 5 and 9 are formed of a metal material, light reflected from the patterns deteriorates the visibility. Improvement in this respect is also anticipated.

It is an object of this invention to provide a liquid crystal display device capable of accomplishing downsizing thereof by reduced dimensions.

It is another object of this invention to provide a liquid crystal display device which is suitable for a portable terminal such as mobile phone.

It is still another object of this invention to provide display equipment in which downsizing thereof is accomplished.

It is still another object of this invention to provide a liquid crystal display device with good visibility.

BRIEF SUMMARY OF THE INVENTION

In a liquid crystal display device according to this invention, there are provided connection terminals for segment electrodes and connection terminals for common electrodes formed on a first substrate and external to one side portion of a seal member. On the first substrate, a wiring pattern which extends from the connection terminals for common electrodes and passes through an area between another side portion of the seal member and a display area is formed. A conduction portion between substrates for electrically and vertically connecting the wiring pattern and the common electrode group to each other is provided within another side portion of the seal member or between another side portion of the seal member and the display area.

By this arrangement, a small size liquid crystal display device can be provided.

In addition, according to this invention, a light-shielding film is formed on the second substrate such that it is opposed to the wiring pattern. Accordingly, the display area is clearly and sharply viewed with improved visibility. This effect is particularly remarkable in downsized liquid crystal display devices.

Moreover, according to the present invention, the segment electrode group and the wiring pattern are both formed by using a metal film so that they can be formed simultaneously. The manufacturing cost is therefore reduced so that a low cost liquid crystal display device can be provided.

In the liquid crystal display device according to this invention, a wiring pattern formed on the first substrate and a wiring pattern formed on the second substrate are arranged such that they overlap each other. By this arrangement, the liquid crystal display device can be downsized as a whole without reducing the display area.

In the liquid crystal display device according to this invention, a dummy pattern is formed on the second substrate such that it is disposed in a region opposite to the wiring pattern and between the seal member and the display area or within the seal member. A homogeneous liquid crystal display can therefore be obtained, and a further downsized liquid crystal display device can be provided without display unevenness.

Also, a dummy pattern is formed on the first substrate such that it is disposed in a region between the seal member and the display area or within the seal member where the wiring pattern is not formed, and also on the second substrate such that it is opposed to the aforementioned region. Therefore, a further downsized liquid crystal display device without display unevenness can be provided.

In addition, according to this invention, an end of either or both of the common electrode group and the wiring pattern are disposed within another side portion of the seal member. Accordingly, even if there is static electricity near the peripheral of the liquid crystal display device, the static electricity is prevented from getting into the common electrode group and wiring pattern. The driver IC is therefore prevented from damage. Accordingly, it is possible to provide a liquid crystal display device with high reliability and high quality.

In the liquid crystal display device according to this invention, a dummy pattern for display frame is formed. By this arrangement, the device is downsized as well as coloration and texture between the display area and display window frame is made homogeneous, thereby providing a high quality liquid crystal display device having a display frame with an excellent appearance.

In the liquid crystal display device according to this invention, the seal member contains numerous conductive particles and an insulating film provided over the segment electrode group is extended to one side portion of the seal member. By this arrangement, it is possible to provide a liquid crystal display device with high reliability in which downsizing is accomplished and short-circuit does not occur among the wires.

When the arrangement is such that wires extending from the wiring pattern or the segment electrode group are passed through one side portion of the seal member and arranged in an array of oblique lines, the intervals among the wires are narrow. Accordingly, it is further effective in preventing short-circuit among the wires to extend the insulating film to one side portion of the seal member.

When the arrangement is such that the insulating film is extended also to another side portion of the seal member, unevenness in thickness becomes small or nil over the whole seal member. Accordingly, the liquid crystal is given a uniform thickness in its layer, resulting in a homogeneous display appearance over the whole display area.

In the liquid crystal display device according to this invention, the segment electrode group comprises a wiring pattern that is formed of a layer in which a transparent conductive film and a metal film are laminated together.

By controlling the ratio between the area of the transparent conductive film and the area of the metal film in the wiring pattern, it is possible to provide a high performance and high quality liquid crystal display device.

Moreover, according to the present invention, the segment electrode group and the wiring pattern are both formed by using a metal film. Both of them can thus be formed simultaneously, reducing the manufacturing cost and providing a liquid crystal display device at a low cost.

Furthermore, according to this invention, by providing a portable terminal or display equipment with the liquid crystal display device of this invention, a downsized portable terminal or display equipment can be realized.

Now, the structural details of this invention are described referring to the accompanying drawings.

BRIEF DESCRIPTION OF THE DRAWINGS

FIG. 9A shows a case where the Al film of the wiring pattern is thick, and FIG. 9A shows a case where the Al film of the wiring pattern 5 is thin.

DETAILED DESCRIPTION OF THE INVENTION

First Embodiment (Conduction Between Substrates)

A STN passive matrix type liquid crystal display device for color display wherein one pixel is constituted of R (red), G (green) and B (blue) is described as an example.

Figure 1C:
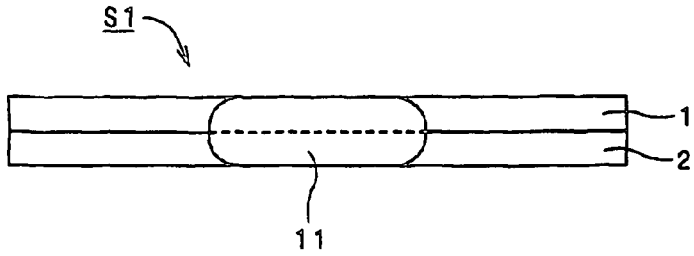
FIG. 1C is an upper-side view of the same.
Figure 1A:
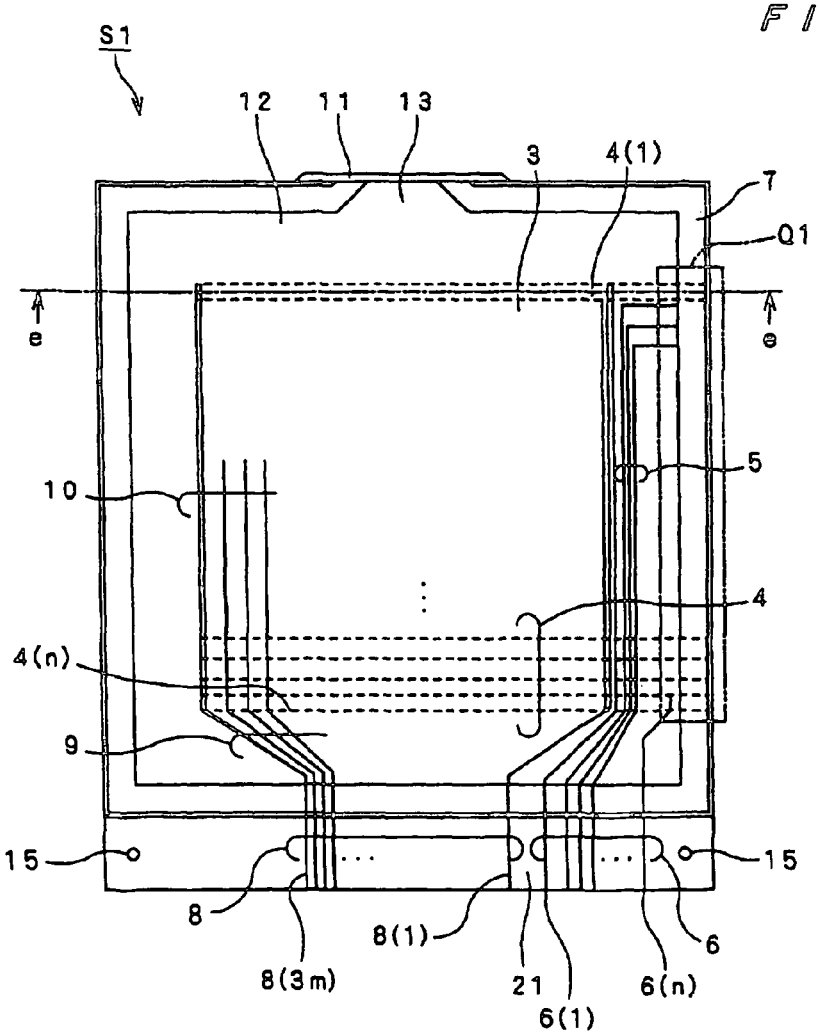
FIG. 1A is a plan view of a liquid crystal display device S1 according to this invention.
Figure 1B:
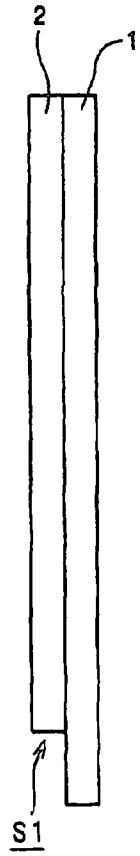
FIG. 1B is a right-side view of the same.
Figure 2:
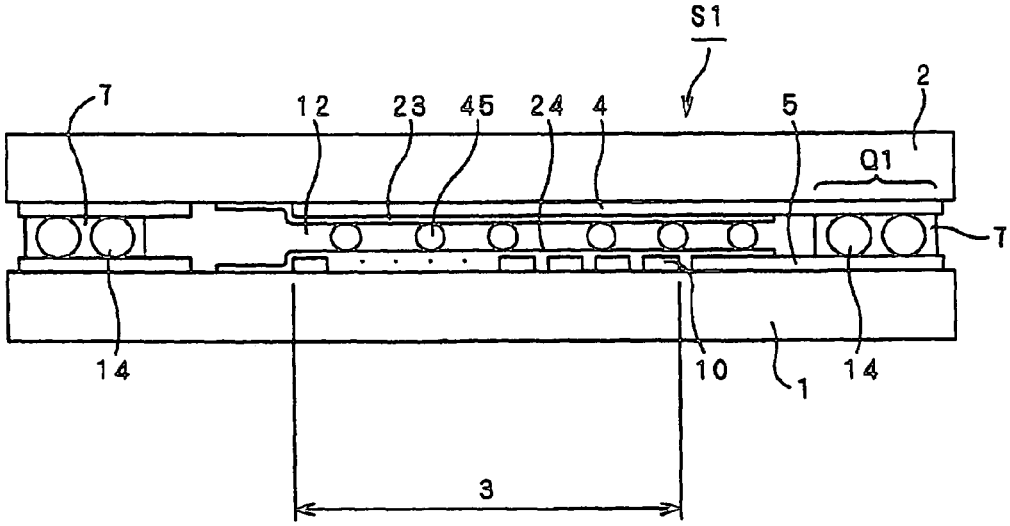
FIG. 2 shows a cross section taken along the line e-e in FIG. 1.

FIG. 1A is a plan view of a liquid crystal display device S1 according to this invention, FIG. 1B is a right-side view of the same, and FIG. 1C is an upper-side view of the same. FIG. 2 shows a cross section taken along the line e-e in FIG. 1. Parts corresponding to those in the above liquid crystal display devices P1 and P2 are denoted by the same reference characters.

This liquid crystal display device S1 has a structure in which the lower glass substrate 1 and the upper glass substrate 2 are joined together.

On the internal surface of the glass substrate 2, the transparent common electrode group 4 made of ITO is horizontally formed, on which the alignment film 23 for aligning the liquid crystal 12 is formed. On the internal surface of the glass substrate 1, the transparent segment electrode group 10 is vertically formed, and the alignment film 24 is formed thereon. Between the alignment films 23 and 24, spacers 45 for keeping the gap between the substrates at a constant distance are disposed in a dispersed manner.

In a colorized liquid crystal display device, one pixel is constituted of three kinds of colors, which are R (red), G (green) and B (blue). Accordingly, when the number of pixels is represented by m×n, the number of the transparent segment electrodes 10 needs to be 3m.

Meanwhile, when a monochrome display is produced, R, G and B are unnecessary. The number of the transparent segment electrodes 10 is therefore m.

There are 3m transparent segment electrodes 10, and n transparent common electrodes 4 in the liquid crystal display device S1. The n transparent common electrodes 4 are referred to by ordinal numbers in descending order, from the 1st to the nth. The 3m transparent segment electrodes 10 are referred to by ordinal numbers in right-to-left order, from the 1st to the 3mth.

The area where the transparent common electrode group 4 and transparent segment electrode group 10 cross each other forms a display area 3.

Further outside the display area 3, the sealing resin 7 containing conductive particles 14, is provided so as to surround the display area 3. The glass substrates 1 and 2 are bonded together with the sealing resin 7, and the internal space between them is filled with the liquid crystal 12 by injecting it through an injection inlet 13. Then, it is sealed with the resin 11.

As shown in FIG. 1A, the common-side terminal group 6 and segment-side terminal group 8 made of ITO or the like are juxtaposed to each other in a lower area of the glass substrate 1 and external to the lower side of the sealing resin 7. These common-side terminal group 6 and segment-side terminal group 10 are connected to TCP or COF by using an anisotropic conductive film or the like. The parts denoted by the numeral 15 are markers for positioning by which TCP or COF is positioned when attached onto the substrate.

When the segment-side terminal group 8 and common-side terminal group 6 are disposed closely to each other, it is feared that during a test, short-circuit may occur caused by the conductive rubber in contact with the segment-side terminal group 8 coming in touch with the conductive rubber in contact with the common-side terminal group 6. In order to eliminate such inconvenience, spacing 21 with a certain degree of width is provided between the common-side terminal group 6 and segment-side terminal group 8.

The segment-side terminal group 8 is connected to the transparent segment electrode group 10 through the wiring pattern 9 which is made of ITO and spreads in the form of a sector. The right most terminal of the segment-side terminals 8 is the first terminal, and other terminals are counted in sequence from right to left. Thus, the left most terminal is the 3mth.

On the other hand, the common-side terminal group 6 is extended upward as shown in FIG. 1A and connected to the wiring pattern 5 made of ITO. The wiring pattern 5 routed in such a manner is arranged such that it is bent toward the above-mentioned right side sealing resin 7 on the glass substrate 1.

This bent wiring pattern 5 is extended to a conduction portion between substrates Q1. The conduction portion between substrates Q1 functions to electrically connect the wires on the glass substrate 1 and those on the glass substrate 2 to each other. In this example, the sealing resin 7 containing conductive particles 14 as shown in 2, is used for this portion.

By providing the conduction portion between substrates Q1 having such a structure, the wiring pattern that extends rightward from the transparent common electrode group 4 on the upper glass substrate 2 is electrically connected through conductive particles 14 to the wiring pattern 5 on the lower glass substrate 1.

Accordingly, each of the transparent electrodes 4 on the glass substrate 2 is connected to each of the common-side terminals 6. In the common-side terminals 6, the left most terminal is the 1st, and other terminals are counted in sequence from left to right. Thus, the right most terminal is the nth.

Figure 49C:
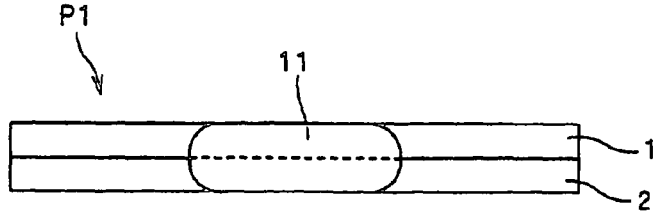
FIG. 49C is an upper-side view of the same.
Figure 49A:
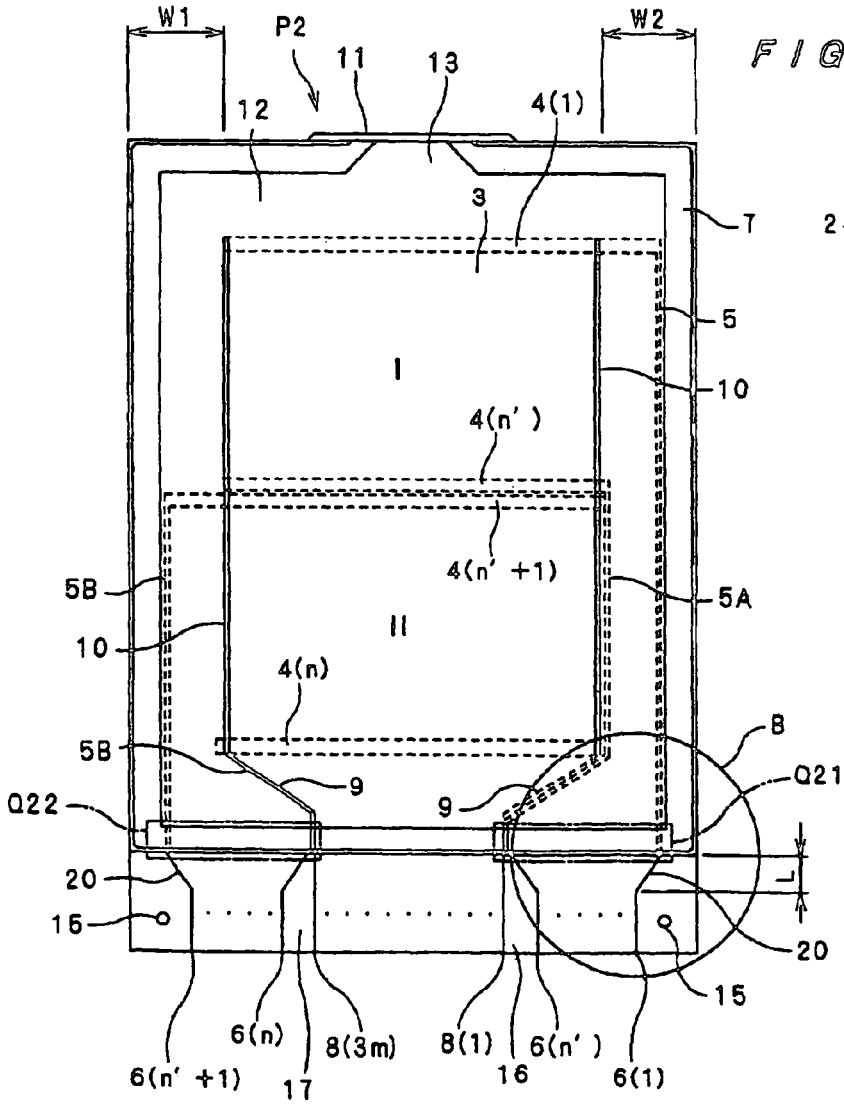
FIG. 49A is a plan view of a conventional liquid crystal display device P2.
Figure 49B:
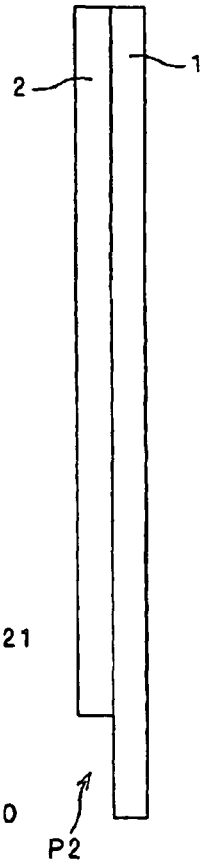
FIG. 49B is a right-side view of the same.
Figure 50:
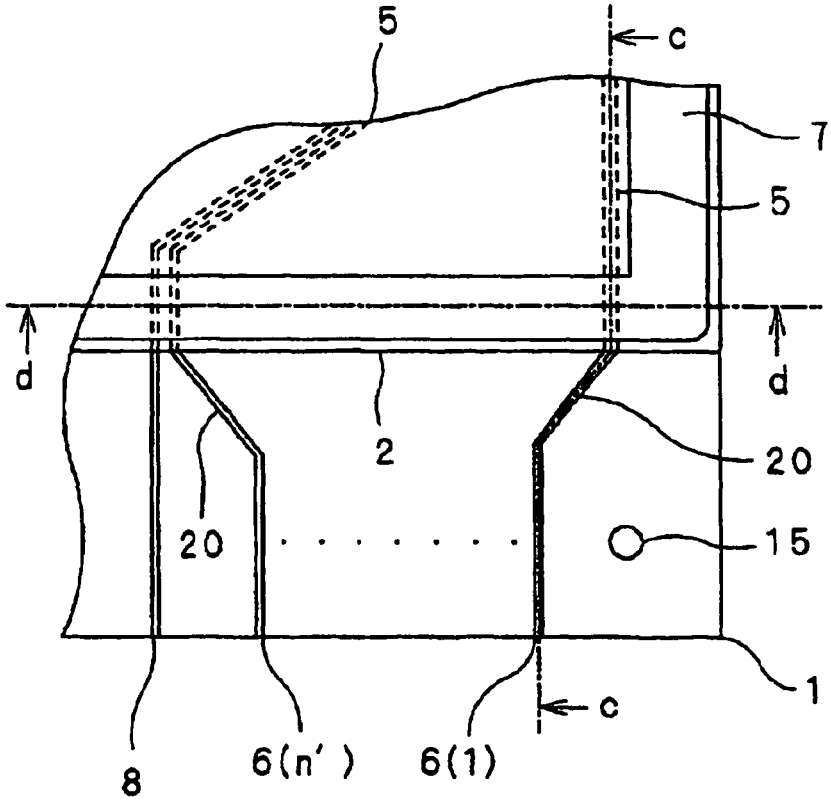
FIG. 50 is an enlarged view of the essential part B in FIG. 49A.
Figure 51:
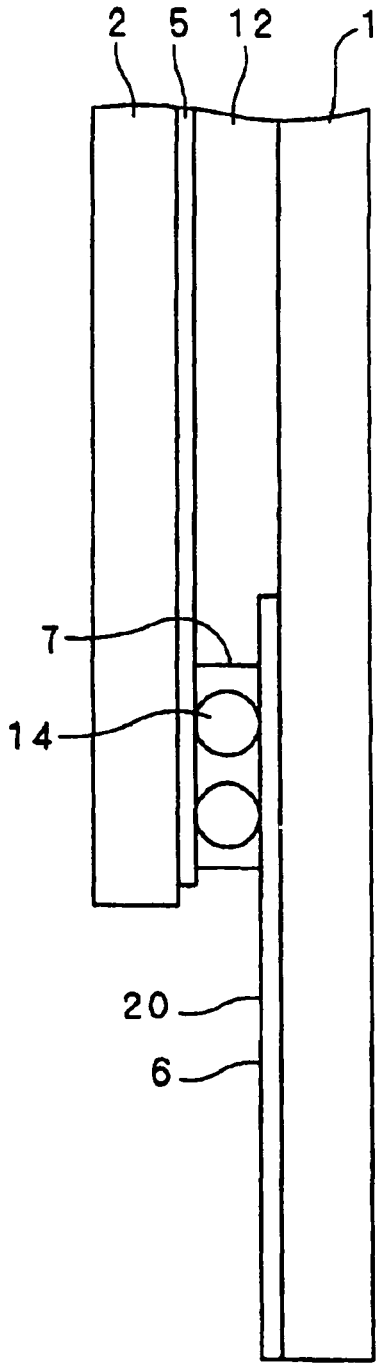
FIG. 51 is a cross-sectional view taken along the line c-c in FIG. 50.
Figure 52:
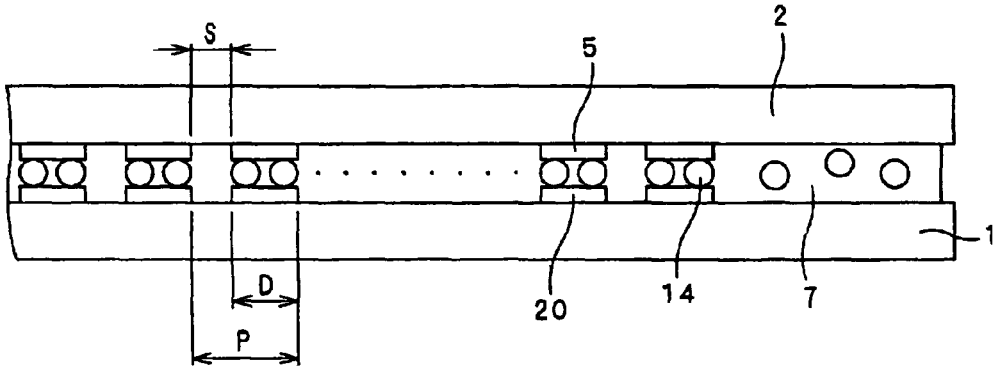
FIG. 52 is a cross-sectional view taken along the line d-d in FIG. 50.

In such a manner, in the liquid crystal display device S1 according to this embodiment, the wiring pattern that has been conventionally necessary, which is the wiring pattern 20 spreading in the form of a sector in FIG. 49, is not provided. The space for the wiring pattern is therefore unnecessary, by which downsizing can be accomplished.

Second Embodiment (Conduction Between Substrates)

Figure 3C:
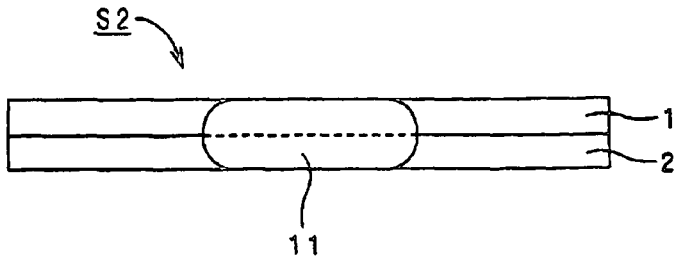
FIG. 3C is an upper-side view of the same.
Figure 3A:
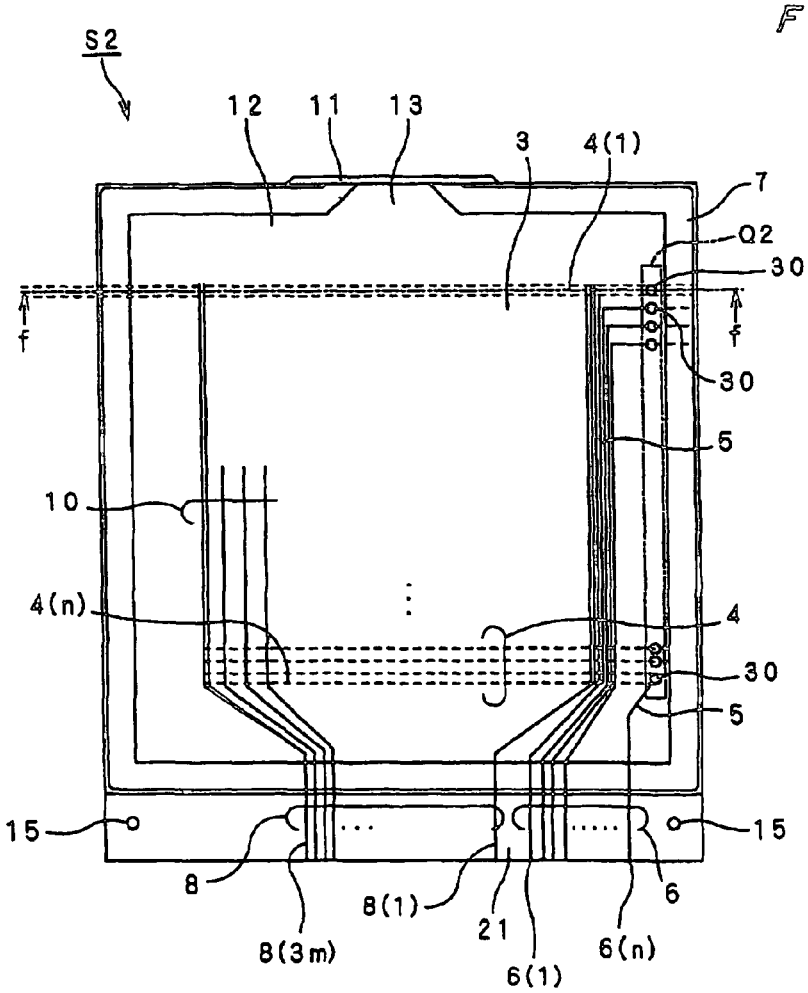
FIG. 3A is a plan view of a liquid crystal display device S2.
Figure 3B:
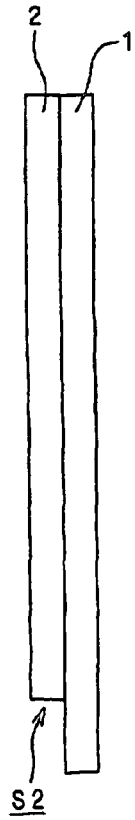
FIG. 3B is a right-side view of the same.
Figure 4:
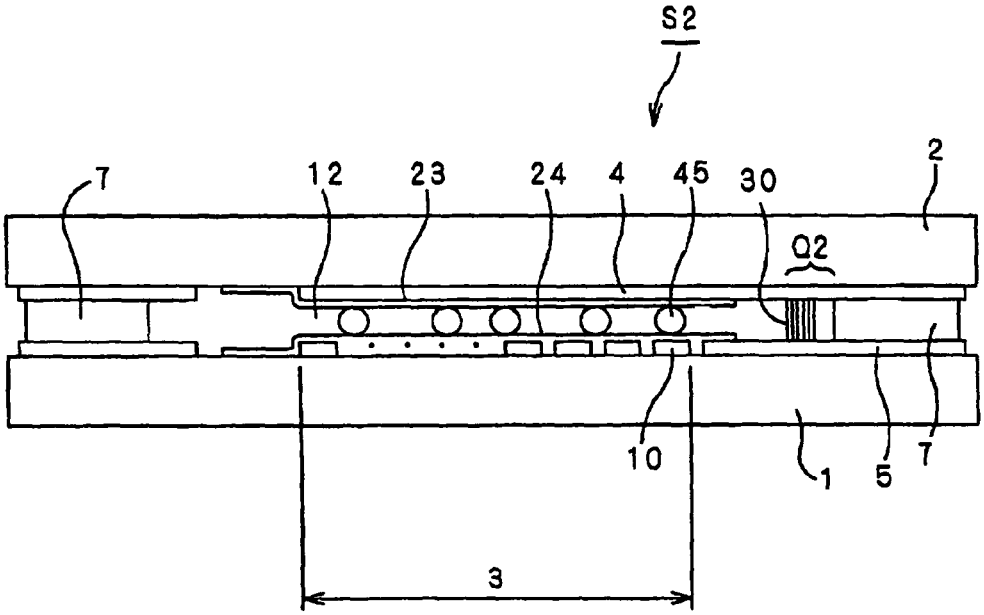
FIG. 4 is a cross-sectional view taken along the line f-f in FIG. 3A.

FIG. 3A is a plan view of a liquid crystal display device S2. FIG. 3B is a right-side view of the same, and FIG. 3C is an upper-side view of the same. FIG. 4 is a cross-sectional view taken along the line f-f in FIG. 3A. Parts corresponding to those of the aforementioned liquid crystal display device S1 are denoted by the same reference characters.

Instead of the sealing resin 7 containing conductive particles 14 used for the conduction portion between the substrates Q1 in the liquid crystal display device S1, in the liquid crystal display device S2, a conduction portion between the substrates Q2 formed by using a conductor 30 such as silver paste is disposed along one side of the sealing resin 7 and between the display area 3 and the sealing resin 7. The parts other than this are arranged in the same manner as in the liquid crystal display device S1 above.

Accordingly, also in this liquid crystal display device S2, the conventionally used wiring pattern, which is the wiring pattern 20 spreading in the form of a sector in FIG. 49, is not provided. The space for the wiring pattern is therefore unnecessary, by which downsizing can be accomplished.

Third Embodiment (Conduction Between Substrates)

Figure 5C:
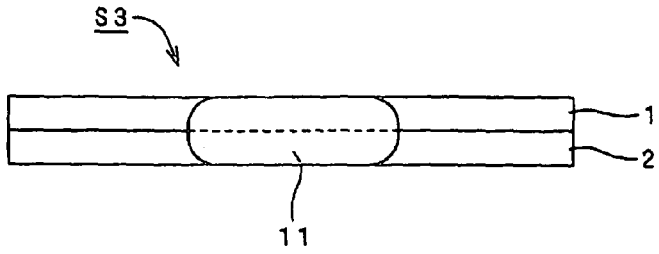
FIG. 5C is an upper-side view of the same.
Figure 5A:
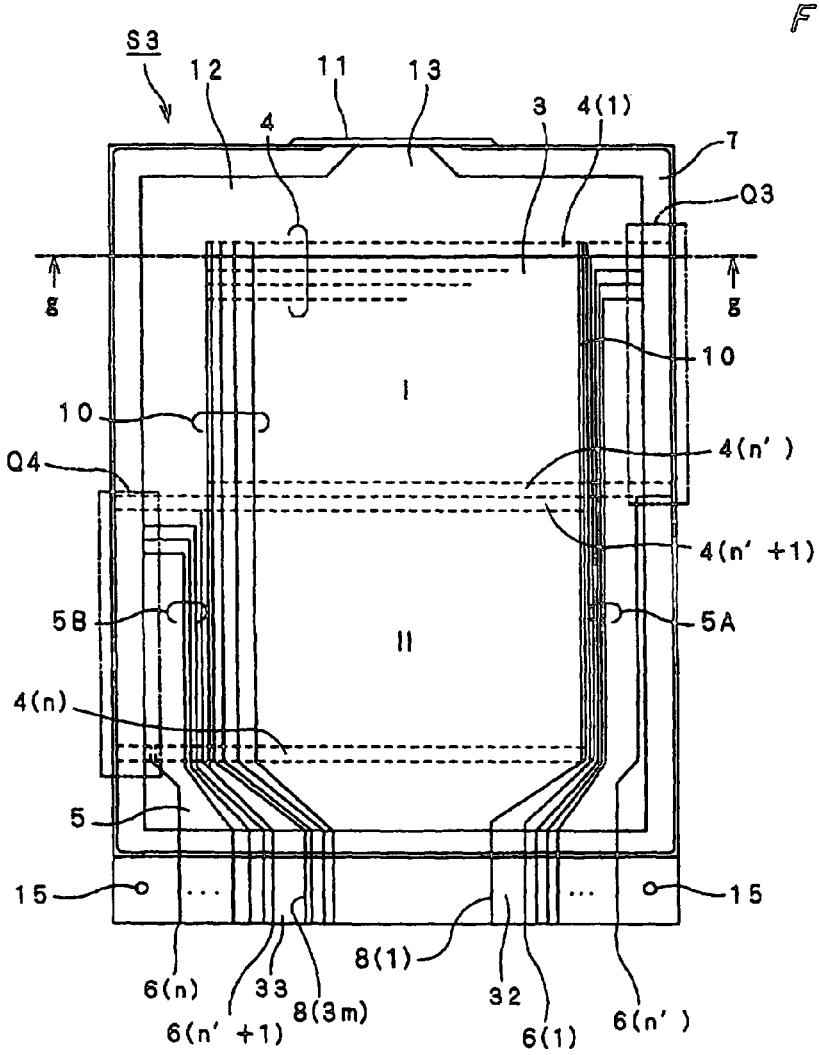
FIG. 5A is a plan view of a liquid crystal display device S3.
Figure 5B:
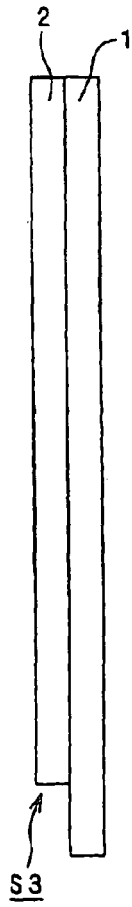
FIG. 5B is a right-side view of the same.

FIG. 5A is a plan view of a liquid crystal display device S3. FIG. 5B is a right-side view of the same, and FIG. 5C is an upper-side view of the same. In these drawings, parts corresponding to those of the aforementioned liquid crystal display device S1 are denoted by the same reference characters.

In this embodiment, the display area 3 is vertically divided into block I and block II. Transparent common electrodes 4(1)–4(n') in block I area are drawn to the right side, and transparent common electrodes 4(n'+1)–4(n) in block II area are drawn to the left side, which are extended to conduction portions between the substrates Q3 and Q4, respectively. Here, there is assumed the relationship 1<n'<n. The n' maybe, for instance, n/2.

These conduction portions between substrates Q3 and Q4 are intended to electrically connect the wires between the glass substrate 1 and the glass substrate 2, and the sealing resin 7 containing conductive particles 14 is employed also in this embodiment as in the liquid crystal display device S1 (FIG. 2). The conduction portions between substrates Q3 and Q4 are connected to wiring patterns 5A and 5B, respectively, on the glass substrate 1. The wiring pattern 5A is extended to the lower side of the sealing resin 7, where it is connected with common-side terminals 6(1)–6(n'). The wiring pattern 5B is extended to the lower side of the sealing resin 7, where it is connected with common-side terminals 6(n'+1)–6(n).

The part denoted by the numeral 32 is a space between segment-side terminal group 8(1)–8(3m) and common-side terminal group 6(1)–6(n'). A space between segment-side terminal group 8(1)–8(3m) and common-side terminal group 6(n'+1)–6(n) is denoted by 33.

In the manner as described above, the conduction portions between substrates Q3 and Q4 and the wiring patterns 5A and 5B are formed on both sides of the display area. Further downsizing can therefore be accomplished.

This liquid crystal display device S3 is compared in size with the liquid crystal display device P2 in FIG. 49. Both of the devices set the values as follows:

Pixel Pitch: Horizontal 0.08 mm×3 (R,G,B), Vertical 0.24 mm

Number of Pixels: 120×160

Wiring pitch of segment-side terminal group 8: 0.06 mm

Wiring Pitch of common-side terminal group 6: 0.06 mm

The glass substrate 1 of the conventional liquid crystal display device P2 was 40 mm×48 mm in size. In comparison, the size of the glass substrate 1 of the liquid crystal display device S3 of this embodiment was as small as 40 mm×45-46 mm.

Forth Embodiment (Conduction Between Substrates)

Figure 6C:
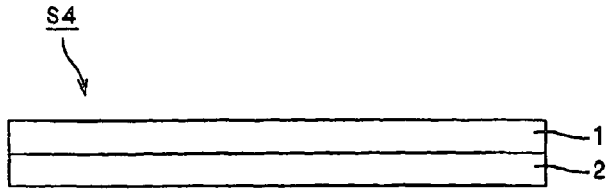
FIG. 6C is an upper-side view of the same.
Figure 6A:
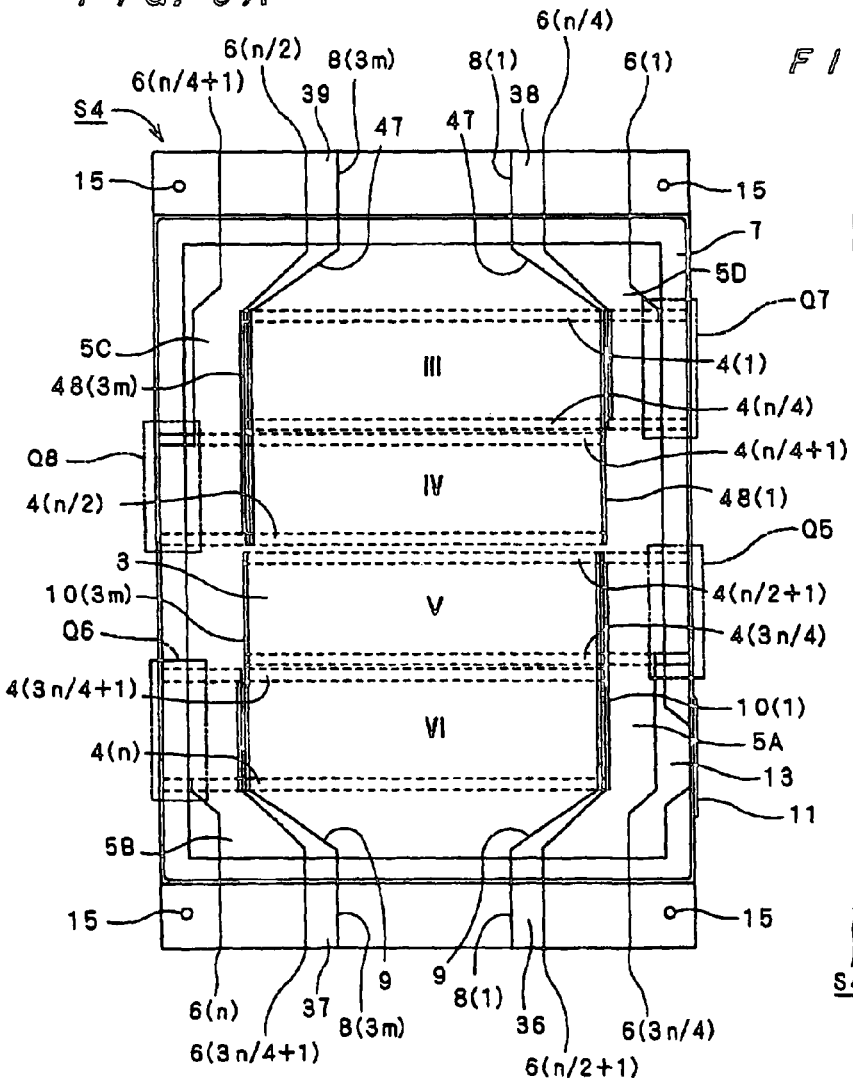
FIG. 6A is a plan view of a liquid crystal display device S4.
Figure 6B:
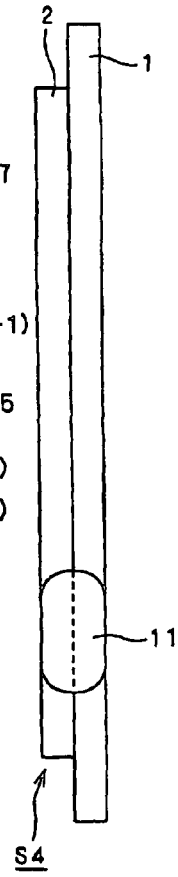
FIG. 6B is a right-side view of the same.

FIG. 6A is a plan view of a liquid crystal display device S4. FIG. 6B is a right-side view of the same, and FIG. 6C is an upper-side view of the same. In these drawings, parts corresponding to those of the aforementioned liquid crystal display device S1 are denoted by the same reference characters.

In the previous third embodiment, the liquid crystal display device S3, the display area 3 was vertically divided into two areas, in which the transparent common electrodes 4(1)–4(n') and 4(n'+1)–4(n) in both areas were connected on the glass substrate 1 to the common-side terminal groups 6(1)–6(n') and 6(n'+1)–6(n) that were disposed on both sides of the segment-side terminal group 8. In the liquid crystal display device S4 in this embodiment, two such structures are combined together.

Namely, transparent common electrode group 4 is divided into four blocks, which are block III, block IV, block V, and block VI. Blocks III and IV constitute one liquid crystal display device S3 mentioned above, and blocks V and VI constitute another liquid crystal display device S3.

To explain more specifically referring to FIG. 6A, for block V, common connection terminal group 6(n/2+1)–6(3n/4) on the lower right side is connected to transparent common electrode group 4(n/2+1)–4(3n/4). For block VI, common connection terminal group 6(3n/4+1)–6(n) on the lower left side is connected to transparent common electrode group 4(3n/4+1)–4(n).

For block III, common connection terminal group 6(1)–6(n/4) on the upper right side is connected to transparent common electrode group 4(1)–4(n/4). For block IV, common connection terminal group 6(n/4+1)–6(n/2) on the upper left side is connected to transparent common electrode group 4(n/4+1)–4(n/2).

Segment-side terminal group 8(1)–8(3m) on the lower side of blocks V, VI is connected to transparent segment electrode group 10(1)–10(3m) through the wiring pattern 9 that is made of ITO and spreads in the form of a sector. Segment-side terminal group 8(1)–8(3m) on the upper side of blocks III, IV is connected to transparent segment 645 electrode group 48(1)–48(3m) through the wiring pattern 47 that is made of ITO and spreads in the form of a sector. Meanwhile, the transparent segment electrode groups 10 and 48 are not connected to each other at the center of the display area 3.

To explain taking block IV as an example, wires from the common-side terminal group 6(n/4+1)–6(n/2) on the upper left side are connected to the wiring pattern 5C that has been formed on the upper left side of the glass substrate 1 as shown in FIG. 6A. The wiring patter 5C is routed vertically downward, and then bent horizontally to the left toward sealing resin 7 formed on the left side of the glass substrate 1.

In the conduction portion between substrates Q8 formed in the vicinity of the left sides of the glass substrates 1 and 2, the wiring pattern 5C and wires extending to the left from the transparent common electrode group 4(n/4+1)–4(n/2) in block IV on the glass substrate 2 are electrically connected to each other through the sealing resin 7 containing conductive particles 14.

Therefore, also in the liquid crystal display device S4 of this embodiment, the conventional sector-shaped wiring pattern, which is the wiring pattern 20 spreading in the form of a sector in FIG. 49, is not provided. The space for the wiring pattern is therefore unnecessary, by which downsizing can be accomplished.

Fifth Embodiment (Conduction Between Substrates)

Figure 7C:
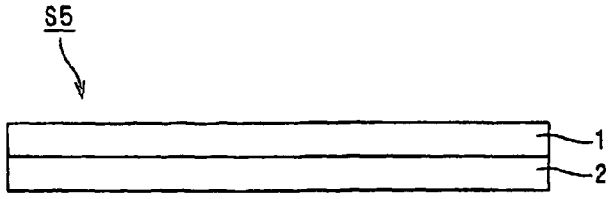
FIG. 7C is an upper-side view of the same.
Figure 7A:
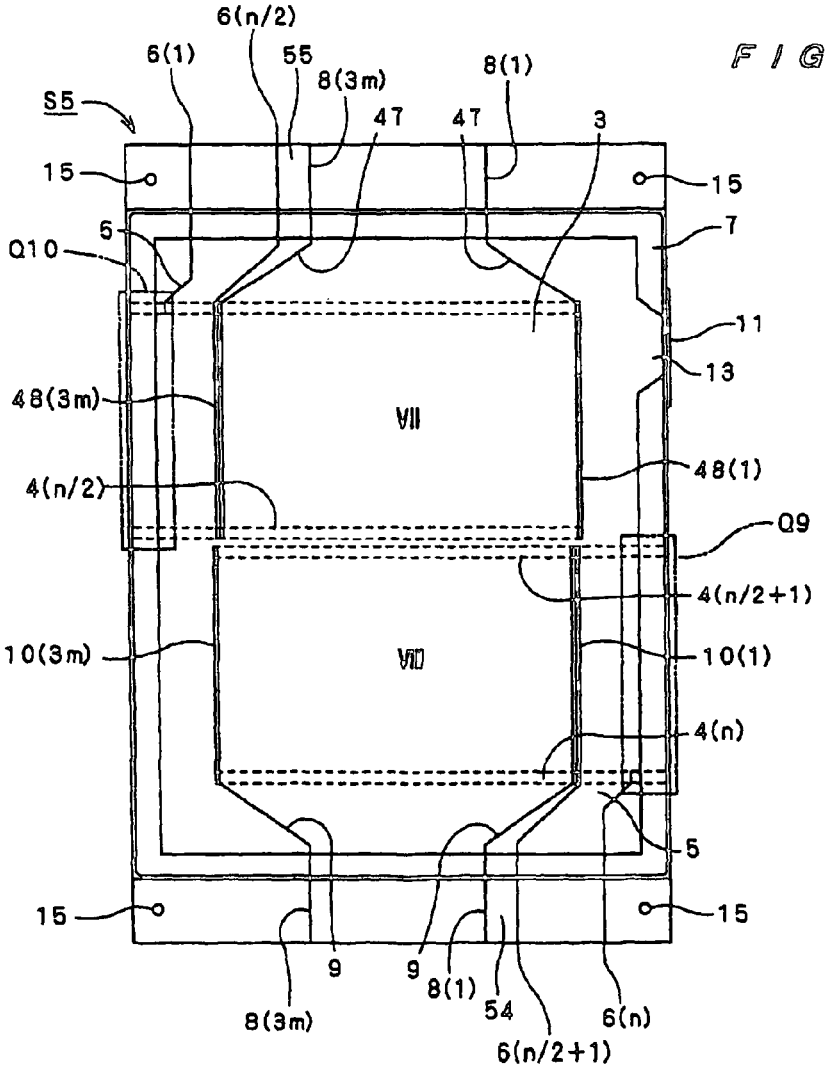
FIG. 7A is a plan view of a liquid crystal display device S5.
Figure 7B:
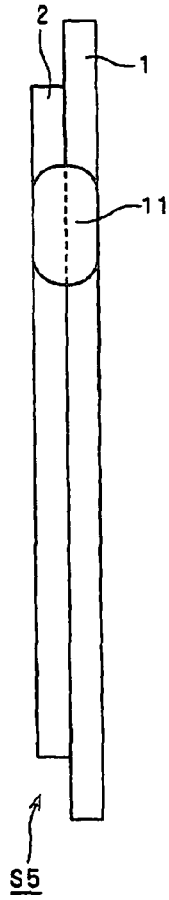
FIG. 7B is a right-side view of the same.

FIG. 7A is a plan view of a liquid crystal display device S5. FIG. 7B is a right-side view of the same, and FIG. 7C is an upper-side view of the same. In these drawings, parts corresponding to those of the aforementioned liquid crystal display device S1 are denoted by the same reference characters.

In this liquid crystal display device 5, the segment connection terminal group 8 and the common connection terminal group 6 are provided on the opposed upper and lower sides of the glass substrate 1.

The display area 3 is vertically divided as shown in FIG. 7A into blocks VII and VIII. The transparent common electrode group 4 consisting of n electrodes is separated sequentially in descending order into the 1st–n/2th and the (n/2+1)th–nth, which are disposed in block VII and VIII, respectively. The transparent segment electrode groups are constituted of the transparent segment electrode group 48(1)–48(3m) on the upper side and the transparent segment electrode group 10(1)–10(3m) on the lower side. Meanwhile, the transparent segment electrode group 48 and the transparent segment electrode group 10 are not connected at the center of the display area 3.

The common connection terminal group 6 on the upper side is connected to transparent common electrode group 4(1)–4(n/2) in block VII, and the common connection terminal group 6 on the lower side is connected to transparent common electrode group 4(n/2+1)–4(n) in block VIII. The symbols 56 (Q9) and 57 (Q10) represent conduction portions between substrates.

Also in the liquid crystal display device S5 of this embodiment, the conventional sector-shaped wiring pattern, which is the wiring pattern 20 spreading in the form of a sector in FIG. 49, is not provided. The space for the wiring pattern is therefore unnecessary, by which downsizing can be accomplished.

In this embodiment, the conduction portions between substrates Q9 and Q10 are provided on the right and left sides of the display area 3. However, in order to further reduce the size in the horizontal direction, the arrangement may be such that conduction portions between substrates Q9 and Q10 are disposed on one side of the display area 3.

Sixth Embodiment (Metal Wiring)

In each embodiment so far discussed, wiring patterns 5 and 9 are formed by using ITO. Alternatively, a metal layer with good electrical conductivity, which is a layer made of a metal such as aluminum (Al), an aluminum alloy, silver (Ag), a silver alloy or the like, may be employed.

When there is high resistance in an output wiring from a driver IC that drives a liquid crystal display device, it causes shortage of voltage to be applied to the transparent common electrode group 4 and transparent segment electrode group 10 in the display area 3, making it impossible to obtain a stable display.

Therefore, in the liquid crystal display device S6 of this embodiment, wiring patterns 5 and 9 are formed by using aluminum (Al) having resistance lower than that of ITO.

Figure 8:
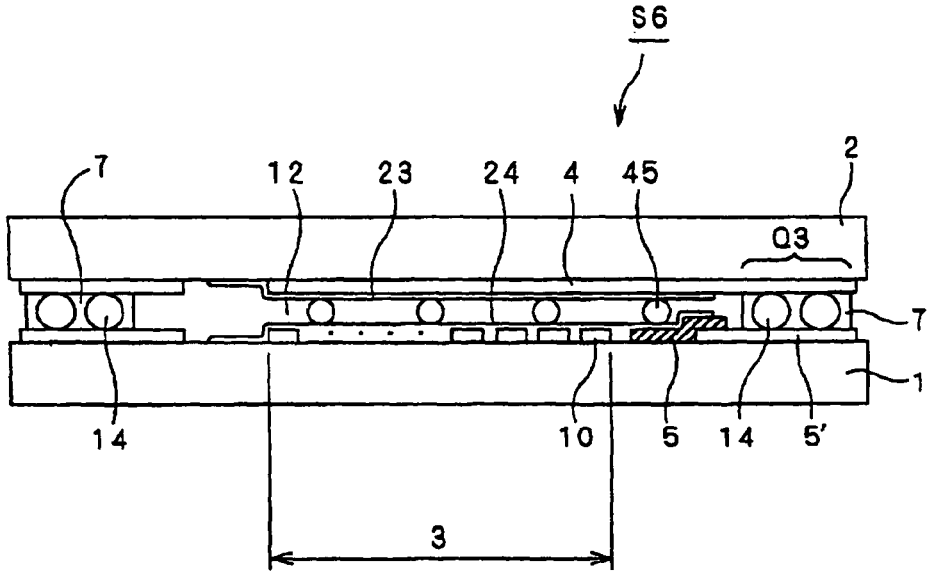
FIG. 8 is a cross-sectional view of a liquid crystal display device S6 according to this invention.
Figure 9A:
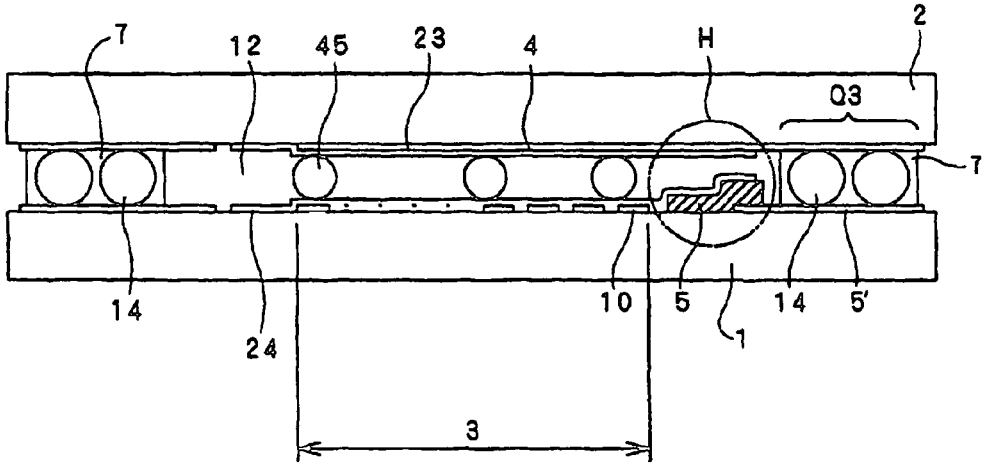
FIGS. 9A, 9B are cross-sectional views of the liquid crystal display device S6 according to this invention.
Figure 9B:
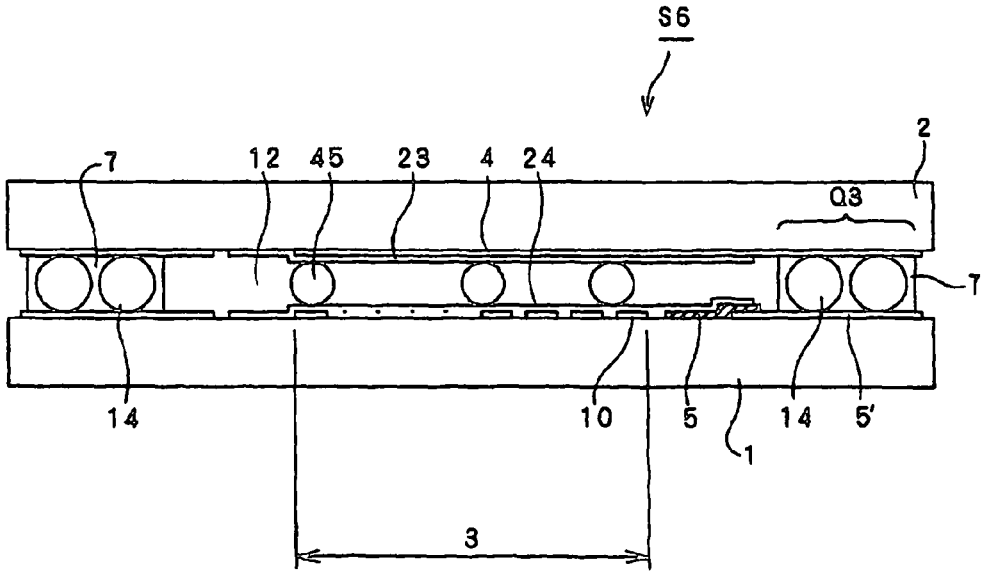

The plan view of the liquid crystal display S6 is the same as that shown in FIG. 5A. Cross sectional views taken along the line g-g in FIG. 5A are shown in FIGS. 8, 9A and 9B. FIG. 9A illustrates a case where the film thickness of Al is large, and FIG. 9B illustrates a case where the film thickness of Al is small.

At the conduction portion between substrates Q3, the wiring pattern 5 which is made of Al and disposed on the glass substrate 1 is connected to the wiring pattern 5' which is made of ITO and formed beneath the sealing resin 7.

The wiring pattern 5' is electrically connected to the transparent common electrode group 4 on the glass substrate 2 through conductive particles 14 contained in the sealing resin 7.

In this liquid crystal display device S6, since a metal layer with excellent electrical conductivity is employed for the wiring patterns 5 and 9, shortage of voltage applied to the transparent common electrode group 4 and the transparent segment electrode group 10 does not arise. Improved display stability is therefore obtained.

Now, a description is given to the thickness of the metal layer used for the wiring patterns 5 and 9.

Fine granular spacers 45 are dispersed on an alignment film made of a synthetic resin, polyimide, that is formed on the wiring patterns of the glass substrates 1 and 2. By these spacers 45, the gap between the glass substrates 1 and 2 is kept at a constant distance.

However, when the film thickness of Al or the like for forming the wiring pattern on the glass substrate 1 is very large in comparison to the thickness of ITO on the glass substrate 1 or the thickness of ITO on the glass substrate 2, it becomes very difficult to keep the gap between the glass substrates 1 and 2 at a constant distance.

A case where the film thickness of Al is thick as mentioned above is illustrated in FIG. 9A.

For example, it is assumed that the thickness of the ITO film on the glass substrate 1 and the thickness of the ITO film on the glass substrate 2 are both 2000 Å and the thickness of the Al metal layer is 10000 Å.

At the section H shown in FIG. 9A where there is the Al metal layer 5, when the spacers 45 are disposed in a region where the gap between substrates is narrow, the substrates are distanced further at that specific region. This causes the gap between substrates to be uneven, resulting in an uneven display.

Contrary to this case, a case where the thickness of Al film is the same as that of ITO film on the glass substrate 1 and that of ITO film on the glass substrate 2 is shown in FIG. 9B.

According to this arrangement, since the thickness of Al film is 2000 Å, which is the same as those of ITO films on the glass substrate 1 and the glass substrate 2, it is possible to keep the gap between substrates in the display area 3 and areas in the vicinity thereof at a constant distance. As a result, a uniform display without unevenness can be obtained.

EXAMPLE

The present inventors formed an ITO film with a thickness of 2000 Å on each of glass substrates 1 and 2, and formed wiring patterns 5 and 9 by using an Al metal layer, varying the thickness of the Al metal layer to various values as shown in Table 1. Then, the display performance was evaluated.

TABLE 1

| | Thickness of Al (Å) | | | | |
|---|---|---|---|---|---|
| | 500 | 1000 | 2000 | 3000 | 4000 |
| Ratio (to ITO thickness) | 0.25 | 0.5 | 1 | 1.5 | 2 |
| Display unevenness | Δ | ○ | ◎ | ○ | Δ |

In Table 1, the thickness of the Al metal layer and the ratio of the Al thickness to ITO thickness (Al thickness/ITO thickness) of each sample are also shown. The display performance is represented by display unevenness. Samples that had no display unevenness observed and had excellent display performance were marked by ◎, and samples that appeared to have some display unevenness but achieved good display performance were marked by ○.

Samples that had a little display unevenness and had slightly deteriorated display performance were marked by Δ, and samples that had obvious display unevenness were marked by ×.

As is apparent from the Table 1, it is preferable that the thickness of the Al metal layer is 1000 Å-3000 Å, and the ratio of the Al film thickness to the ITO film thickness is 0.5-1.5.

Seventh Embodiment (Wiring Resistance)

In order to obtain an even display in a liquid crystal display device, it is important to minimize difference in resistance among each output wire extending from the driver IC to the transparent segment electrode group 10 that consists of 3m electrodes. Also, it is important to minimize difference in resistance among each output wire extending from the driver IC to transparent common electrode group 4 that consists of n electrodes.

When difference in resistance is large in a wiring pattern which leads to each transparent electrode, due to difference in voltage drop, voltage applied to each transparent electrode in the display area varies. Accordingly, an even display cannot be obtained.

Therefore, a liquid crystal display device S7 of this embodiment is arranged, in wiring patterns 5A and 5B routed from the common-side terminal group 6 to the transparent common electrode group 4, such that a difference in resistance among each wire is minimized by adjusting the ratio between the area of ITO and the area of Al.

The adjustment of the ratio between the areas can be performed, as later mentioned in the sixteenth embodiment (light reflective electrode), by forming the wires using ITO and forming an Al film thereon, then partially removing the Al film such that the ratio between the areas becomes a prescribed rate.

Figure 10A:
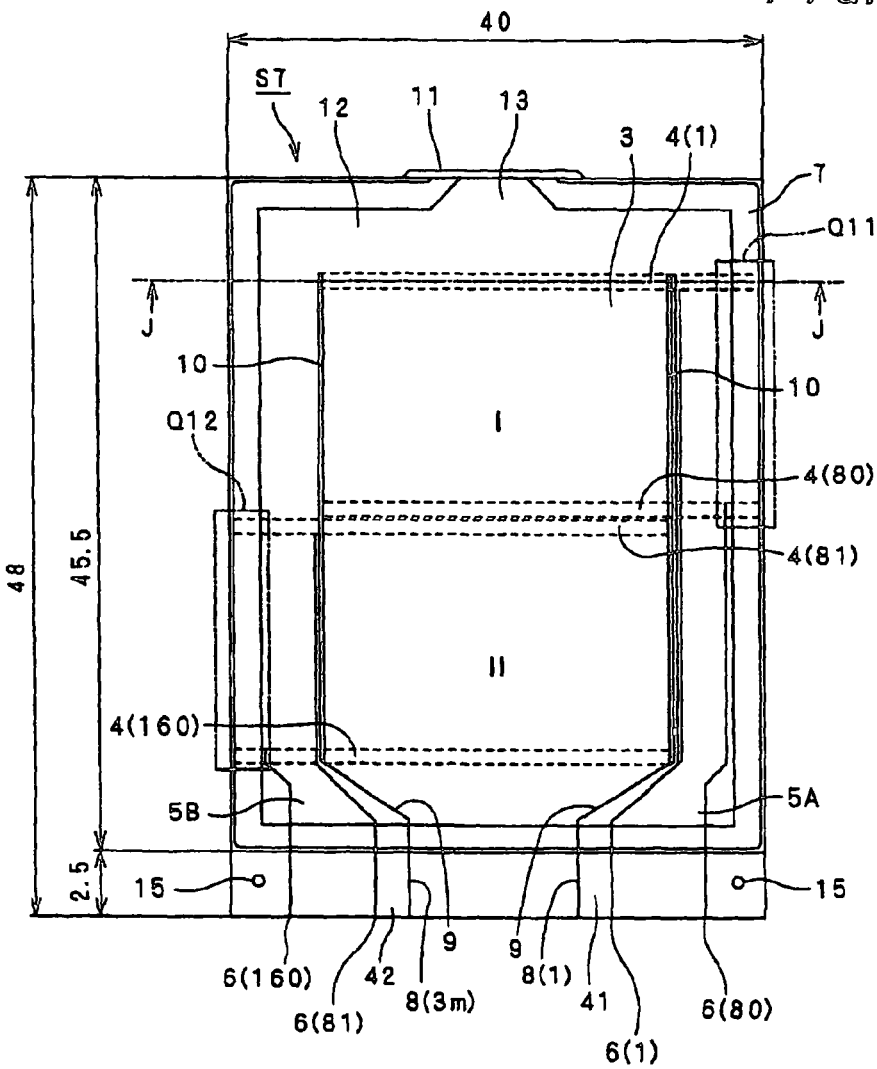
FIG. 10A is a plan view of a liquid crystal display device S7 of this invention.

Now, an explanation is given referring to FIG. 10A. In the group of lines (wires) constituting the wiring pattern 5A that stands up vertically from the common-side terminal group 6(1)–6(n) and bends horizontally toward the sealing resin 7, the longest line is the first one. The lines are shortened in steps through the way to the n'th one. In the group of lines (wires) constituting the wiring pattern 5B that stands up vertically from the common-side terminal group 6(n'+1)–6 (n) and bends horizontally toward sealing resin 7, the longest line is the (n'+1)th one. Here, however, the (n'+1)th one is shorter than the n'th one. The shortest one is the nth line.

Accordingly, if the wiring patterns 5A and 5B are formed by using the same kind of metal film with the same thickness, and with the same wiring width, resistance is reduced in steps through the way from the first one to the nth one. As a result, the difference in resistance between the first one and the nth one is extremely large.

Therefore, this embodiment is arranged such that when patterning is performed by lithography, with the wiring width of each wire in the wiring patterns 5A and 5B being fixed, the ratio of the area of ITO, which has greater resistance than that of Al, to the area of Al is changed. In this manner, difference in resistance across the wiring pattern is reduced.

The first line of the wiring pattern 5 is formed entirely of Al, and the nth line of the wiring pattern 5 is formed entirely of ITO. From the second line of the wiring pattern 5 through the (n−1)th line of the wiring pattern 5, the ratio of the area of ITO to the area of Al is gradually increased.

Although this embodiment is a case where Al and ITO are mixed, the metal is not limited to Al, but may be other ones that have lower resistance as compared with ITO.

EXAMPLE

Figure 10B:
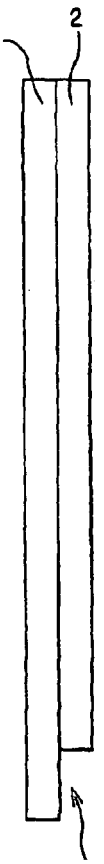
FIG. 10B is a right-side view of the same.

FIG. 10A is a plan view of a liquid crystal display device S7 of this embodiment. FIG. 10B is a right-side view of the same.

Figure 11:
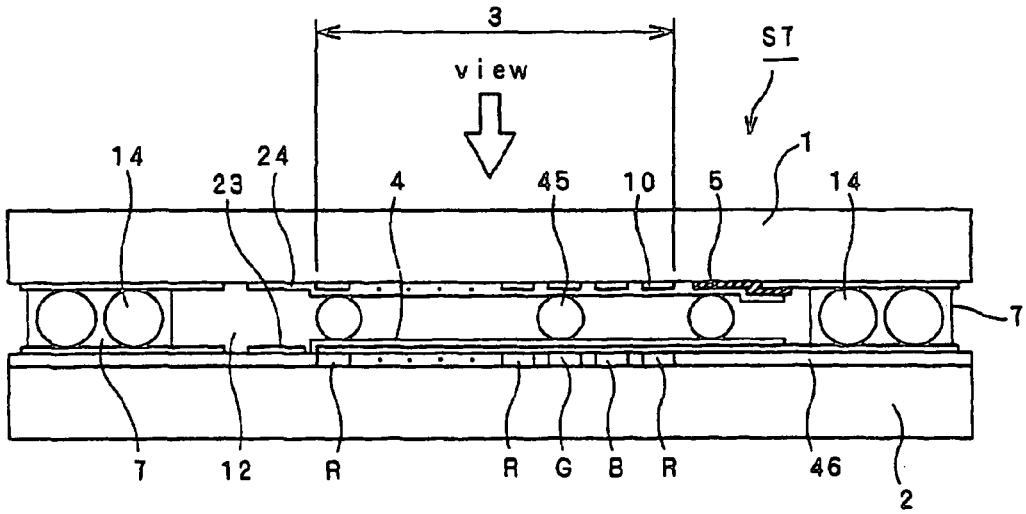
FIG. 11 is a cross-sectional view taken along the line j-j in FIG. 10A.

FIG. 11 is a cross-sectional view taken along the line j-j in FIG. 10A. In these drawings, parts corresponding to those of the aforementioned liquid crystal display device S1 are denoted by the same reference characters.

The size of the glass substrate 1 was 40 mm (horizontal)× 48 mm (vertical). The size of the glass substrate 2 is 40 mm (horizontal)×45.5 mm (vertical) The number of pixels was 120×160.

One hundred and sixty transparent common electrodes 4 are referred to in descending order as "the first one—the 160th one", and made correspondent to common-side terminals 6. In the common-side terminals 6 on the right side, the left most terminal is the first one. When the terminals are counted in left-to-right order, the right most terminal is the 80th one. In the common-side terminals 6 on the left side, the right-most terminal is the 81st one. When the terminals are counted in right-to-left order, the left-most terminal is the 160th one.

Three hundred and sixty (120×3) transparent segment electrodes 10 are referred to in right-to-left order as "the first one—the 360th one", and made correspondent to segment-side terminals 8. The right most terminal of the segment-side terminals 8 is the first one. When the terminals are counted in right-to-left order, the left most terminal is the 360th one.

The width D of each line of the wiring patterns 5A and 5B is uniformly 30 μm. In the lines in the wiring patterns 5A and 5B, the longest line is the fist one. The lines are shortened in steps so that the 160th one is the shortest. The first line (1) of the wiring pattern 5 is formed entirely of Al, and the 160th line of the wiring pattern 5 is formed entirely of ITO. From the second line (2) of the wiring pattern 5 through the 159th line of the wiring pattern 5, the ratio of the area of ITO to the area of Al is gradually increased.

The structure will be further described in detail referring to FIG. 11.

On a glass substrate 1, a wiring pattern 5 formed of a Al film and transparent segment electrode group 10 made of ITO are formed, and an alignment film 24 made of polyimide is formed on top of them.

On a glass substrate 2, a color filter 46 constituted of resist resins R, G and B is formed. On the color filter 46, an overcoat made of an insulator such as synthetic resin or silica is provided, on which a transparent common electrode group 4 is formed. An alignment film 23 made of polyimide is formed on top of them.

The side faces between the glass substrates 1 and 2 are surrounded by a sealing resin 7, and a liquid crystal 12 is injected into the inside of the surrounded portion. Also, spacers 45 for keeping the gap between the substrates at a constant distance are dispersed between the substrates. The thicknesses of the Al film and ITO film are both 2000 Å.

The present inventors varied the structure of the wiring pattern 5 consisting of 160 lines in three ways: wiring patterns 5 formed entirely of ITO; wiring pattern 5 formed entirely of Al; and wiring pattern 5 in which the ratio between the area of ITO and the area of Al is adjusted. In each case, the maximum resistance (RMAX.) of the first line and the minimum resistance (RMIN.) of the 160th line were measured. Furthermore, display unevenness was evaluated for each case. The obtained results are shown in Table 2. The resistances are indicated in ohm (Ω).

Meanwhile, the sheet resistances are as follows:
ITO: 10 ohm/sq.(Film thickness 2000 Å)
Al: 0.4 ohm/sq.(Film thickness 2000 Å)

TABLE 2

| | All formed of Al | All formed of ITO | Al and ITO mixed |
|---|---|---|---|
| Resistance of 1st one RMAX. | 1500 | 10000 | 1500 |
| Resistance of 160th one RMIN. | 900 | 1400 | 1400 |
| Difference in resistance RMAX. − RMIN. | 600 | 8600 | 100 |
| Display unevenness | ○ | X | ◎ |

As is apparent from Table 2, display unevenness was eliminated by the resistance adjustment performed in this example.

Eighth Embodiment (Light-Shielding Film)

Figure 12:
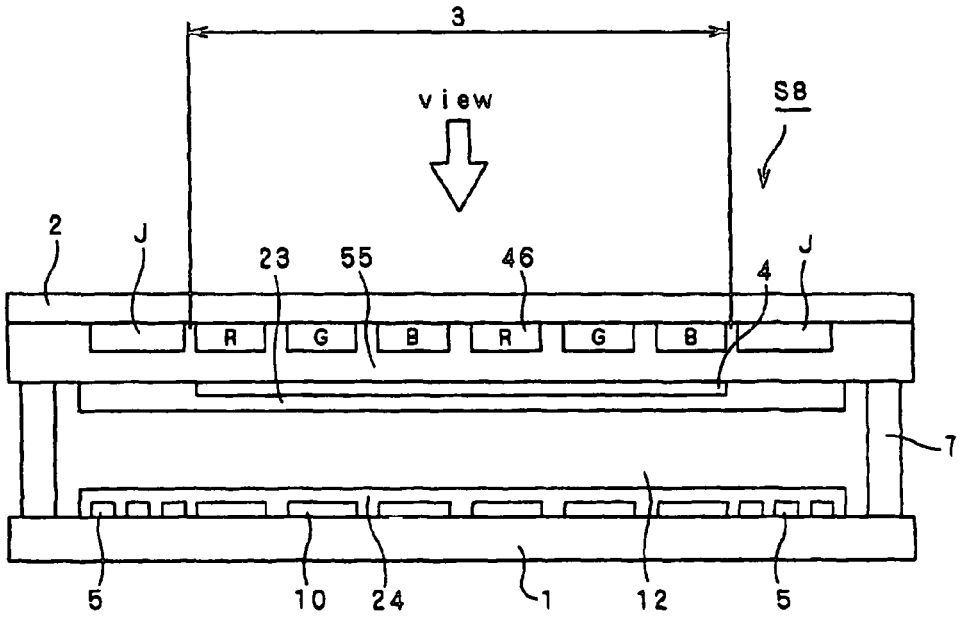
FIG. 12 is a cross-sectional view of a liquid crystal display device S8 according to this invention, which has a light-shielding film.

In this liquid crystal display device S8, as shown in FIG. 12, the light-shielding film J is formed on the glass substrate 2 in a region opposed to the wiring pattern 5 on the glass substrate 1. Because of the light-shielding film J, the periphery of the display area 3 is made sharp and clear with improved visibility.

The use of the light-shielding film J is preferred especially when the wiring pattern 5 is formed of a metal material, since reflected light from it can be blocked by this light-shielding film J.

It is also possible to surround the periphery of the display area 3 by the light-shielding film J, which gives the liquid crystal display device a good appearance and enhanced visual attraction. More desirably, the light-shielding film J is provided in areas from the periphery of display area 3 to the vicinity of the region beneath the seal.

A reflective type liquid crystal display device S8 and a transflective type liquid crystal display device S8 are now described referring to FIG. 12.

In a reflective type device and in a transflective type device as well, a retardation film (not shown) made of polycarbonate or the like and a polarizing film (not shown) made of iodine-based material are successively stacked on the outer surface of the glass substrate 2, and are attached thereto with an adhesive composed of acryl-based material.

In the case of a trasflective device, a retardation film made of polycarbonate or the like and a polarizing film made of iodine-based material are successively stacked also on the outer surface of the glass substrate 1, and a backlight is disposed under the glass substrate 1.

Segment electrodes 10 and an alignment film 24 made of polyimide that has been rubbed in one direction are successively formed on the glass substrate 1. Incidentally, it is also possible to interpose an insulating film composed of $SiO_2$ or the like between the segment electrodes 10 and the alignment film 24.

These segment electrodes 10 are formed using the same metal layer as the wiring pattern 5. For example, metal materials with good conductivity such as aluminum (Al), aluminum alloys (e.g. Cr in Al), silver (Ag) and silver alloys may be used.

When a reflective type is intended, the thickness of the metal layer is about 800 Å-1500 Å, preferably, about 1000 Å-1500 Å. The thickness of the Al film may be selected taking uniformity of the gap between substrates into consideration from the range of 800 Å-1500 Å. In the case of a transflective type device, the thickness may be selected from the range of 50 Å-900 Å, depending on the desired transmittance and reflectance.

Since the segment electrodes 10 and the wiring pattern 5 are both formed using a metal film, both of them can be simultaneously formed, thereby the manufacturing cost is reduced.

The internal surface of the glass substrate 2 is provided with a color filter 46. A light-shielding film (not shown) maybe formed between each segment of the color filter 46. The formation of this is carried out by a photolithography process or the like in which after resist application, sputtering and vacuum deposition are partially applied. This light-shielding film is formed of a metal such as aluminum, chromium, silver, an aluminum alloy or silver alloy, or a synthetic resin in which a black material such as carbon black or the like is mixed, or another light-impermeable synthetic resin.

When this light-shielding film is formed by using a metal film or photoresist, the light-shielding film J is formed on the internal surface of the glass substrate 2 at the same time. This allows the light-shielding film J to be formed simultaneously with the formation of the color filter. Accordingly, the light-shielding film J can be formed without any additional process. The production cost is therefore reduced.

The color filter 46 is covered with an overcoat layer 55 composed of $SiO_2$ or resin, on which common electrodes 4 and an alignment film 23 made of polyimide that has been rubbed in one direction are successively formed. These common electrodes 4 are arranged perpendicular to the segment electrodes 10. Meanwhile, it is also possible to provide an insulating layer composed of $SiO_2$ or the like between the common electrodes 4 and the alignment film 23.

The segment electrodes 10 may either be specular reflection type or diffuse reflection type. When diffuse reflection type segment electrodes 10 are formed, a rugged surface is first prepared by using resin and a metal film is formed thereon.

The color filter 46 above is formed by a pigment dispersion process, that is, a photoresist that has been preliminarily prepared with pigments (red, green, blue and so on) dispersed therein is applied to the substrate, and then photolithography is performed.

The glass substrates 1 and 2 that have been prepared in the above manner are bonded together by sealing resin 7 with liquid crystal 12 made of, for example, a chiral nematic liquid crystal that has been twisted 200-270 degrees of angle interposed therebetween. Furthermore, between the both glass substrates 1 and 2, a large number of spacers (not shown) for keeping the thickness of the liquid crystal 12 uniform are provided.

In the liquid crystal display device S8 arranged in the above-described manner, when it is a light-reflective type, irradiating light from external light sources such as the sun and fluorescent light passes through the retardation film and polarizing film, penetrates the color filter 46 to reach the segment electrodes 10, where it is reflected and passes through the retardation film and polarizing film, and then is emitted.

When the liquid crystal display device S8 is a transflective type, it works in the same way as the reflective type when used in a reflection mode. When it is used in a transmissive mode, irradiating light from the backlight passes through the polarizing film, retardation film, glass substrate 1, liquid crystal 12, glass substrate 2, retardation film, and polarizing film, and then the light is emitted.

As mentioned above, since the segment electrodes 10 and the wiring pattern 5 are both formed using the same metal film, these can be formed simultaneously by a thin-film forming process such as sputtering. The production cost can therefore be reduced.

Meanwhile, in the liquid crystal display device with the above-described structure, it is also possible to form the segment electrodes 10 by using ITO and a metal.

Ninth Embodiment (Conduction Between Substrates)

Figure 13A:
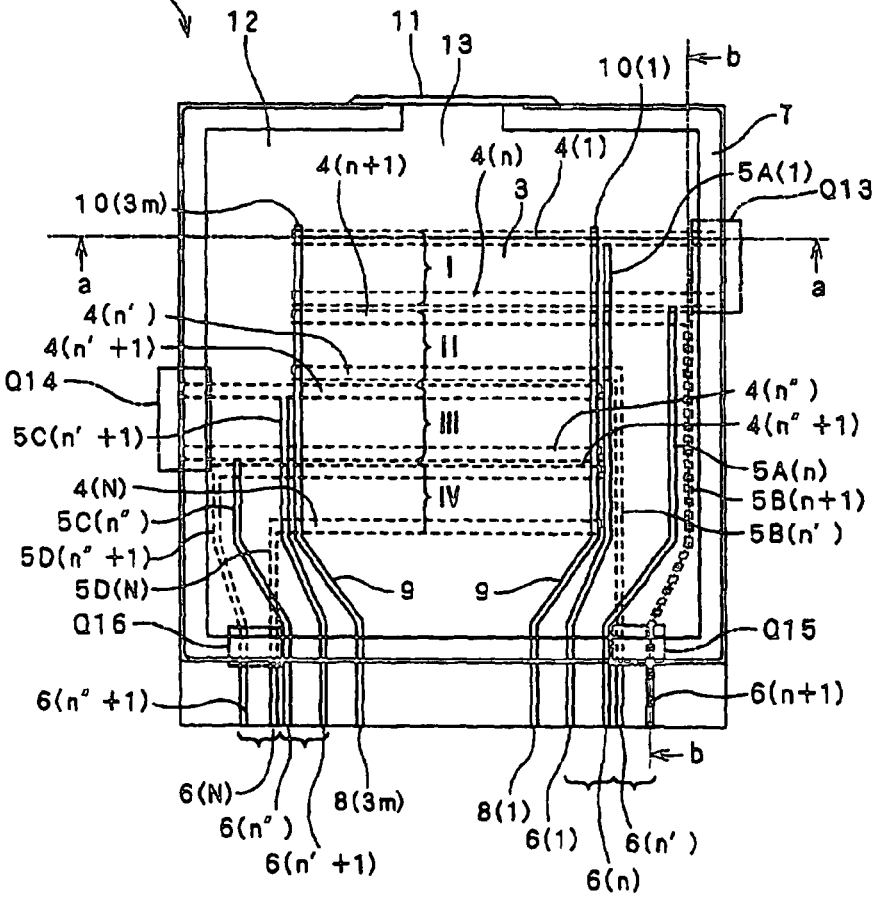
FIG. 13A is a plan view of a liquid crystal display device S9.
Figure 13B:
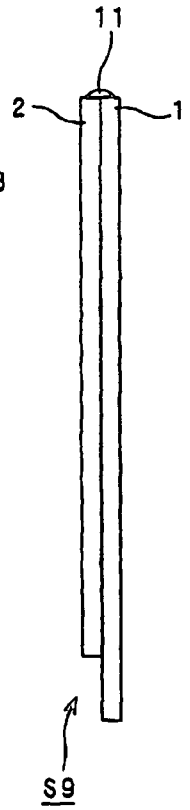
FIG. 13B is a right-side view of the same.
Figure 14:
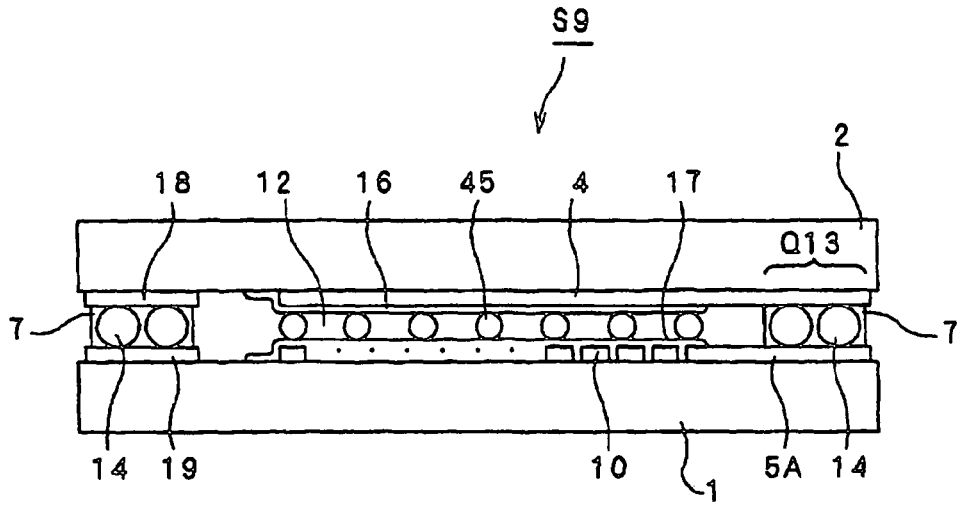
FIG. 14 is a cross-sectional view taken along the line a-a in FIG. 13A.
Figure 15:
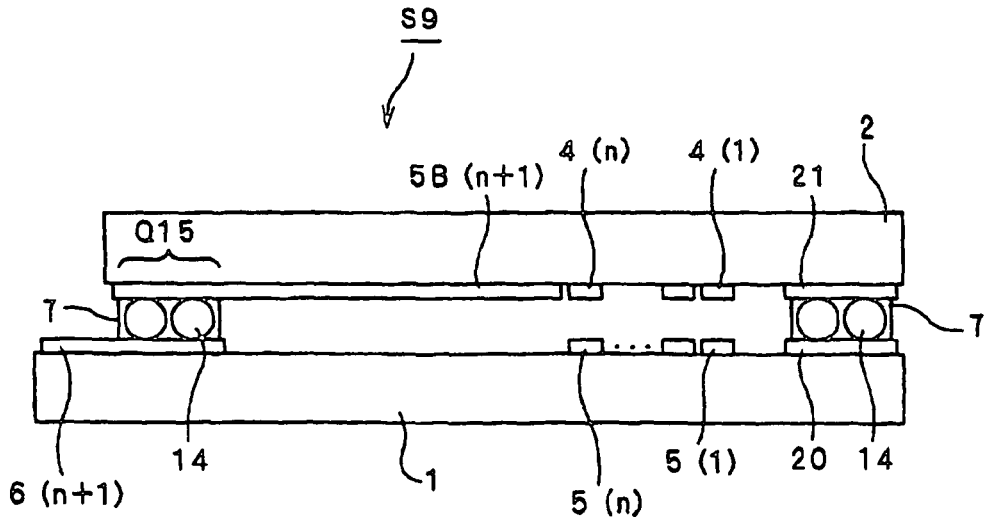
FIG. 15 is a cross-sectional view taken along the line b-b in FIG. 13A.

FIG. 13A is a plan view of a liquid crystal display device S9 and FIG. 13B is a right-side view of the same. FIG. 14 is a cross-sectional view taken along the line a-a in FIG. 13A, and FIG. 15 is a cross-sectional view taken along the line b-b in FIG. 13A.

In this liquid crystal display device S9, the substrate 1 formed with the transparent segment electrode group 10 and the substrate 2 formed with the transparent common electrode group 4 are opposed to each other and joined together via the sealing resin 7. The liquid crystal material 12 is injected into the inside from the injection inlet 13 that is thereafter sealed by the sealing resin 11.

The transparent segment electrode group 10 and the transparent common electrode group 4 are both transparent electrodes aligned in a striped manner and arranged so that they intersect perpendicular to each other. The area where they intersect perpendicular to each other forms the rectangularly shaped display area 3.

At the lower side on the transparent substrate 1, there are formed the segment connection terminal group 8 and the common connection terminal group 6 which is separated into two blocks sandwiching the segment connection terminal group 8.

TCP (Tape Carrier Package) or COF (Chip-on Film) in which a driver IC is incorporated will be connected to the connection terminal groups 8, 6.

The segment connection terminal group 8 (1-3m) passes through a lower side portion of the sealing resin 7 and is connected to the transparent segment electrode group 10 (1-3m) made of ITO through the wiring pattern 9.

On the other hand, the connection between the transparent common electrode group 4 and the common connection terminal group 6 is arranged as follows.

The transparent common electrode group 4 is divided into a first electrode group and second electrode group.

In this example, the first electrode group is further divided into blocks I and III, and the second electrode group is divided into blocks II and IV.

Then, as shown in FIG. 13A, blocks I, II are connected to the wiring patterns 5A, 5B disposed on the right side of the display area, while blocks III, IV are connected to the wiring patterns 5C, 5D disposed on the left side of the display area.

The number of the entire transparent common electrodes 4 is N. The transparent common electrodes in block I are indicated as 4(1)–4(n), the transparent common electrodes in block II are indicated as 4(n+1)–4(n'), the transparent common electrodes in block III are indicated as 4(n'+1)–4(n"), and the transparent common electrodes in block IV are indicated as 4(n"+1)–4(N) In the right and left sides of the sealing resin 7, conduction portions between substrates Q13, Q14 are provided. In the lower side of the sealing resin 7, there are provided conduction portions between substrates Q15, Q16. The wiring patterns 5A, 5C in blocks I, III are connected to the conduction portions between the substrates Q13, Q14. The wiring patterns 5B, 5D in blocks II, IV are connected to the conduction portions between the substrates Q15, Q16.

First, blocks I, II are described.

In FIG. 13A, a part of the right-side block (1st-nth) of the common connection terminal group 6 made of ITO is extended upward on the glass substrate 1. This extended portion is referred to as the wiring pattern 5A (1st-nth). The wiring pattern 5A is bent rightward and at the conduction portion between substrate Q13, it is connected to a wiring pattern extended from the transparent common electrode group 4(1)–4(n) in block I on the transparent substrate 2 through the conductive particles 14 in the sealing resin 7.

On the other hand, the rest of the terminals 6(n+1)–6(n') in the right-side block of the common connection terminal group 6 are connected to the wiring pattern 5B(n+1)–5B(n') on the transparent substrate 2 at the conduction portion between substrate Q15. The wiring pattern 5B(n+1)–5B(n') on the transparent substrate 2 is extended upward on the transparent substrate 2 as in FIG. 13A and bent leftward to be connected to block II (n+1)–(n') of the transparent electrode group 4.

Block III, IV are described as follows.

A part of the left-side block (n'+1)–(n") of the common connection terminal group 6 made of ITO is connected to the wiring pattern 5C(n'+1)–5C(n"), and extended upward on the glass substrate 1 as in FIG. 13A and bent leftward to be connected to a wiring pattern that is extended from block III (n'+1)–(n") of the transparent common electrode group 4 on the transparent substrate 2.

The rest (n"+1)–(N) of the terminals in the left-side block of the common connection terminal group 6 are electrically connected to the wiring pattern 5D (n"+1)–5D(N) on the transparent substrate 2 at the conduction portion between substrates Q16, and extended upward and bent rightward to be connected to block IV (n"+1)–(N) of the transparent common electrode group 4.

Referring to the structure of the cross section of the liquid crystal display device S9 shown in FIG. 14, the wiring pattern 5A on the transparent substrate 1 is electrically connected to the transparent common electrode group 4 on the transparent substrate 2 through the sealing resin 7 containing conductive particles 14. In the display area 3, alignment films 16, 17 made of polyimide are formed on the transparent common electrode group 4 and transparent segment electrode group 10, respectively. Spacers 45 for keeping the gap at a constant distance are disposed between the alignment films 16, 17.

In FIG. 15 including the conduction portion between the substrates Q15, the common connection terminal group 6 on the transparent substrate 1 is connected to the wiring pattern 5B on the transparent substrate 2 through the sealing resin 7 containing conductive particles 14.

As described so far, in the liquid crystal display device S9 according to this invention, the wiring patterns 5A, 5B to which blocks I, II of the transparent common electrode group 4 are connected are formed on the opposed glass substrates 1 and 2, respectively. Accordingly, the distance between the display area 3 and the sealing resin 7 can be narrowed, thereby accomplishing downsizing of the liquid crystal display device.

Similarly to the above manner, the wiring patterns 5C, 5D to which blocks III, IV of the transparent common electrode group 4 are connected are vertically overlapped each other, allowing the distance between the display area 3 and the sealing resin 7 to be narrowed, thereby accomplishing downsizing of the device.

Meanwhile, in this embodiment, the transparent common electrode group 4 is divided into the first and second electrode groups which are further divided into blocks I, III and blocks II, IV, respectively. Instead of this arrangement, it is possible not to further divide the first and second electrode groups into blocks, or to divide each of the first and second electrode groups into three, four, or more blocks.

In addition, although the conduction portions between substrates are provided within the sealing resin 7 in this embodiment, the conduction portions between the substrates may be provided between the sealing resin 7 and the display area 3.

EXAMPLE

Figure 16:
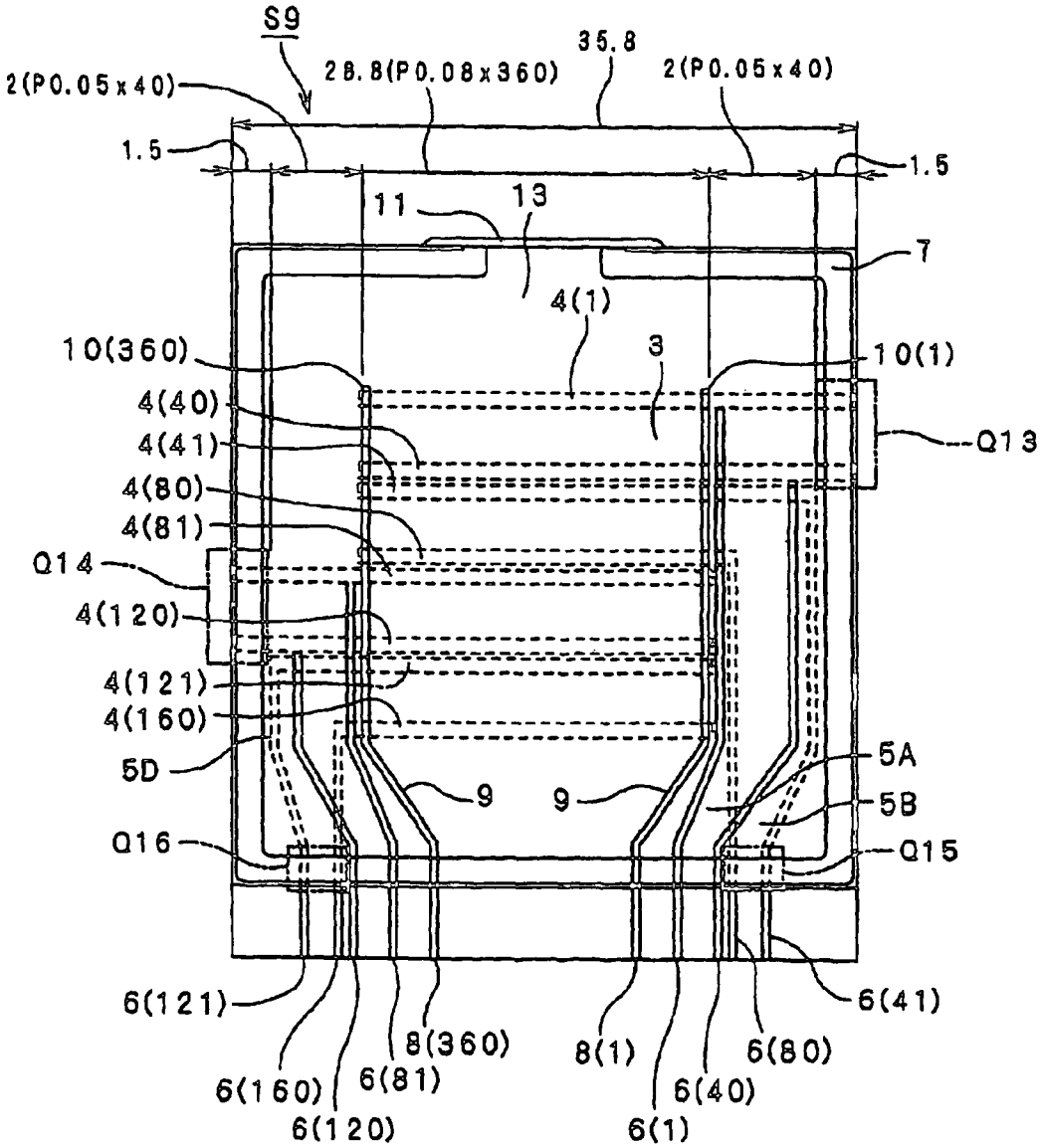
FIG. 16 is a plan view of an example of the liquid crystal display device S9.

An example of the liquid crystal display device S9 is now described referring to FIG. 16.

FIG. 16 is a plan view of the liquid crystal display device S9. The number of pixels of the display area 3 is (120×RGB)× 160 dots, and the pixel pitch is 0.08 mm×0.24 mm.

The segment connection terminal group 8 (1st-360th) is connected to the transparent segment electrodes 10 (1st-360th) through the wiring pattern 9. Forty terminals (1st-40th) in the right-side block of the common connection terminal group 6 are connected to the wiring pattern 5A, extended and bent rightward to be connected to a wiring pattern that is extended from the 1st-40th electrodes of the transparent common electrode group 4 on the transparent substrate 2 at the conduction portion between the substrates Q13 through conductive particles in the sealing resin 7.

The rest (41st-80th) of the terminals in the right-side block of the common connection terminal group 6 are electrically connected at the conduction portion between the substrates Q15 to the wiring pattern 5B on the transparent substrate 2, and extended and bent leftward to be connected to the 41st-80th electrodes of the transparent common electrode group 4.

On the other hand, forty terminals (81st-120th) in the left-side block of the common connection terminal group 6 are electrically connected to the wiring pattern 5C, extended and bent leftward to be electrically connected at the conduction portion between substrates Q4 through conductive particles inside the seating resin 7 to a wiring pattern that is extended form the 81st-120th electrodes of the transparent common electrode group 4 on the transparent substrate 2.

The rest (121st-160th) of the terminals in the left-side block of the common connection terminal group 6 are electrically connected to the wiring pattern 5D on the transparent substrate 2 through the conduction portion between the substrates Q16, extended and bent rightward to be connected to the 121st-160th electrodes of the transparent common electrode group 4.

According to the above arrangement, the size of the area for routing the wiring patterns 5, which permits 40 wires with 0.05 m pitches to pass through, is 0.5 mm×40=2 mm. The width of the sealing resin 7 is 1.5 mm, the size of the display area is: 0.08 mm pitch×360=28.8 mm. Accordingly, the horizontal size of the liquid crystal display device is given as follows:

$$2\times 2\text{ mm}+2\times 1.5\text{ mm}+28.8\text{ mm}=35.8\text{ mm}$$

However, in the liquid crystal display device S3 shown in FIG. 5A, given the number of transparent common electrodes 4 being 160, in order to allow the wiring patterns 5A, 5B each comprising 80 wires to pass through the right and left areas, respectively, on the display area, the necessary width is 0.05 mm×80=4 mm.

In comparison with this, areas of both of the transparent substrates 1, 2 can be used for routing the wiring patterns 5 by providing 40 wires to each of the routing areas. A width of 2 mm, given by 0.05 mm×40, is adequate for the routing area in the liquid crystal display device S9 according to this invention.

As discussed so far, the liquid crystal display device according to this invention is capable of greatly reducing the sizes of the right and left side areas outside the display area. Accordingly, this device was able to make the display area larger than those of other liquid crystal display devices having the same external configuration as this device. The results of the comparison are shown is Table 3.

TABLE 3

| | Horizontal size of wiring pattern | Horizontal size of display area | Horizontal size of LCD |
|---|---|---|---|
| LCD S9 | 2 mm | 28.8 mm | 35.8 mm |
| LCD S3 | 4 mm | 24.8 mm | 35.8 mm |

Tenth Embodiment (Dummy Pattern)

Figure 17A:
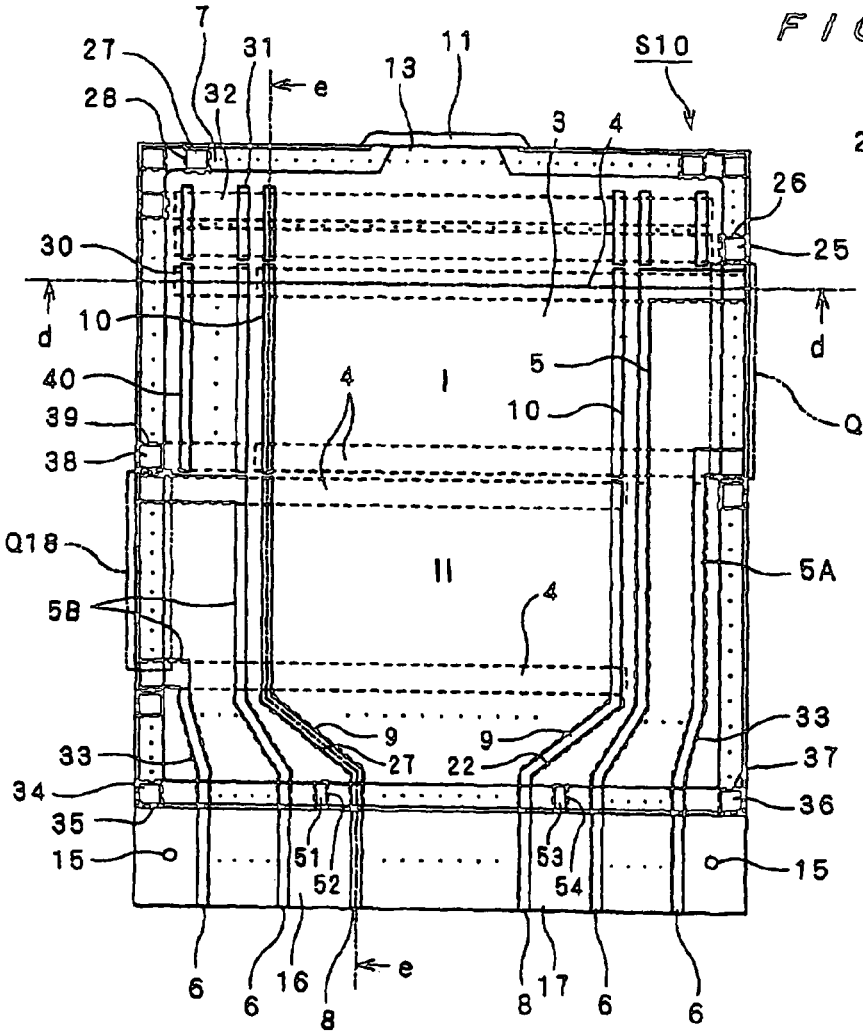
FIG. 17A is a plan view of a liquid crystal display device S10.
Figure 17B:
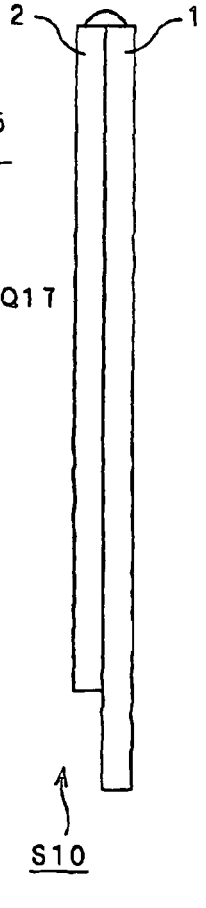
FIG. 17B is a right-side view of the same.
Figure 18:
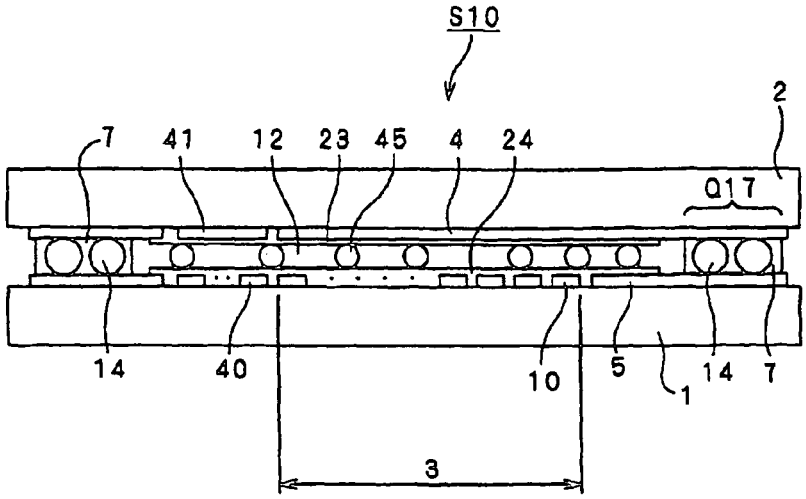
FIG. 18 is a cross-sectional view taken along the line d-d in FIG. 17A.
Figure 19:
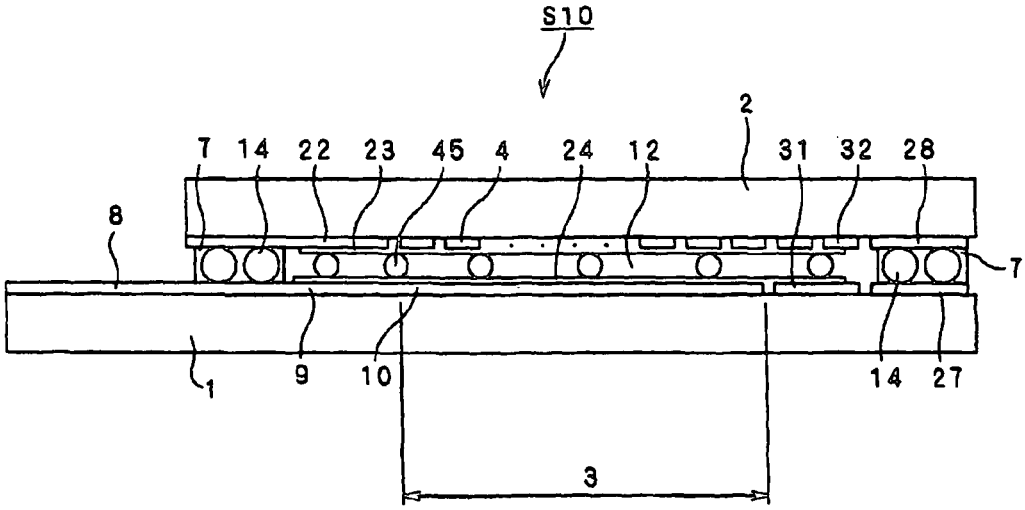
FIG. 19 is a cross-sectional view taken along the line e-e in FIG. 17A.

FIG. 17A is a plan view of a liquid crystal display device S10, and FIG. 17B is a right-side view of the same. FIG. 18 is a cross-sectional view taken along the line d-d in FIG. 17A, and FIG. 19 is a cross-sectional view taken along the line e-e in FIG. 17A.

On the glass substrate 2, the transparent common electrode group 4 consisting of n electrodes that are made of ITO and the alignment film 23 for aligning the liquid crystal 12 are successively formed. On the other glass substrate 1, the transparent segment electrode group 10 made of ITO and the alignment film 24 are successively formed. Spacers 45 are dispersed between the alignment films 23, 24.

The number of the transparent segment electrodes 10 and the number of the segment-side terminals 8 are both 3m, and the number of the transparent common electrodes 4 and the number of the common-side terminals 6 are both n. However they are partly omitted in the drawings.

The area where the transparent common electrode group 4 and transparent segment electrode group 10 cross each other forms a display area 3.

Further outside the display area 3, the sealing resin 7 containing conductive particles 14 is provided so as to surround the display area 3. The glass substrates 1 and 2 are bonded together with the sealing resin 7, and the internal space between them is filled with the liquid crystal 12 by injecting it through the injection inlet 13. Then, it is sealed with the sealing resin 11.

As shown in FIG. 17A, the common-side terminal group 6 and segment-side terminal group 8 made of ITO or the like are juxtaposed to each other on the lower side edge of the glass substrate 1.

The display area 3 is separated vertically into blocks I and II. The transparent common electrodes 4 in block I and the transparent common electrodes 4 in block II are drawn to the right side and the left side, respectively, and extended to conduction portions between substrates Q17 and Q18, respectively. The conduction portions between substrates Q17, Q18 are provided for electrically connecting each of the wirings in the glass substrates 1, 2 with each other. In this embodiment, a sealing resin 7 containing conductive particles 14 is employed for the conduction portions as shown in FIG. 18.

Through the conduction portions between substrates Q17, Q18 arranged in the above-manner, the transparent common electrode group 4 is connected to the common-side terminal group 6, being extended from the wiring pattern 5 on the glass substrate 1.

The liquid crystal display device S10 according to the present invention is characterized in that it is provided with dummy patterns for making image display even. This is described referring to FIG. 19 showing a cross sectional structure of the liquid crystal display device S10.

At a region on the glass substrate 1 where the sealing resin 7 is provided, a transparent dummy member 27, which is made of the same material as that of the transparent segment electrode group 10 and has the same thickness, is attached to the substrate.

The wiring pattern 9 is formed on the glass substrate 1 between the display area 3 and the sealing resin 7. In a region on the glass substrate 2 which is opposed to the wiring pattern 9, another dummy pattern 22 is formed.

Also, in a region on the glass substrate 2 which is opposed to a wiring pattern 5 that is formed being connected to the transparent common electrode group 4, another dummy pattern 33 is formed. The regions on the glass substrates 1, 2 between the display area 3 and the sealing resin 7 where the above-mentioned wiring patterns 5,9 are not formed are provided with dummy patterns 31, 32, respectively.

By these dummy patterns 27, 22, 33, 31, 32, the thickness of the liquid crystal 12 is made uniform throughout the display area 3.

This liquid crystal display device S10 and the liquid crystal display device S3 in FIG. 5A are compared in size. In both of these devices, the values are set as follows:

Pixel Pitch: Horizontal 0.08 mm×3 (R,G,B), Vertical 0.24 mm

Number of Pixels: 120×160

Wiring pitch of segment-side terminal group 8: 0.06 mm

Wiring Pitch of common-side terminal group 6: 0.06 mm.

The size of the glass substrate 1 of the liquid crystal display device S3 in FIG. 5A was 40 mm×48 mm. In comparison, the size of the glass substrate 1 of the liquid crystal display device S10 in this example was as small as 40 mm×45-46 mm.

In addition, according to the liquid crystal display device S10 arranged as above, it was possible to perform illumination tests without securing TCP or COP to the device by pressure.

Eleventh Embodiment (Dummy Pattern, Metal Wiring)

Figures 20A, 20B:
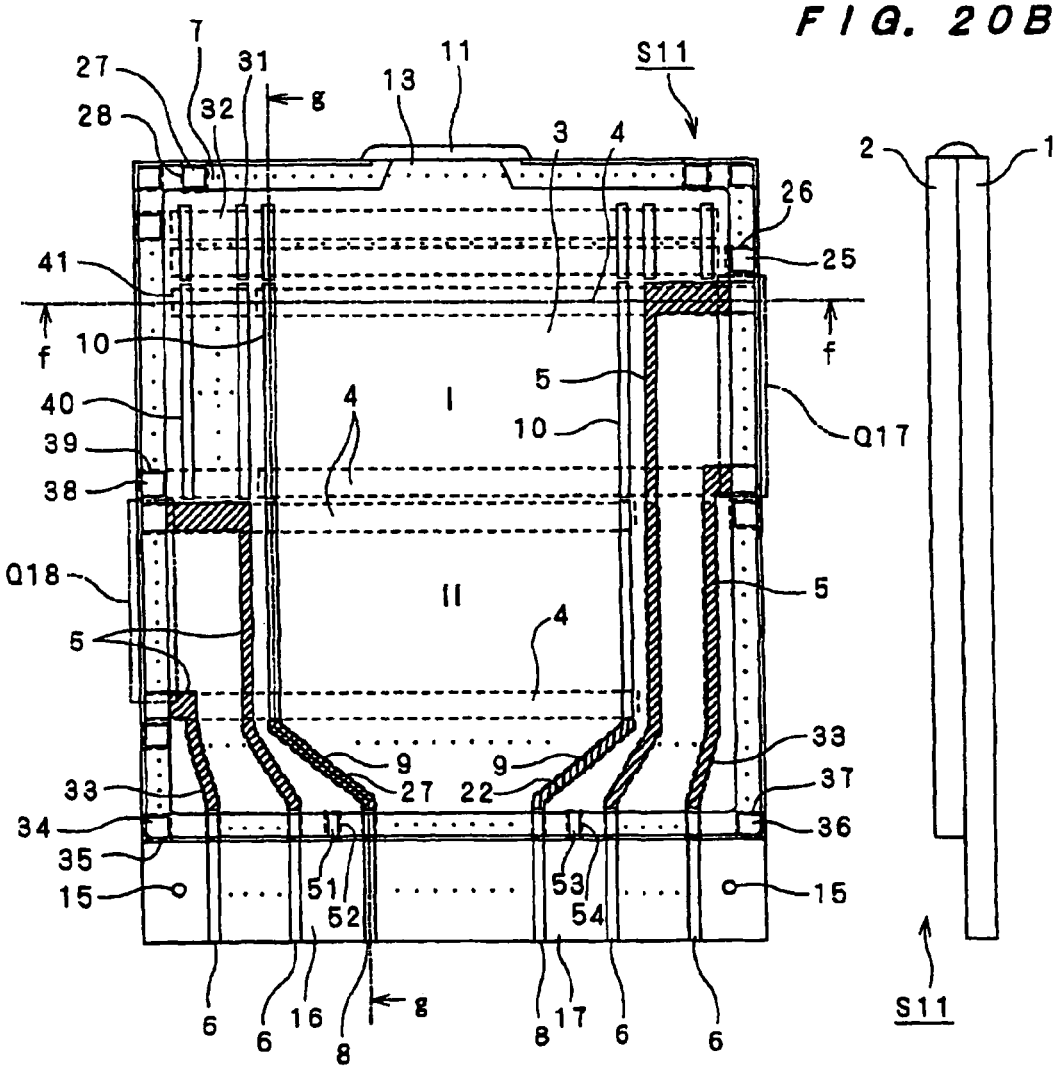
FIG. 20A is a plan view of a liquid crystal display device S11.
FIG. 20B is a right-side view of the same.
Figure 21:
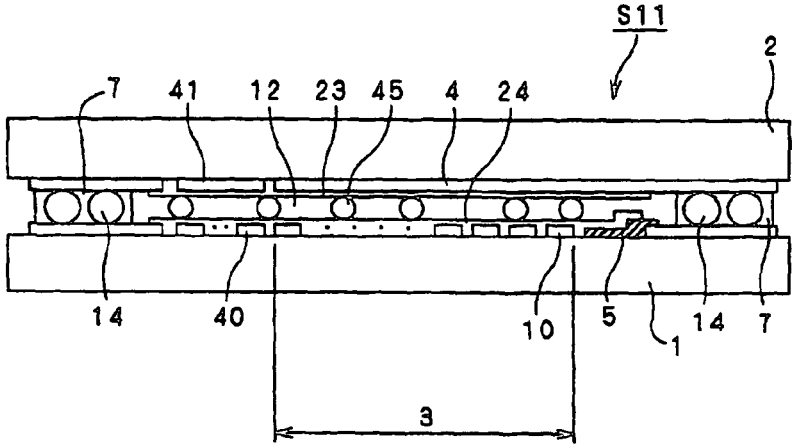
FIG. 21 is a cross-sectional view taken along the line f-f in FIG. 20A.
Figure 22:
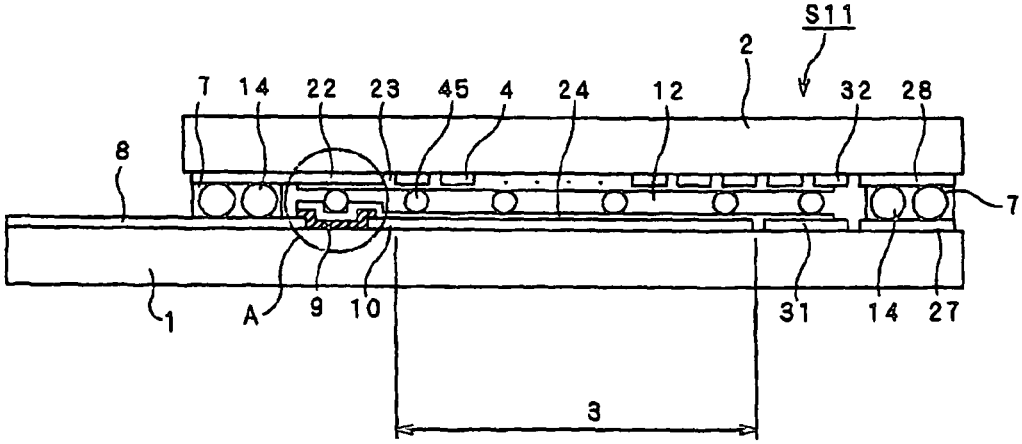
FIG. 22 is a cross-sectional view taken along the line g-g in FIG. 20A.
Figure 23:
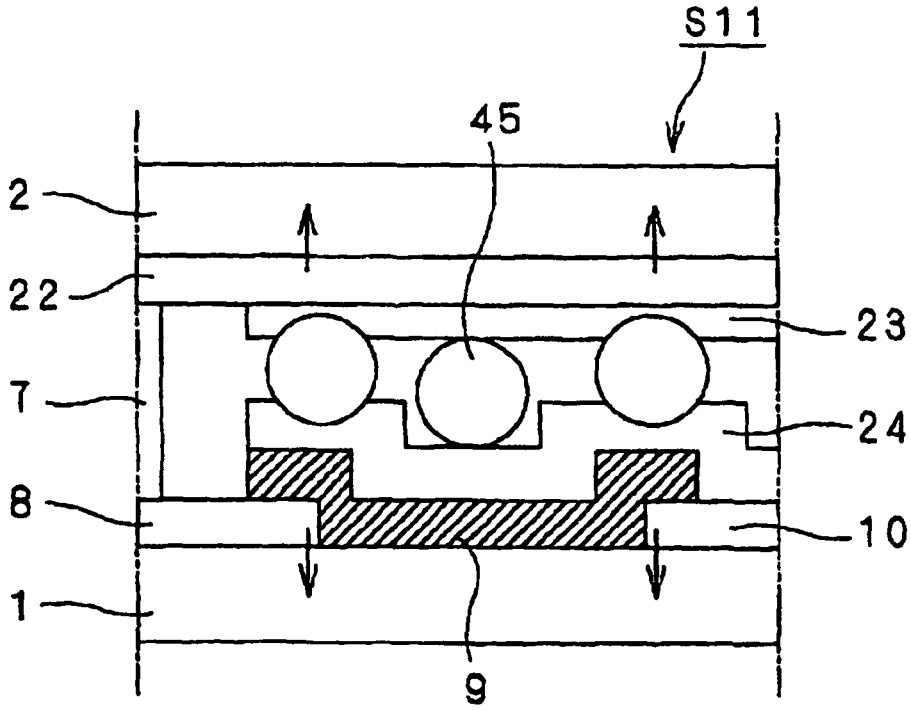
FIG. 23 is an enlarged view of the essential part A in FIG. 22.

FIG. 20A is a plan view of a liquid crystal display device S11, and FIG. 20B is a right-side view of the same. FIG. 21 is a cross-sectional view taken along the line f-f in FIG. 20A, and FIG. 22 is a cross-sectional view taken along the line g-g in FIG. 20A. FIG. 23 is an enlarged view of the essential part A in FIG. 22.

In the aforementioned embodiments S1-S10, the wiring patterns 5 and 9 are formed by using ITO. Instead of ITO, a metal layer with good conductivity such as a layer made of aluminum (Al), an aluminum alloy, silver (Ag), or a silver alloy is employed in this embodiment.

When there is high resistance in an output wiring from a driver IC, it causes shortage of voltage to be applied to transparent common electrode group 4 and transparent segment electrode group 10 in display area 3, which makes it impossible to obtain a stable display. Therefore, in this embodiment, wiring patterns are formed by using a metal layer having resistance lower than that of ITO.

In FIG. 20A, a case where wiring patterns 5, 9 are formed using aluminum (Al) is shown. The wiring patterns are hatched in FIG. 20A.

As shown in FIG. 22, the wiring pattern 9 made of Al is formed on the glass substrate 1 between the display area 3 and the sealing resin 7. In a region on the glass substrate 2 opposite to the wiring pattern 9, a dummy pattern 22 is formed.

Likewise, the wiring pattern 5 made of Al is formed as shown in FIG. 20A. In a region on the glass substrate 2 opposite to the wiring pattern 5, another dummy pattern 33 is formed.

In the same way as in the previous liquid crystal display device S10, also in this liquid crystal display device S11, the thickness of the liquid crystal 12 could be further uniformized throughout the display area 3 by forming dummy patterns.

In addition, by employing a metal with good conductivity for the wiring patterns 5 and 9, shortage of voltage to be applied to the transparent common electrode group 4 and transparent segment electrode group 10 does not arise so that a stable display without unevenness could be obtained.

Twelfth Embodiment (Dummy Pattern, Metal Wiring)

This embodiment is represented by a liquid crystal display device S12 in which the liquid crystal display device S11 is further improved to eliminate display unevenness.

Figures 24A, 24B:
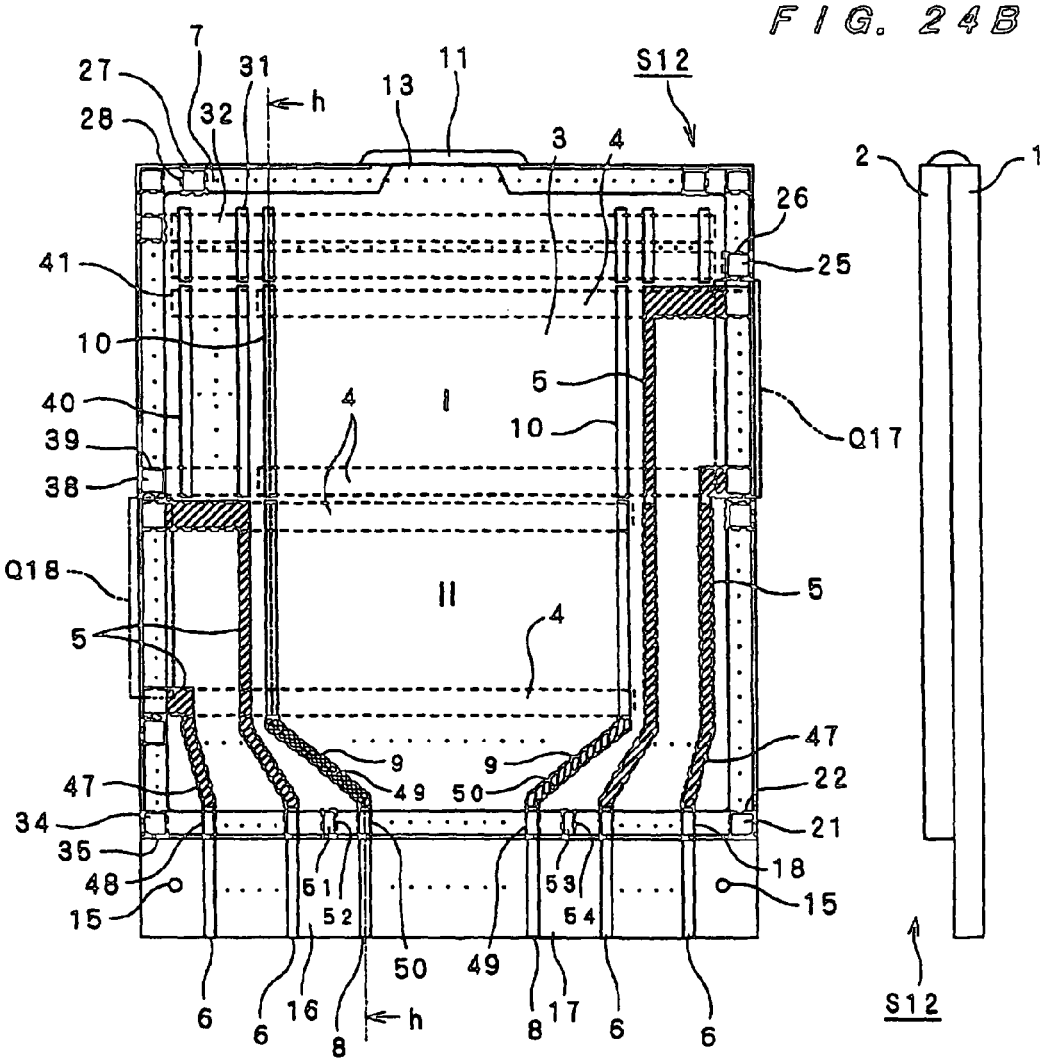
FIG. 24A is a plan view of the liquid crystal display device S12.
FIG. 24B is a right-side view of the same.
Figure 25:
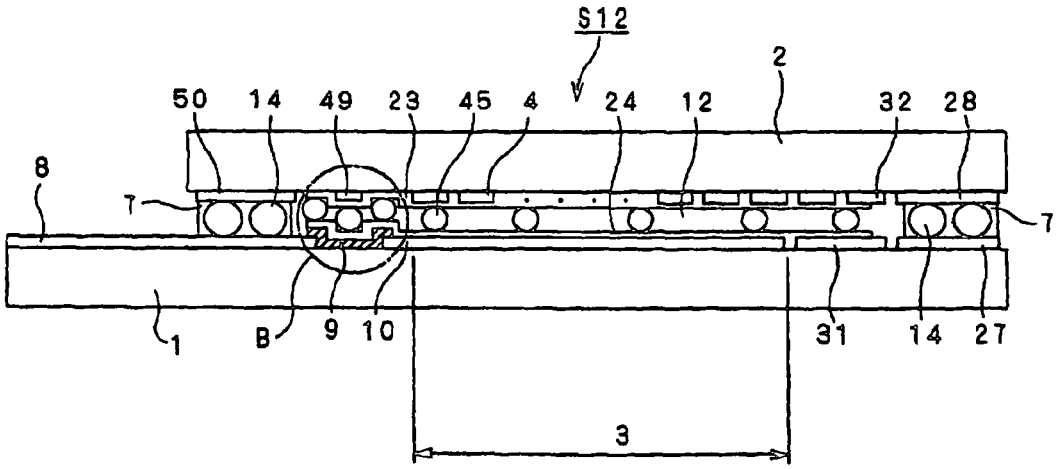
FIG. 25 is a cross-sectional view taken from the line h-h in FIG. 24A.
Figure 26:
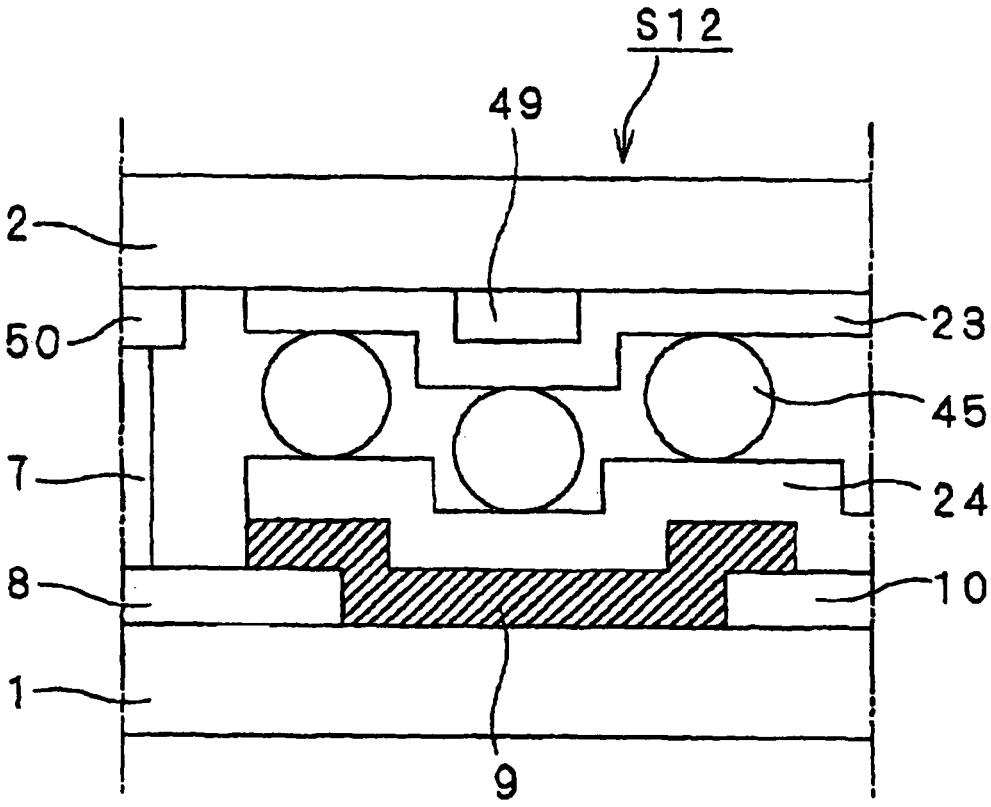
FIG. 26 is an enlarged view of the essential part B in FIG. 25.

FIG. 24A is a plan view of the liquid crystal display device S12, and FIG. 24B is a right-side view of the same. FIG. 25 is a cross-sectional view taken from the line h-h in FIG. 24A. FIG. 26 is an enlarged view of the essential part B in FIG. 25.

In the previous liquid crystal display device S11, as shown in FIG. 22, the wiring pattern 9 made of Al is provided so as to be connected to both of the edges of the segment-side terminal group 8 and transparent segment electrode group 10. The wiring pattern 9 overlaps the edges of segment-side terminal group 8 and transparent segment electrode group 10.

For this reason, the wiring pattern 9 has an irregular shape. Since the dummy pattern 22 opposed to this wiring pattern 9 has a flat surface as shown in FIG. 23, the liquid crystal in this portion does not have an even thickness. Accordingly, spacers 45 are prone to be caught in this portion causing display unevenness to occur in the liquid crystal display device for which a highly fine and precise display is required.

In the liquid crystal display device S12 of this embodiment, as shown in FIGS. 25, 26, a dummy pattern 49 with a protruded shape is formed on the glass substrate 2 in a region opposed to the recessed portion of the wiring pattern 9 on the glass substrate 1.

By this arrangement, the device is given a structure suitable for a highly fine, precise display and capable of further uniformizing the thickness of the liquid crystal 12 throughout the display area 3 as compared with the liquid crystal display device S2 above.

The description above is for the wiring pattern 9 drawn from the transparent segment electrode group 10. Regarding the other electrodes, transparent common electrode group 4, a wiring pattern 5 made of Al is provided so that it overlaps the edge of common-side terminal group 6. A dummy pattern 47 (See FIG. 24A) is formed on the glass substrate 2 so as to correspond to the irregular shape of the wiring pattern 5 on the glass substrate 1. This arrangement makes it possible to further uniformize the thickness of the liquid crystal 12 throughout the display area 3.

Incidentally, the present invention is not limited to the above-described embodiments. For example, although the display area is divided into blocks I and II in this embodiment, the arrangement may be such that the display area is not divided at all, or the display area is divided into three or more blocks, or the connection terminal groups 6, 8 are formed not only on one side portion of the substrate but also on another side of the substrate in the same manner.

Thirteenth Embodiment (Prevention Of Static Electricity)

Figure 27:
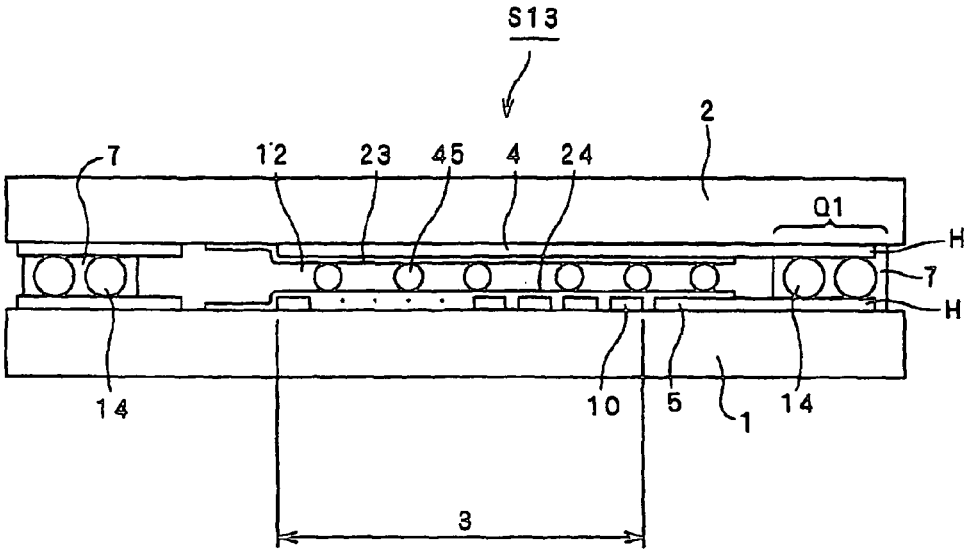
FIG. 27 is a cross-sectional view of a liquid crystal display device S13 according to this invention.

FIG. 27 is a cross-sectional view of a liquid crystal display device S13. The plan view of this liquid crystal display device is identical to the one shown in FIG. 1A. FIG. 27 is a cross-sectional view taken along the line e-e in FIG. 1A.

This liquid crystal display device S13 is characterized in that edges H of a transparent common electrode group 4 and a wiring pattern 5 are kept within a sealing resin 7 of a conduction portion between the substrates Q1.

Usually, the edges of the transparent common electrode group 4 and wiring pattern 5 are extended to the outside of the sealing resin 7 (See FIG. 2). In terms of manufacturing, this arrangement is intended to enhance the conductivity between the transparent common electrode group 4 and the conduction portion between substrate Q1, thereby improving the reliability.

However, on the other hand, such an arrangement creates portions that stick out of the sealing resin 7. The gap between the glass substrates 1, 2 is about 4-6 μm. When there is static electricity near the periphery of the liquid crystal display device, the static electricity gets into the transparent common electrode group 4 and wiring pattern 5 from the gap between the glass substrates 1, 2. Due to this phenomenon, it is often the case that the driver IC mounted on the glass substrate 1 is destroyed by the static electricity.

Contrary to the above case, since the edges H of the transparent common electrode group 4 and wiring pattern 5 are disposed within the sealing resin 7 according to this invention, even if there is static electricity near the periphery of the liquid crystal display device, the static electricity is prevented from getting into the transparent common electrode group 4 and wiring pattern 5 from the gap between the glass substrates 1,2. The driver IC is therefore prevented from destruction by the static electricity.

Figure 28:
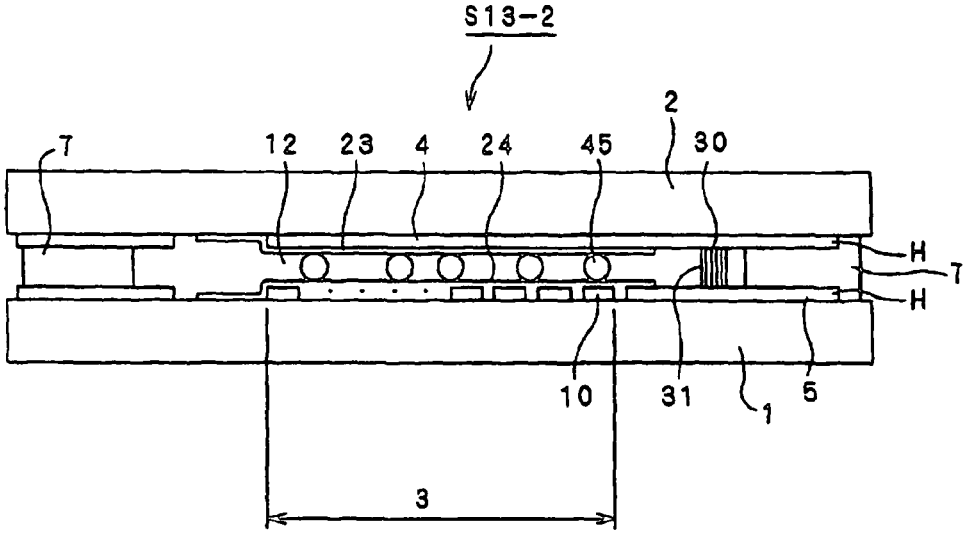
FIG. 28 is a cross-sectional view of a liquid crystal display device S13-2 according to this invention.

FIG. 28 shows a cross section of another liquid crystal display device S13-2 according to this embodiment. The plan view of this liquid crystal display device S13-2 is identical to the one shown in FIG. 3A. FIG. 28 is a cross-sectional view taken along the line f-f in FIG. 3A.

Also, in this liquid crystal display device S13-2, the edges H of the transparent common electrode group 4 and wiring pattern 5 are disposed within the sealing resin 7. Accordingly, even if there is static electricity near the periphery of the liquid crystal display device, the static electricity is prevented from getting into the transparent common electrode group 4 and wiring pattern 5 from the gap between the glass substrates 1,2. The driver IC is therefore prevented from destruction by the static electricity.

The wiring arrangement for prevention of static electricity described above is applicable not only to the liquid crystal display devices shown in FIGS. 1A and 3A, but also to the conduction portions between substrates in each of the devices shown in FIGS. 5A, 6A, 7A, 10A, 13A, 16, 17A, 20A, and 24A.

Fourteenth Embodiment (Display Frame Dummy Pattern)

A liquid crystal display device is incorporated into a portable terminal or display equipment.

Figure 29:
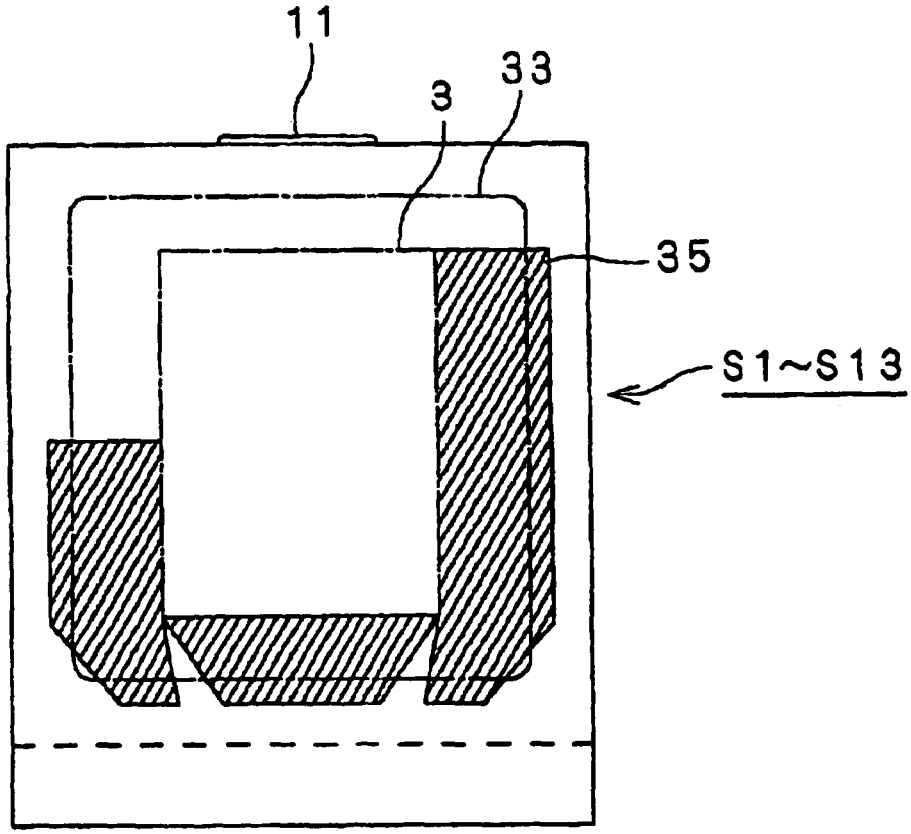
FIG. 29 is a schematic plan view showing display equipment with any of the liquid crystal display devices S1-S13 incorporated within its window frame 33.

As shown in FIG. 29, the display area 3 of a liquid crystal display device is located in a window frame 33 of the portable terminal or display equipment in which the liquid crystal display device is incorporated.

In the liquid crystal display devices S1-S13 described above, the area 35 in which the wiring pattern 5 is routed between the display area 3 and the window frame 33 can be seen from the display surface. Because colors and visions in this area 35 appear differently from those in other areas, the display is hard to reach a stable state within this window frame 33.

Accordingly, the configuration of the area 35 for routing the wiring pattern 5 affects the exterior design of the product so that the original exterior design is subject to changes.

Now, a liquid crystal display device S14 in which homogeneity in color and texture is realized in the area between the display area 3 and the window frame 33 is described.

Figure 30A:
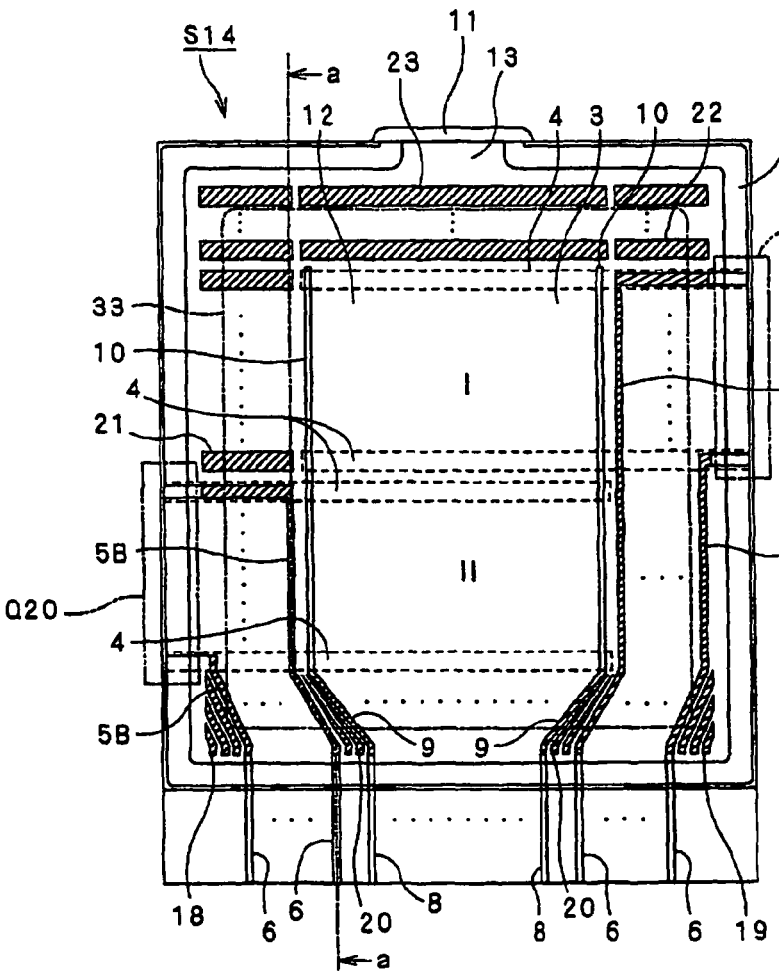
FIG. 30A is a plan view of a liquid crystal display device S14 according to this invention.
Figure 30B:
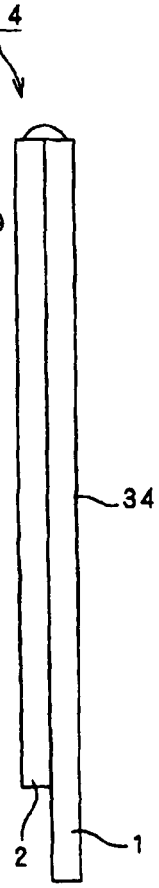
FIG. 30B is a right-side view of the same.
Figure 31:
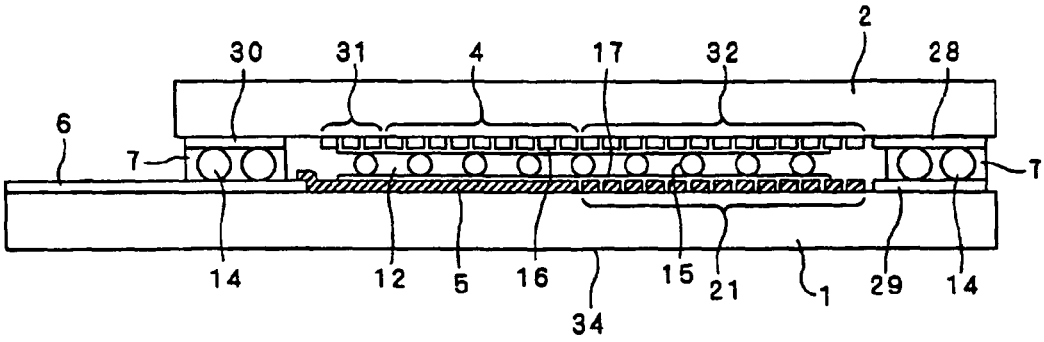
FIG. 31 is a cross-sectional view taken along the line a-a in FIG. 30A.

FIG. 30A is a plan view of a liquid crystal display device S14, and FIG. 30B is a right-side view of the same. FIG. 31 is a cross-sectional view taken along the line a-a in FIG. 30A.

The liquid crystal display device S14 according to this invention is characterized by a dummy pattern for the display window frame to improve the image display performance, which is hereinafter described in detail.

In areas between the display area 3 and the sealing resin 7 on the glass substrate 1 and other than the areas in which the wiring pattern 5 is provided, dummy patterns for display frame 18, 19, 20, 21, 22, 23 are formed in the manner of covering the window frame of the device 33. In this embodiment, each of these patterns is formed on the glass substrate 1 using aluminum (Al) or an alloy thereof.

In FIG. 30A, the dummy pattern 21 is formed in the upper left area of the display area 3, above the wiring pattern 5B, and the dummy patterns 22, 23 are formed in the upper area of the display area 3.

The dummy patters 18, 19, 20 are formed in the lower area of the display area 3 where the wiring patterns 5, 9 are not present.

Figure 32:
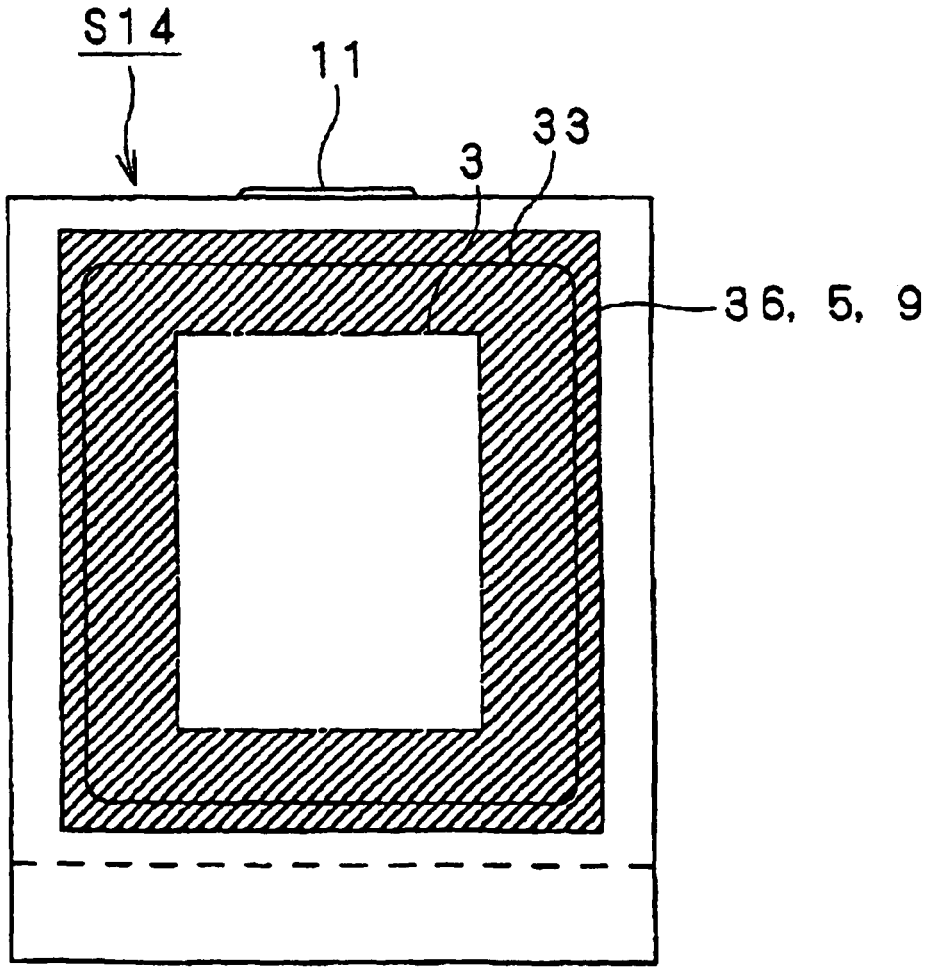
FIG. 32 is a schematic plan view showing display equipment with the liquid crystal display device S14 incorporated within its window frame 33.

In the liquid crystal display device S14 according to this invention, because of the configuration of the routing area 36 formed by the wiring patterns 5, 9 formed of a metal film such as Al and the dummy patterns for display frame 18, 19, 20, 21, 22, 23 shown in FIG. 32, the color and texture appear in a uniform condition in any of the areas between the display area 3 and the window frame of the device 33.

Accordingly, the wiring patterns of the liquid crystal display device will not adversely effect the external design of the device.

Now, other liquid crystal display devices S14-2 and S14-3 are described referring to FIGS. 33A, 33B, 34A and 34B.

Figure 33A:
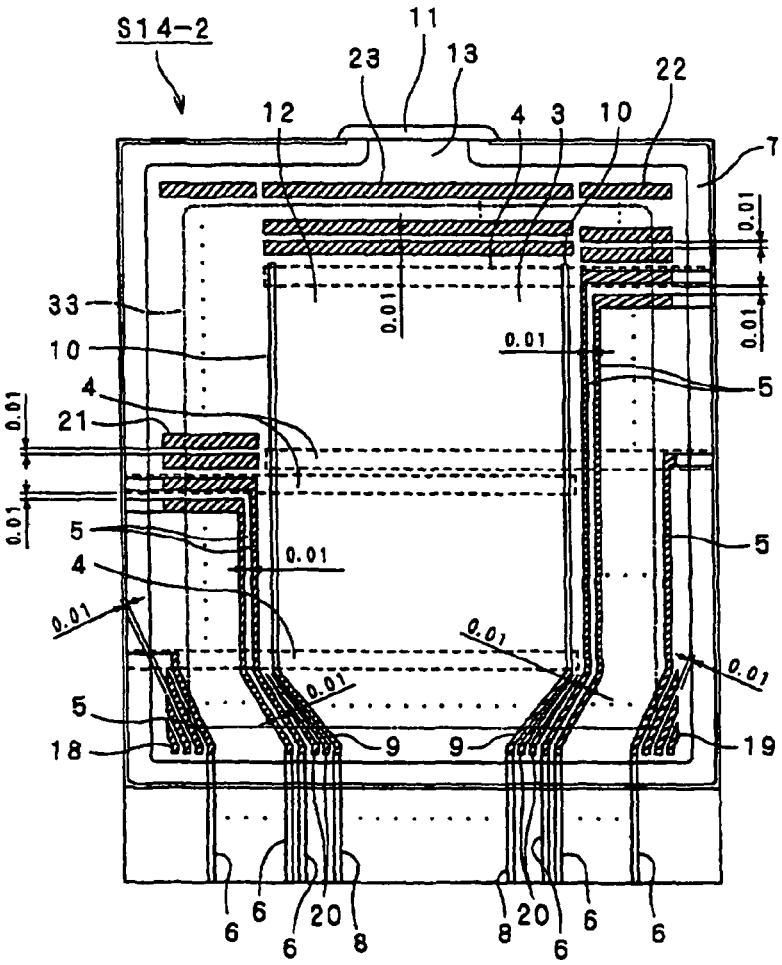
FIG. 33A is a plan view of a liquid crystal display device S14-2 according to this invention.
Figure 33B:
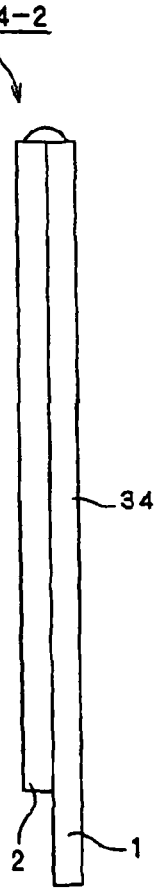
FIG. 33B is a right-side view of the same.

FIG. 33A is a plan view of the liquid crystal display device S14-2, and FIG. 33B is a right-side view of the same. The numerical values in FIG. 33A are indicated in mm. In FIG. 33B, the numeral 34 denotes the display surface of a glass substrate 1.

Within a sealing resin 7 on the glass substrate 1, there are provided wiring patterns 5, 9, and dummy patterns for display frame 18, 19, 20, 21, 22, 23, each of which is made of Al or the like.

The spacing S for the wiring patterns 5, 9 and the spacing S for the dummy patterns for display frame are preferably almost the same distance. For example, as shown in FIG. 33A, when the spacing S for the wiring patterns 5, 9 is 0.01 mm, then the spacing S for the dummy patterns for display frame should be 0.01 mm.

When the spacing S for the dummy patterns for display frame is 0.02 mm, the configuration of the patterns are partially viewed from the display surface, but it is in a degree not inconveniencing practical use. However, when the spacing S for the dummy patterns for display frame is as great as 0.03 mm, the difference in display appearance between the wiring pattern area and other areas becomes noticeable, although it is in a degree not causing inconvenience for practical use.

Preferably, the spacing S for the wiring patterns 5, 9 and the spacing S for the dummy patterns for display frame are both as small as possible so that differences in display appearance caused by local differences in pattern configuration are small, providing an uniform display appearance.

According to the present invention, each of the both spacings S is 0.02 mm or less, preferably, 0.015 mm or less, and optimally, it is 0.01 mm or less.

Figure 34A:
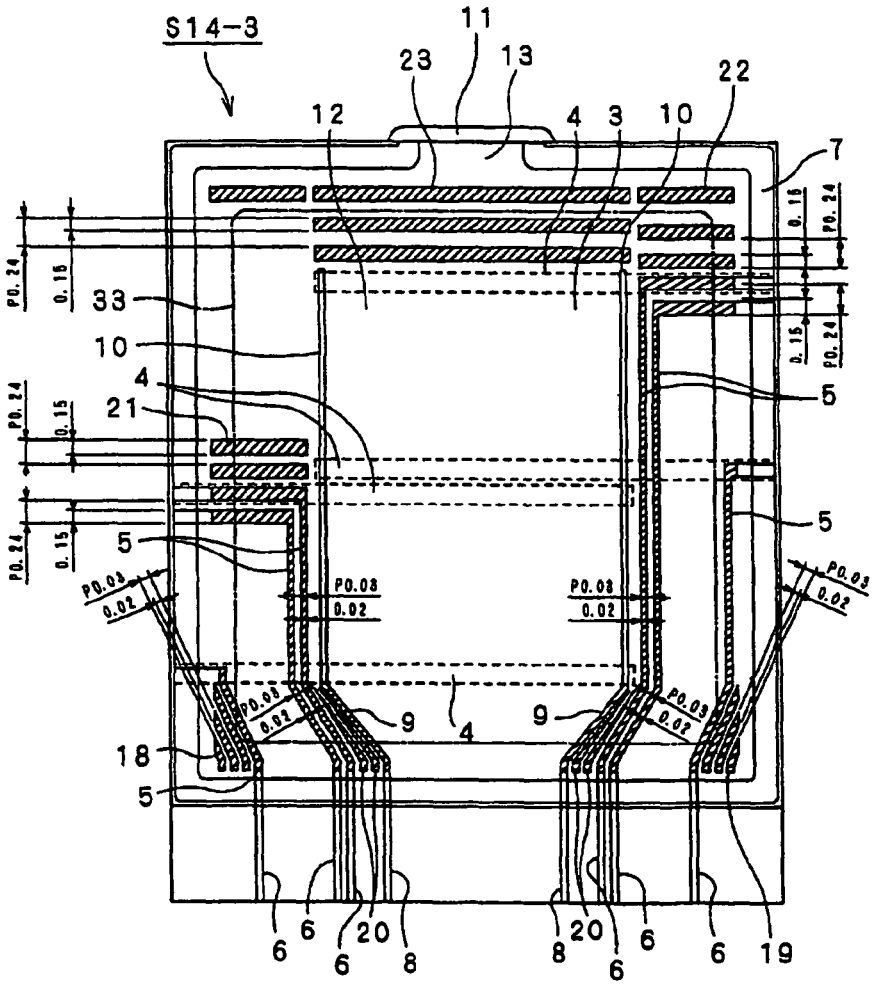
FIG. 34A is a plan view of a liquid crystal display device S14-3.
Figure 34B:
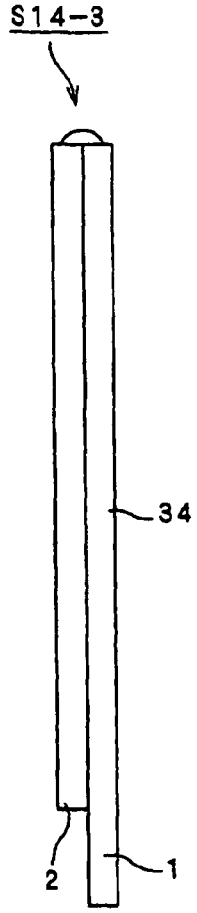
FIG. 34B is aright-side view of the same.

An explanation is now given to a liquid crystal display device S14-3 shown in FIGS. 34A, 34B.

In this liquid crystal display device S14-3, the (wiring width D)/(wiring pitch P) of wires that vertically or obliquely extend in the wiring pattern 5 is $$0.02\ \text{mm}/0.03\ \text{mm}=0.666$$

and the (wiring width D)/(wiring pitch P) of wires that horizontally extend in the wiring pattern 5 is $$0.15\ \text{mm}/0.24\ \text{mm}=0.625$$

In the dummy patterns for display frame, the (dummy wiring width D)/(dummy wiring pitch P) of wires that vertically or obliquely extend is $$0.02\ \text{mm}/0.03\ \text{mm}=0.666$$

and the (dummy wiring width D)/(dummy wiring pitch P) of wires that horizontally extend is $$0.15\ \text{mm}/0.24\ \text{mm}=0.625$$

When there are several wiring widths D and wiring pitches P in a liquid crystal display device as this case, by making the wiring pattern ratio i.e.(wiring width D)/(wiring pitch P) and the dummy pattern ratio i.e. (dummy wiring width D)/(dummy wiring pitch P) as identical as possible, differences in display appearance caused by local differences in pattern configuration become small so that the display appearance becomes uniform.

The present inventors fabricated three types of liquid crystal display devices having wiring pattern ratios A, A' and dummy pattern ratios B, B' as shown in Table 4. The greatest difference among the ratios was found for each of the devices, and the display appearance was evaluated for each of them. The results shown in Table 4 were obtained.

TABLE 4

| | 1 | 2 | 3 |
|---|---|---|---|
| Wiring pattern ratio (A) | 0.666 | 0.666 | 0.666 |
| Wiring pattern ratio (A') | 0.625 | 0.500 | 0.416 |
| Dummy pattern ratio (B) | 0.666 | 0.666 | 0.666 |
| Dummy pattern ratio (B') | 0.625 | 0.500 | 0.416 |
| Largest difference among the ratios | 0.041 | 0.166 | 0.250 |
| Evenness in display appearance | ○ | Δ | X |

The device in which excellent appearance in terms of display frame was obtained is marked by ○, and the device in which the pattern configuration was partially observed in a degree not inconveniencing practical use is marked by Δ. The device marked by ×is one in which the pattern configuration was noticeably observed, although it is in a degree not inconveniencing practical use.

According to the experiments that the present inventors repeatedly carried out, the preferred scattering range of (wiring width D)/(wiring pitch P) ratios was within ±0.2, and more desirably, within ±0.1 for both the wiring patterns and dummy patterns.

In addition, it is preferable that the pattern configurations of both the wiring patterns and dummy patterns are the same or similar, and that (dummy wiring width D)/(dummy wiring pitch P) is within ±0.2 range, or more desirably, within ±0.1 range of the mean distribution value (Maximum value+Minimum value/2) of (wiring width D)/(wiring pitch P).

Meanwhile, the present invention is not limited to the above-described embodiments. For example, instead of forming the dummy patterns for display frame on the glass substrate 1 as in the above embodiments, dummy patterns for display frame may be formed on the other glass substrate 2 opposite to the glass substrate 1.

In addition, instead of using aluminum (Al) or an aluminum alloy for forming the wiring patterns and dummy patters for display frame, other metal materials such as silver (Ag), titanium (Ti) and alloys thereof may also be used for that purpose.

Fifteenth Embodiment (Insulating Film)

Figure 35:
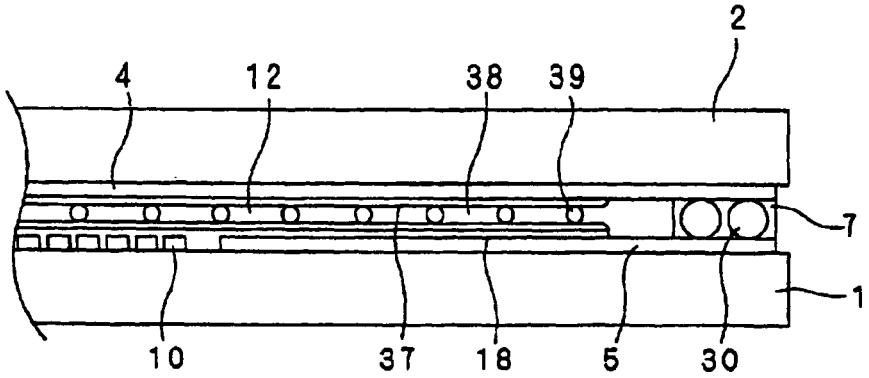
FIG. 35 is a cross-sectional view of a liquid crystal display device in which an insulating film 18 is formed so as to cover a display area and the periphery thereof.

In a liquid crystal display device, as shown in FIG. 35, it is preferable to form an insulating film 18 on the transparent segment electrode group 10 and the wiring pattern 5 on the glass substrate 1. The insulating film is formed so as to cover a display area 3 and areas around it.

Figure 36:
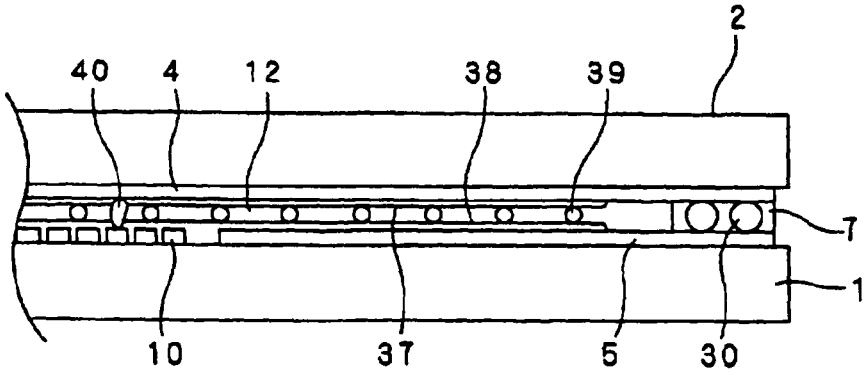
FIG. 36 is a cross-sectional view of a conventional liquid crystal device wherein the insulating film 18 is not formed.

Now, this is further discussed. FIG. 36 shows a conventional structure in which the insulating film 18 is not formed on the transparent segment electrode group 10 and wiring pattern 5. In the case of a device lacking the insulating film 18, if a foreign object 40 having conductivity is present between glass substrates 1, 2, it breaks alignment films 37, 38, and through the broken portion, short-circuit occurs between the transparent common electrode group 4 and transparent segment electrode group 10.

Contrary to this case, in the liquid crystal display device shown in FIG. 35, application of the insulating film 18 prevents such short-circuit between substrates.

However, the insulating film 18 has been formed only on the areas inside the sealing resin 7 shaped as a rectangular frame. That is, there has been no insulating film 18 formed on the regions where wiring patterns 5, 9 pass immediately below the sealing resin 7. For that reason, there has been a problem that the wiring pattern 5 and the wiring pattern 9 short-circuit through conductive particles 30 in the sealing resin 7.

A liquid crystal display device S15 according to this embodiment is provided to solve this problem.

Figures 37A, 37B:
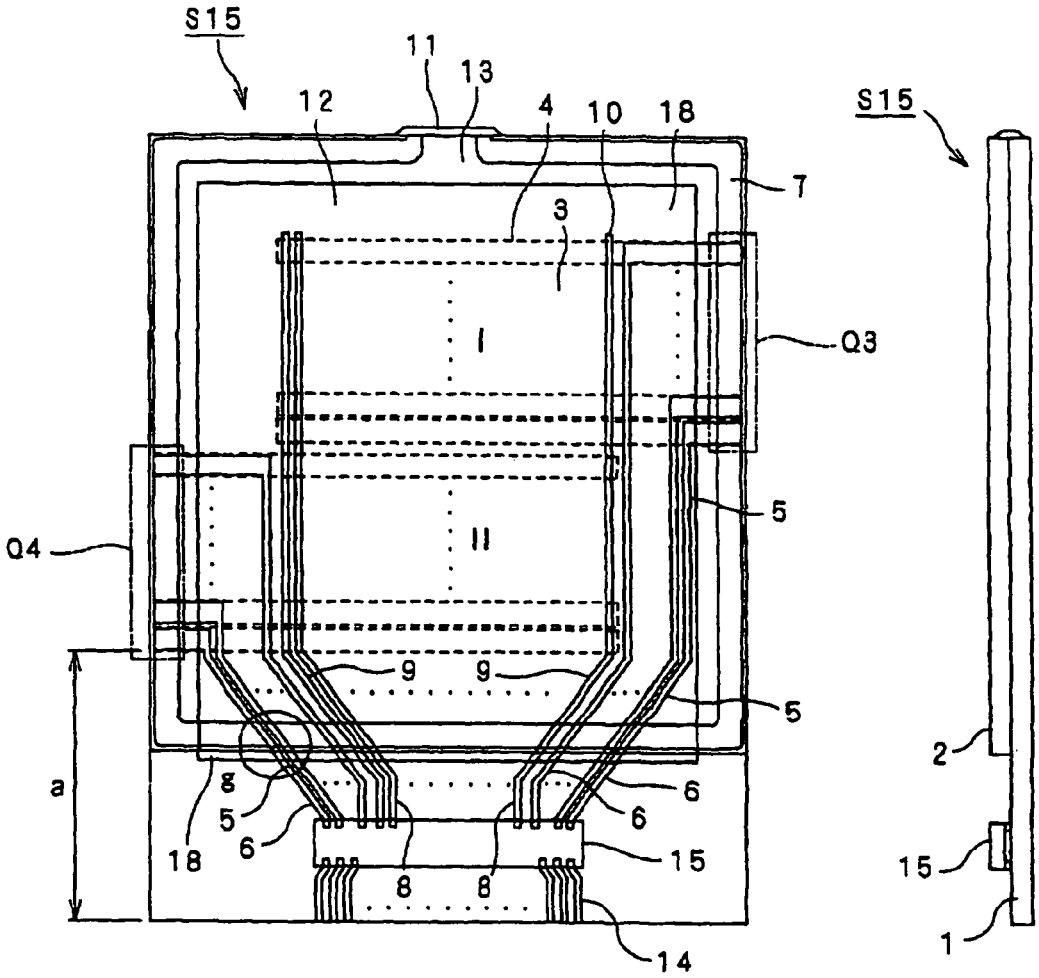
FIG. 37A is a plan view of a liquid crystal display device S15 according to this invention.
FIG. 37B is a right-side view of the same.

FIG. 37A is a plan view of the liquid crystal display device S15, and FIG. 37B is a right-side view of the same. In this liquid crystal display device S15, the configurations of the insulating film 18 and the wiring patterns 5, 9 are different from those in the liquid crystal device S3 in FIG. 5A.

Hereinafter, mainly the components that differ in structure from those of the liquid crystal display device S3 in FIG. 5A are described.

External to the display area 3, the sealing resin 7 containing conductive particles is provided so as to surround the display area 3. Glass substrates 1 and 2 are bonded together with the sealing resin 7, and the internal space between them is filled with the liquid crystal 12 by injecting it through the injection inlet 13. Then, it is sealed with the resin 11.

In the lower area of the glass substrate 1 and outside the lower side of the sealing resin 7, the common-side terminal group 6 and segment-side terminal group 8 are juxtaposed to each other. These common-side terminal group 6 and segment-side terminal group 8 are connected to the driver IC 15 by using an anisotropic conductive film or the like. The reference characters Q3, Q4 denote conduction portions between substrates.

Wiring patterns 5, 9 are arranged in the manner of oblique lines through the lower side of the sealing resin 7. These wiring patterns 5, 9 are connected to the common-side terminal group 6 and segment-side terminal group 8, respectively.

Since the wiring patterns 5, 9 passing through the sealing resin 7 are arranged obliquely to the direction in which the sealing resin 7 extends, it is possible to reduce the area for mounting the driver IC 15, thereby downsizing the liquid crystal display device itself.

The insulating film 18 is made of silicon oxide $SiO_x$, silicon nitride $SiN_x$, $TiO_x$, $ZrO_2$, $Al_2O_3$, $Ta_2O_5$, $Nb_2O_5$, $Nb_2O3$, or the like. The insulating film 18 is formed so as to cover the display area 3 and areas around it.

The insulating film 18 is extended to the lower side of the sealing resin 7 shaped as a rectangular frame.

Figure 38:
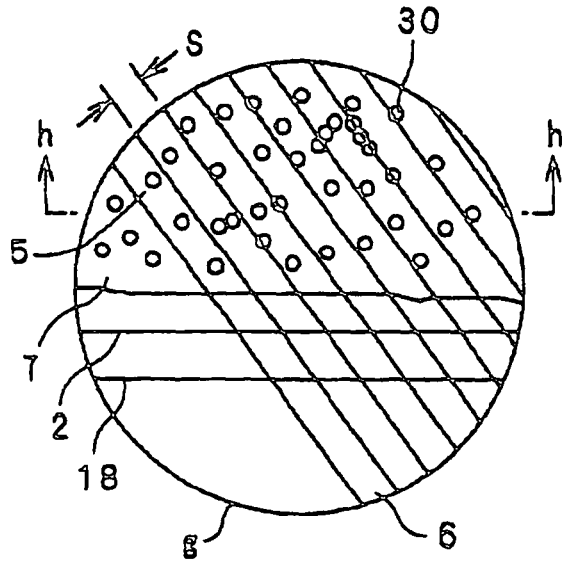
FIG. 38 is a view enlarging the part g in FIG. 37A.
Figure 39:
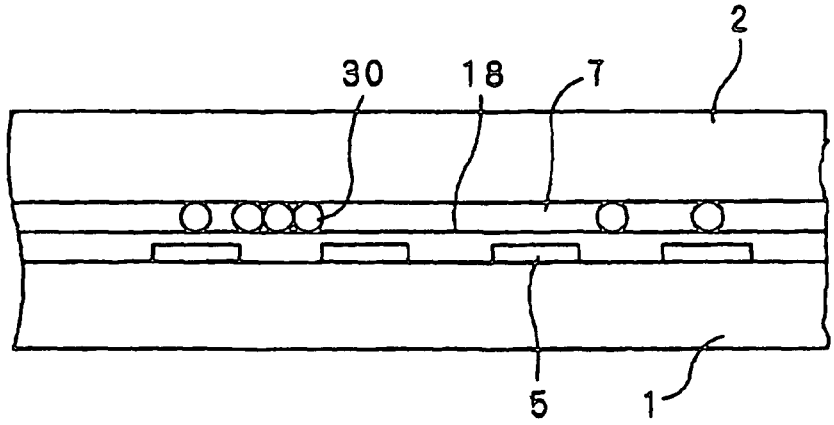
FIG. 39 is a cross-sectional view taken along the line h-h in FIG. 38.

FIG. 38 is an enlarged plan view showing the positional relationship between the wiring pattern 5, insulating film 18 and sealing resin 7, which is a view enlarging the part g in FIG. 37A. FIG. 39 is a cross-sectional view taken along the line h-h in FIG. 38.

The arrangement is such that the sealing resin 7 is provided on the wiring patterns 5, 9 via the insulating film 18.

By arranging the wiring patterns 5, 9 obliquely to the direction in which the sealing resin 7 extends, the spacing S for the wiring patterns 5, 9 is reduced.

Without the insulating film 18, the conductive particles 30 in the sealing resin 7 connect to one another, causing short-circuit to occur among the wires in the wiring pattern 5 and wiring pattern 9.

However, in this embodiment, because of the interposition of the insulating film 18, short-circuit does not occur among the wires in the wiring pattern 5 and wiring pattern 9, even when the conductive particles 30 in the sealing resin 7 connect to one another.

Figures 40A, 40B:
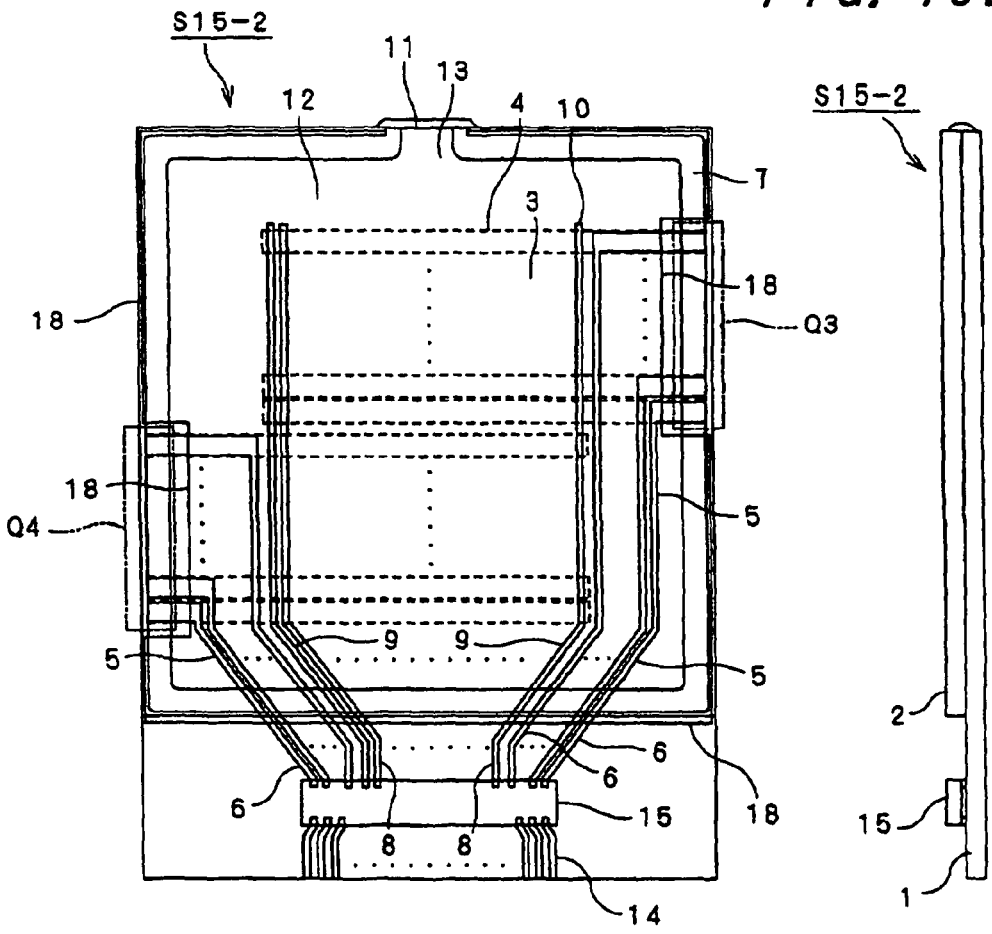
FIG. 40A is a plan view of another liquid crystal display device S15-2 according to this invention.
FIG. 40B is a right-side view of the same.

Now, another liquid crystal display device according to this invention, S15-2 shown in FIGS. 40A, 40B is described.

In the liquid crystal display device S15 in FIG. 37, the insulating film 18 is extended to the sealing resin 7 in the lower side. In such a case, the sealing resin 7 shaped as a rectangular frame has portions in which the insulating film 18 is provided and portions in which the insulating film 18 is not provided. This causes the thickness to be uneven over the whole sealing resin 7, sometimes failing to give the layer of liquid crystal 12 a uniform thickness.

Therefore, in order to improve such a problem, the insulating film 18 in the liquid crystal display device S15-2 is extended to the four sides of the sealing resin 7, except for the areas beneath the conduction portions between substrates Q3, Q4.

The most part of the sealing resin 7 is thus provided with the insulating film 18, which makes unevenness in thickness small or nil over the whole sealing resin 7. As a result, a uniform thickness of the liquid crystal 12 can be obtained.

Sixteenth Embodiment (Light-Reflective Electrode)

According to this embodiment, a segment electrode group 10 is formed by using a light reflective material, thereby producing a reflective-type or transflective-type liquid crystal display device S16.

The transparent segment electrode group 10 has a structure in which a transparent conductive film made of ITO or the like and a light reflective layer made of a light reflective material are laminated together.

As the light reflective material, there are such metals as aluminum (Al), aluminum alloys, silver (Ag), and silver alloys.

When aluminum (Al) is used as the light reflective material, the structure is preferably a laminated ITO/Cr/Al structure so as to enhance the adhesion with ITO. In this case, the Cr/Al laminated layer serves as the metal light reflective film.

A reflective-type and transflective-type liquid crystal display devices S16 having segment electrode group 10 with the laminated structure above are hereinafter discussed by the descriptions (a) and (b) below.

(a) Reflective-Type Liquid Crystal Display Device

In the case of a reflective-type liquid crystal display device, the entire segment electrode group 10 is arranged to have the ITO/Cr/Al laminated structure so that the segment electrode group 10 serves as reflecting electrode, thereby realizing a reflective-type liquid crystal display device.

In order to make this device completely reflective, the Al film is formed with a thickness of 800 Å or more, or more desirably, 1000 Å or more.

The Cr layer is formed to enhance the adhesion between ITO and Al films, and the thickness of such a Cr layer may be 300-500 Å. Alternatively, a Cr layer may be formed in order to enhance the adhesion with $SiO_2$ on the glass substrate.

(b) Transflective-Type Liquid Crystal Display Device

In the case of a transflective-type liquid crystal display device, the segment electrode group 10 is formed such that it is divided at every pixel into a reflecting area (reflecting electrode) with the ITO/Cr/Al laminated structure, and a transparent area (transparent electrode) with a single ITO structure, in which the Cr/Al portion within each pixel is removed. The segment electrode group 10 is thus formed with reflecting areas and transparent areas, thereby realizing a transflective-type liquid crystal display device.

Figure 41A:
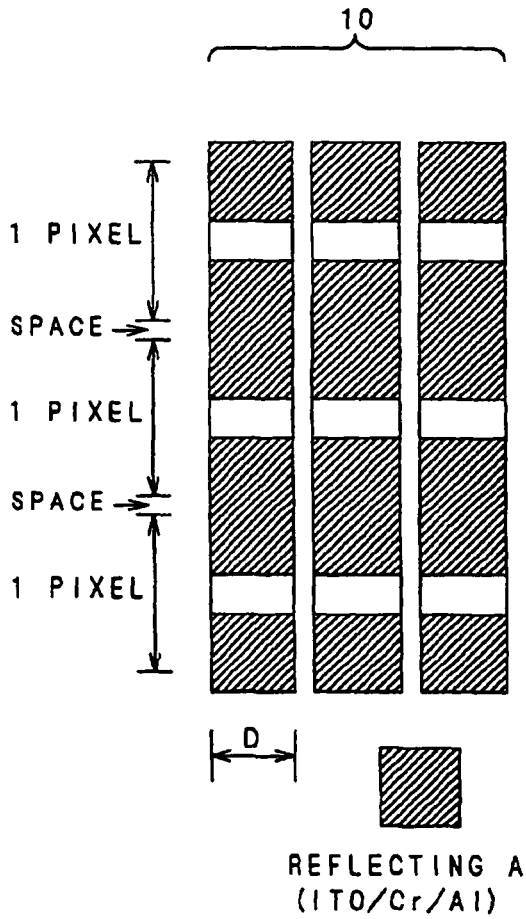
FIGS. 41A, 41B are plan views showing examples of the arrangement of reflecting area and transparent area of segment electrode 10 within one pixel.
Figure 41B:
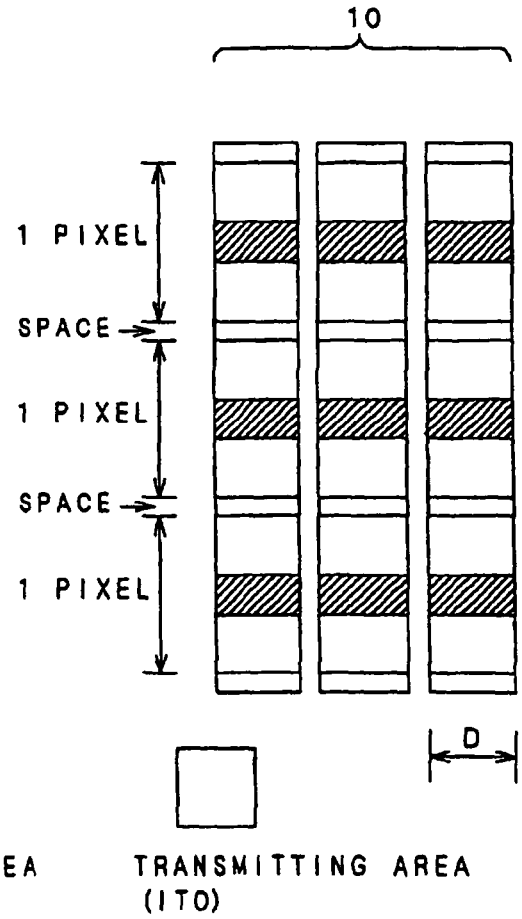

Meanwhile, the ratio between the area of the reflective area and that of the transparent area within one pixel may be selected according to the desired characteristics in terms of reflectivity and transparency. Examples of the arrangement of the reflecting area and transparent area within one pixel are shown in FIGS. 41A, 41B. FIG. 41A shows an example with the reflecting area larger than the transparent area, and FIG. 41B shows an example with the transparent area larger than the reflecting area. The borderlines between the reflecting area and the transparent area are arranged in a direction horizontally crossing the segment electrode.

Figure 42A:
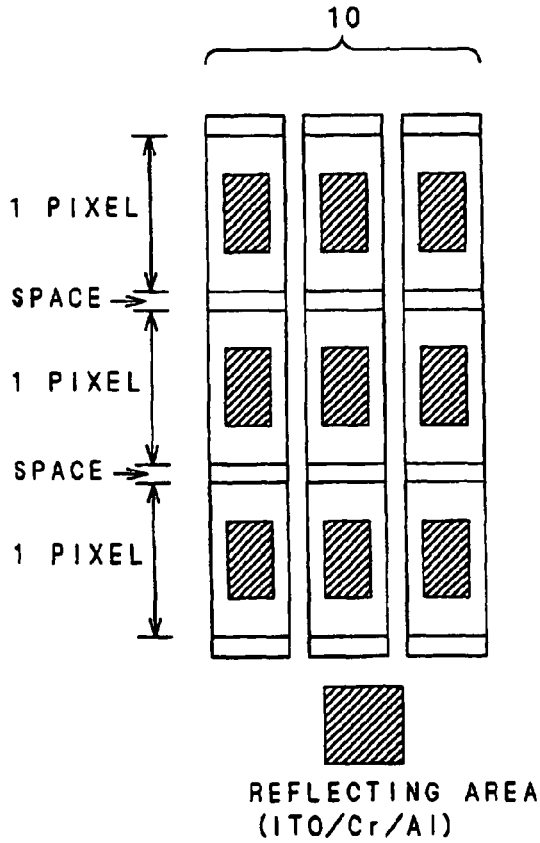
FIGS. 42A, 42B show other examples of the arrangement of reflecting area and transparent area of segment electrode 10 within one pixel.
Figure 42B:
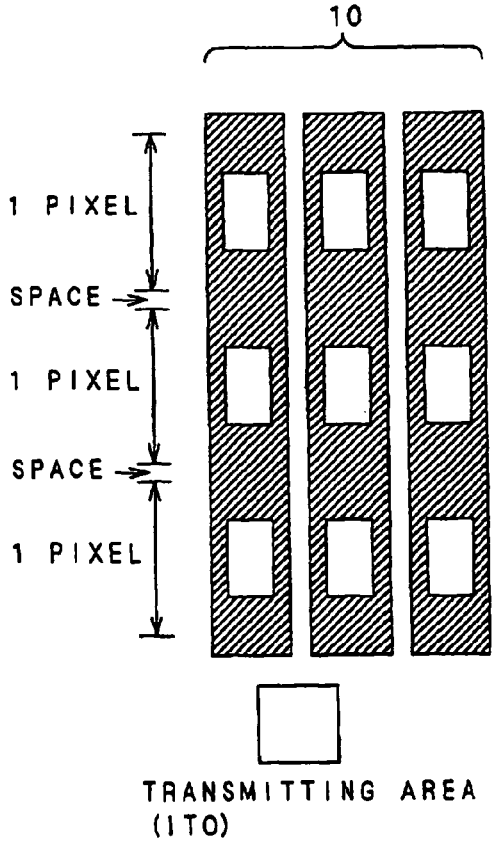

FIGS. 42A, 42B show other examples of the arrangement of the reflecting area and the transparent area within one pixel. In FIG. 42A, a rectangularly shaped reflecting area is formed inside the transparent area. In FIG. 42B, a rectangularly shaped transparent area is formed inside the reflecting area.

Figure 43A:
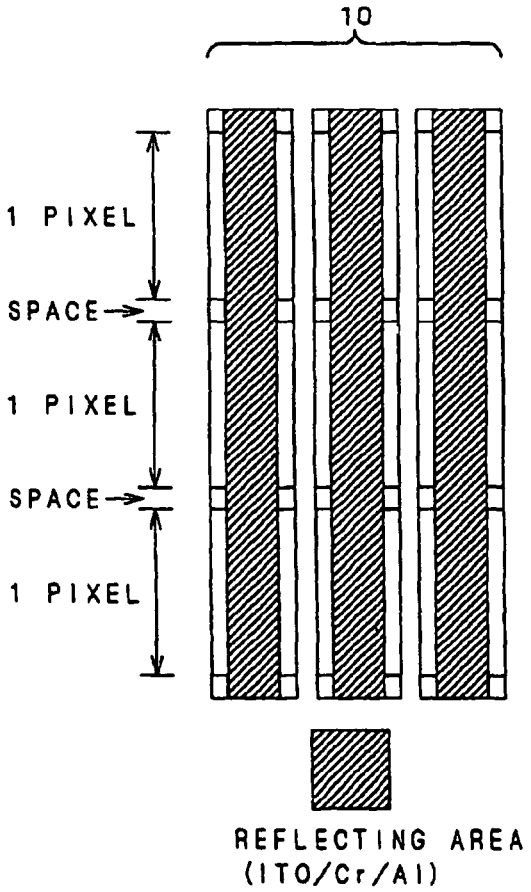
FIGS. 43A, 43B show still other examples of the arrangement of reflecting area and transparent area of segment electrode 10 within one pixel.
Figure 43B:
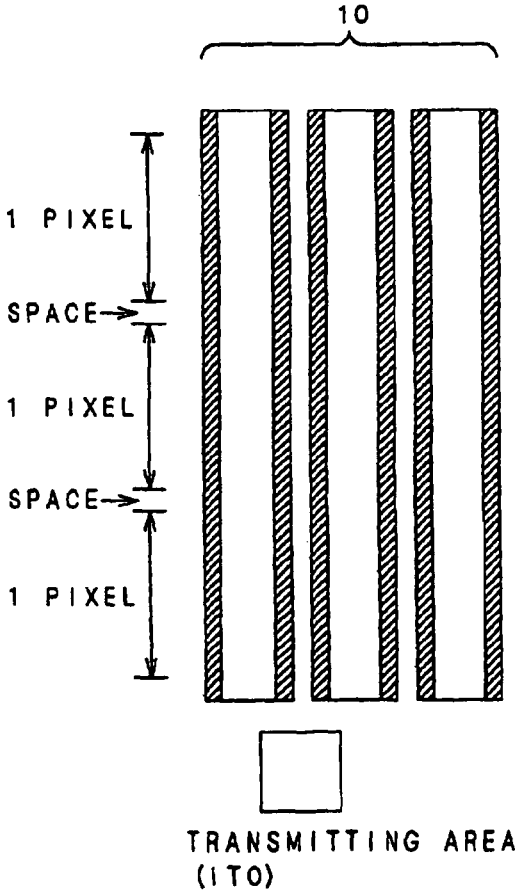

FIGS. 43A, 43B show other examples of the arrangement of the reflecting area and transparent area within one pixel. FIG. 43A shows an example with the reflecting area larger than the transparent area, while FIG. 43B shows an example with the transparent area larger than the reflecting area. The borderlines between the reflecting area and transparent area are arranged in a direction vertically crossing the segment electrode.

Meanwhile, the arrangement of the reflecting area and transparent area is not limited to the arrangements in the above-discussed examples.

The production process for the liquid crystal display device S16 in (a) and (b) above is as follows. A case where Cr and Al are used as the metal material is described here, but it is not limited to those metals.

(Process 1) ITO is formed on the whole surface of a glass substrate. Through the processes of resist application, exposure, and etching, transparent electrodes with a predetermined pattern is formed on a display area 3.

(Process 2) Over the entire pattern, Cr, Al films are formed. For thicknesses of these films, the aforementioned thicknesses are adopted.

(Process 3) The applied Cr, Al films are formed into predetermined patterns by etching. At this stage, wiring patterns 5, 9 are formed in a Cr/Al two-layer structure.

In the segment electrode group 10, areas having an ITO/Cr/Al three-layer structure and areas having a single ITO layer structure are formed. The areas having a single ITO layer can be formed by removing Al and Cr by etching.

Through the manufacturing processes described so far, a structure in which the wiring patterns are formed of metal layers and the segment electrode group in the display area is formed of ITO and metal layers is realized.

According to this production process, when the metal layers are formed into the wiring patterns, the segment electrode group in the display area can be formed simultaneously. Therefore, it does not cause the manufacturing processes to increase.

Seventeenth Embodiment (Transflective Type Liquid Crystal Display Device

Figure 44:
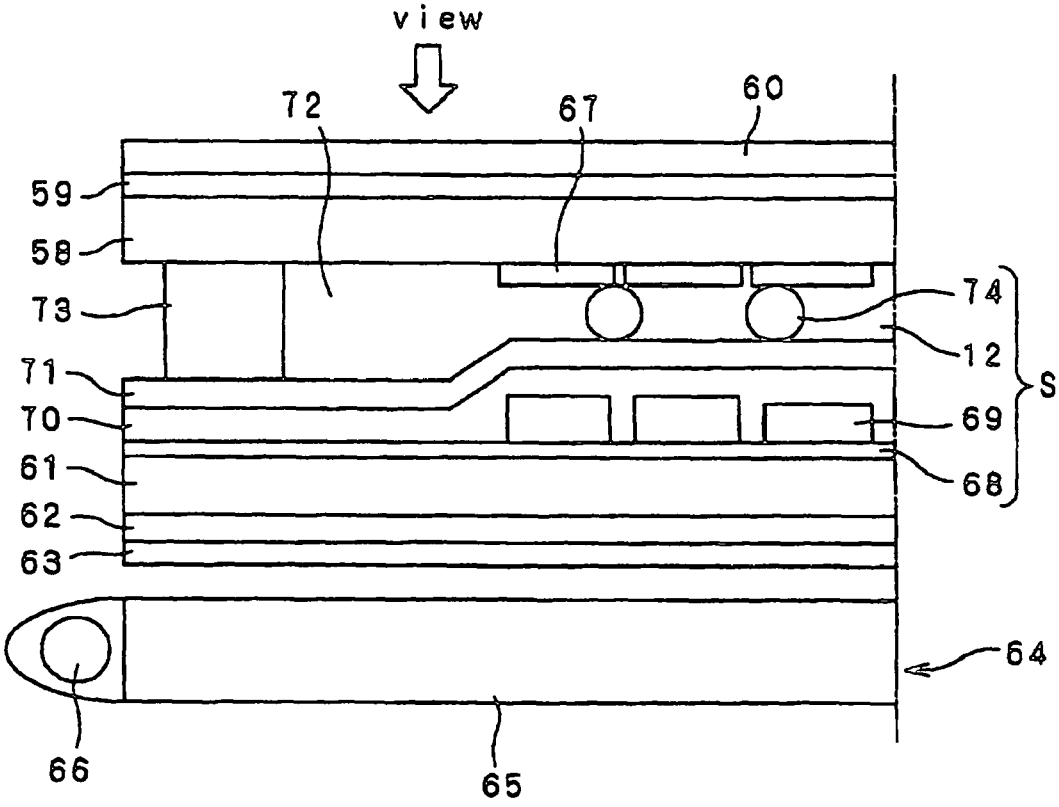
FIG. 44 is a cross-sectional view showing an example of display equipment with a transflective liquid crystal display device S according to this invention provided therein.

An example in which a transflective type liquid crystal display device S of this invention is incorporated in display equipment is now described referring to FIG. 44.

A retardation film 59 made of polycarbonate or the like and a polarizing film 60 made of iodine-based material are successively stacked on the outer surface of a transparent substrate 58 made of glass or the like, and are attached thereto with an adhesive composed of acryl-based material. A retardation film 62 made of polycarbonate or the like and a polarizing film 63 made of iodine-based material are successively stacked on the outer surface of a transparent substrate 61 made of glass or the like, and are bonded together with an adhesive composed of an acryl-based material.

Furthermore, a backlight 64 is provided under the polarizing film 63. The backlight 64 comprises a light-guiding plate 65, and a light source 66 such as cold cathode fluorescent tube or LED provided at one end portion of the light-guiding plate 65. Light from the light source 66 is introduced in the light-guiding plate 65 where it is diffused to be directed to the liquid crystal panel.

Segment electrodes 67 and an alignment film (not shown) made of polyimide that has been rubbed in one direction are successively formed on the inner surface of the transparent substrate 58. Incidentally, it is also possible to interpose an insulating film made of $SiO_2$ or the like between the segment electrodes 67 and the alignment film.

On the upper surface of the transparent substrate 61, a transflective film 68 is formed, on which a color filter 69 is provided. It is also possible to form a thin film made of metal such as aluminum or chromium, or a black matrix, which is a light-shielding film formed by using a photoresist.

It is possible to form a light-shielding film J simultaneously with the formation of the light-shielding film made of a thin metal film or photoresist. Since this light-shielding film can be formed by sputtering, vacuum deposition, or a photolithography method after resist application simultaneously with the formation of the color filter, no additional manufacturing process is necessary. The manufacturing cost can therefore be reduced.

An overcoat layer 70 formed of $SiO_2$ or resin is applied over the color filter 69, on which, common electrodes 71 and an alignment film made of polyimide (not shown) that has been rubbed in one direction are successively formed. The common electrodes 71 are arranged perpendicular to the segment electrodes 67. It is also possible to interpose an insulating layer formed of $SiO_2$ or the like between the common electrodes 71 and the alignment film.

The transflective film 68 may be a thin film made of a metal such as aluminum, chromium, a SUS alloy, an aluminum alloy, a silver alloy, or the like.

The transflective film 68 has both reflectivity and transparency and prevents phase difference from occurring when interposed between the two polarizing films. The surface of the transflective film 68 may have specularity or smoothness, or diffusivity or irregularity. In order to form a diffusive transflective film 68, an irregular film is formed using resin and a transflective film is formed thereon.

The color filter 69 above is formed such that a photoresist that has been preliminarily prepared with pigments (red, green, blue) dispersed therein is applied to the substrate, and then photolithography is performed.

The transparent substrates 58, 61 that have been prepared in the above manner are bonded together by sealing resin 73 with liquid crystal 12 made of, for example, a chiral nematic liquid crystal that has been twisted 200-270 degrees of angle interposed therebetween. Furthermore, between the both transparent substrates 58, 61, a large number of spacers 74 for keeping the thickness of the liquid crystal 12 uniform are provided.

The liquid crystal display device S provided with the transflective film 68 in the above manner may be used in either a reflective-type mode or transparent-type mode.

When it is used in a reflective-type mode, irradiating light from an external light source such as the sun or a fluorescent lamp passes through the polarizing film 60, retardation film 59, and liquid crystal 12 sequentially, while the light incident on the inside of the liquid crystal 12 penetrates the color filter 69 to reach the transflective film 68. Then, the light is reflected from the transflective film 68, again passes through the liquid crystal 12, retardation film 59, and polarizing film 60 to be emitted.

On the other hand, when it is used in a transparent-type mode, irradiating light from the backlight 64 passes through the polarizing film 63, retardation film 62, and the transparent substrate 61 sequentially, then it passes through the transflective film 68, penetrates the color filter 69, and passes through the liquid crystal 12, retardation film 59, and polarizing film 60 to be emitted.

Because of the transflective film 68 formed on the transparent substrate 61, the reflectance is enhanced especially in the reflective mode, providing the display with higher brightness. High contrast can be obtained in the transparent mode. Therefore, the display quality can be enhanced as high as a degree that satisfies the functions of both the reflective mode and transparent mode. The panel used in the reflective mode can be used in the transparent mode as well with the conditions being unchanged. The color display is clear and stable in both the reflective mode and transparent mode.

In addition, when the transflective film 68 is formed on the inner surface of the transparent substrate 61, light does not pass through the transparent substrate 61 in the reflective mode. Because of this, the phenomenon of double image appearance caused by the transparent substrate 61 does not occur. Moreover, since the incident light and reflected light both pass through the same pixels, deterioration in brightness and color purity is prevented.

As the thickness of the transflective film 68 increases, the light transmittance becomes smaller and the light reflectivity becomes larger. The thickness of the transflective film 68 is determined based upon the difference in light absorption coefficient among metals and the mode that is selected between the reflective mode and transparent mode for improvement of performance.

Normally, the thickness of the transflective film 68 is 50-500 Å, and preferably, it is 100-400 Å, which gives the characteristics of a transflective-type: a reflectance of 30-70% and a transmittance of 5-50%.

For example, when the transflective film 68 is formed of an aluminum thin film with a thickness of 250 Å, the reflectance is 65% and the transmittance is 15%.

When the liquid crystal display device S has a transflective film 68 with specularity, a light-diffusive sheet member may be further formed between the transparent substrate 58 and retardation film 59 in the liquid crystal panel.

One example of this light-diffusing sheet member is IDS (Internal Diffusing Sheet) produced by DAI NIPPON PRINTING CO., LTD. This sheet is made of resin in which beads and the like are contained. Alternatively, a flat sheet whose surface is formed with irregularity that scatters light may be used.

By providing such a light-diffusing sheet between the transparent substrate 58 and retardation film 59, in a reflective mode, light reflected by the transflective film 68 is scattered in directions other than the specular reflection direction by the light-diffusing sheet. This widens the viewing angle on the display, enlarging the viewable area thereof.

Meanwhile, the liquid crystal display device S above is realized as a transflective-type liquid crystal display device by providing the transflective film 68 therein. However, alternatively, it is also possible to provide a reflective film made of a metal such as aluminum, silver, an aluminum alloy or silver alloy so as to make the liquid crystal display device a reflective type.

The liquid crystal display device S above may be arranged such that the segment electrode 67 is formed of ITO and metal layers (See FIGS. 41-43). For the metal layer, a metal material with good conductivity such as aluminum, an aluminum alloy, silver (Ag) or a silver alloy may be used. An Al—Cr alloy may be used as the aluminum alloy. The thickness of the Al metal layer in the reflective area may be selected between 800 Å and 1500 Å, taking the uniformity of the gap between the substrates into consideration.

By employing metal films for forming both the segment electrode group (ITO/Cr/Al) and wiring patterns, the manufacturing cost can be reduced.

Eighteenth Embodiment (Portable Terminal)

Figure 45:
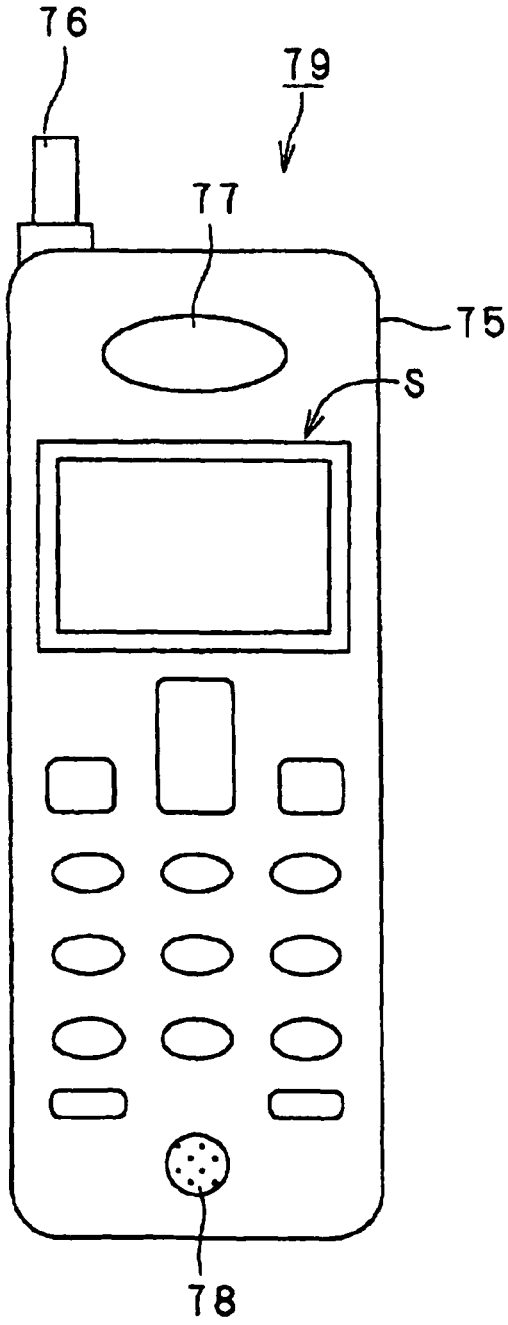
FIG. 45 is an elevational view showing a mobile phone provided with a liquid crystal display device S according to this invention.

A mobile phone 79 provided with the liquid crystal display device S according to this invention is shown in FIG. 45.

In this mobile phone 79, the liquid crystal display device S is provided within a small size case 75. An antenna 76 for transmission/reception is provided at an upper part of the case 75. In addition, a receiver 77 and a microphone 78 are provided on the front surface.

Figure 46:
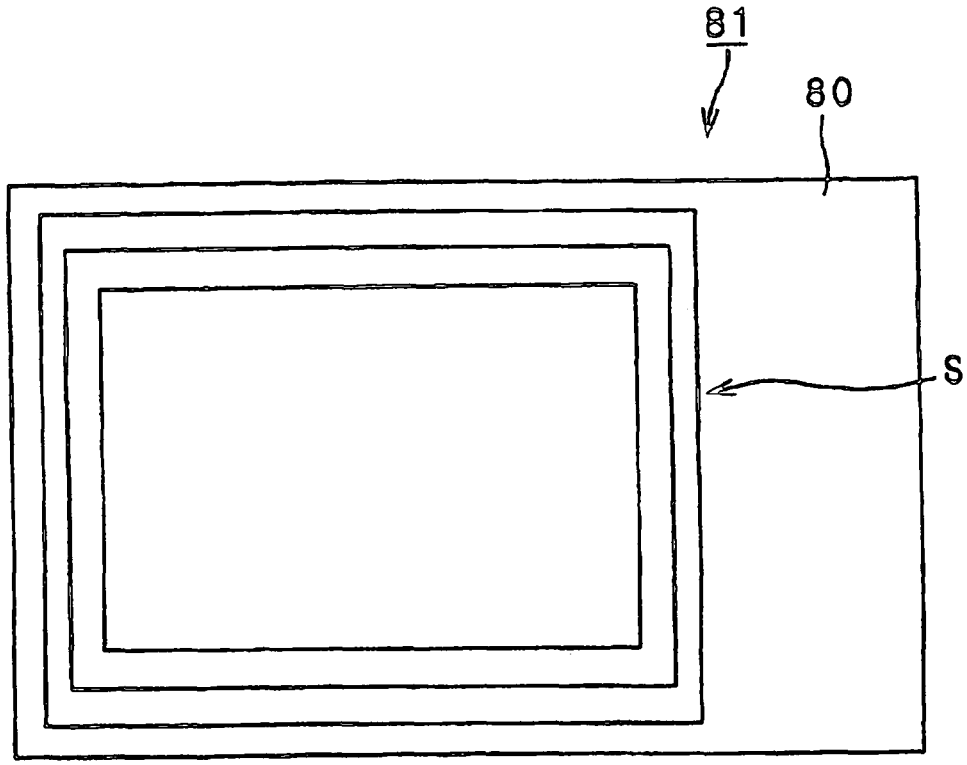
FIG. 46 is an elevational view showing a portable terminal in which a liquid crystal display device S according to this invention is provided in a small size case.
Figure 47C:
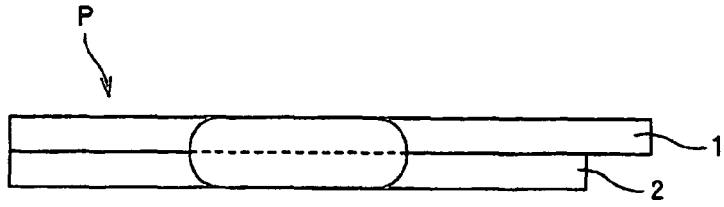
FIG. 47C is an upper-side view of the same.
Figure 47A:
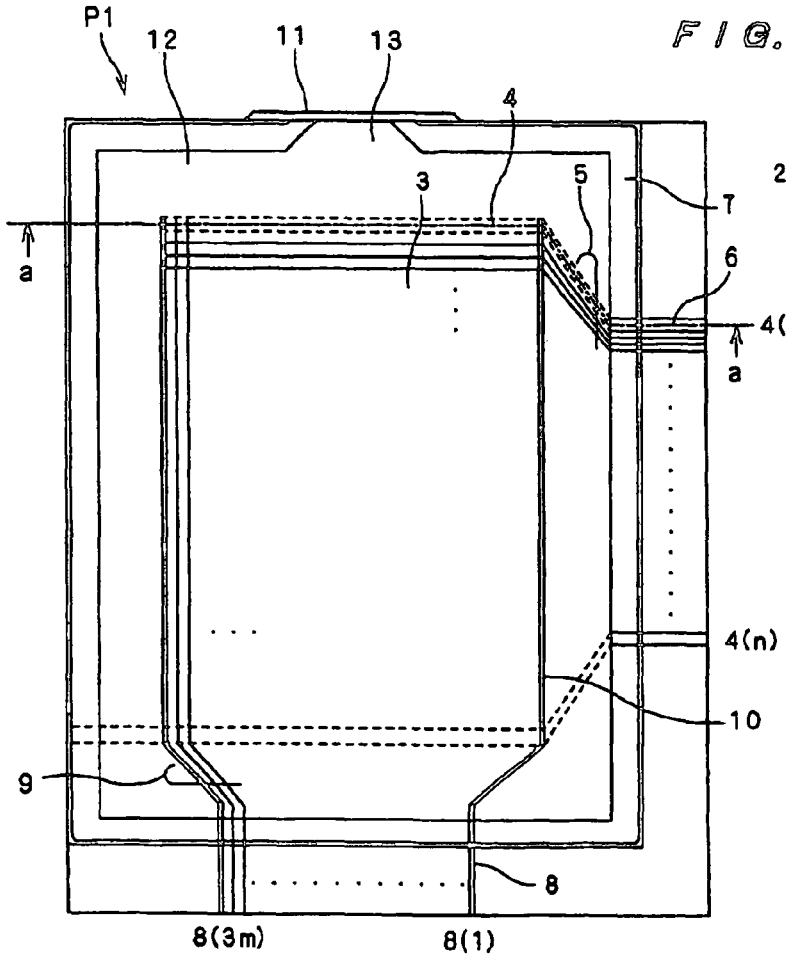
FIG. 47A is a plan view of a conventional liquid crystal display device P1 and FIG. 47B is a right-side view of the same.
Figure 47B:
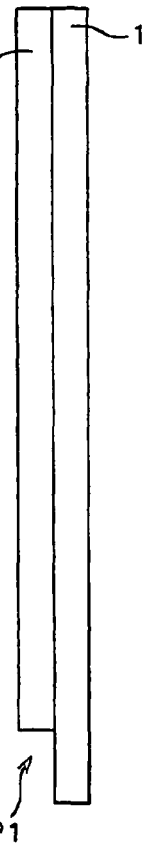
Figure 48:
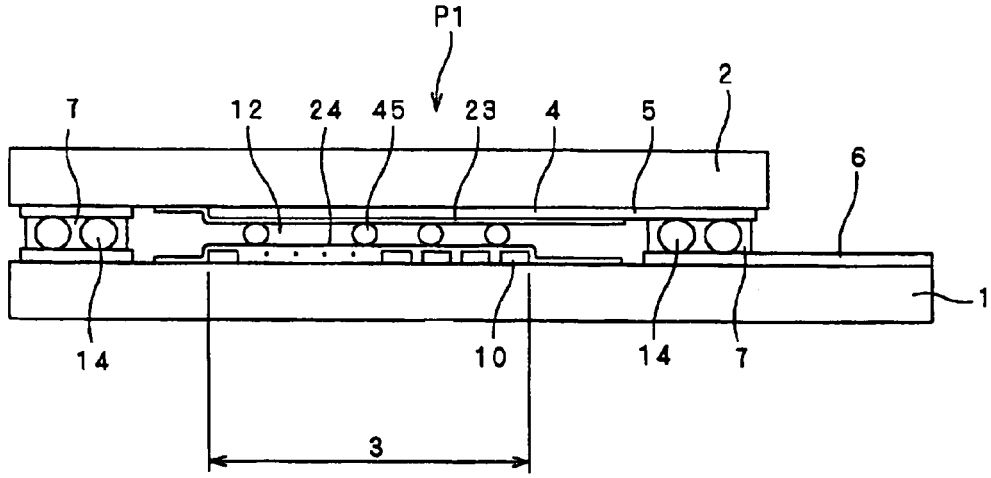
FIG. 48 is a cross-sectional view taken along the line a-a in FIG. 47A.

A portable terminal 81 in which the liquid crystal display device S is provided within a small size case 80 is shown in FIG. 46. This portable terminal 81 is used for various purposes other than mobile phone 79. The applications are, for example, watches, calculators, game machines, pedometers, GPS, POS, handy terminals, industrial instruments and so on, but not limited to these examples.

By using the downsized liquid crystal display device S in these mobile phone 79 and portable terminal 81, the devices can be downsized as a whole.

The present invention is not limited to the embodiments discussed above, but various modifications and improvements may be made without departing from the scope of the invention. For instance, a STN passive matrix-type color liquid crystal display device has been used in the aforementioned embodiments, like functions and effects can be obtained when it is a bistable nematic passive matrix-type liquid crystal display device, a STN passive matrix-type monochrome liquid crystal display device, or a TN passive matrix-type liquid crystal display device.

Also, a portable terminal has been taken as an embodiment of the device provided with the liquid crystal display device according to this invention, the liquid crystal display device S may be used as the display device for other display equipment. For example, it may be used as a display panel in devices such as sewing machines, stereos, musical instruments, videos, ATMs, duplicators, facsimiles, and for display equipment in stations, restaurants and factories.

What is claimed is:

1. A liquid crystal display device comprising:

a first substrate having a segment electrode group and an alignment film formed thereon;

a second substrate having a common electrode group and an alignment film formed thereon;

a frame-shaped seal member for joining the fist and second substrates together;

a liquid crystal layer filled between the first and second substrates and inside the seal member;

a display area provided in an area where the segment electrode group and the common electrode group are opposed to each other;

a connection terminal group for segment electrode and a connection terminal group for common electrode which are formed on the first substrate and external to one side portion of the seal member;

a wiring pattern formed on the first substrate such that it extends from the connection terminal group for common electrode and passes through an area between another side portion of the seal member and the display area; and a conduction portion between substrates which is disposed within another side portion of the seal member [or between another side portion of the seal member and the display area] for electrically connecting the wiring pattern and the common electrode group to each other.

2. The liquid crystal display device according to claim 1, wherein a light-shielding film is formed on the second substrate such that it is opposed to the wiring pattern.

3. The liquid crystal display device according to claim 1, wherein each of the segment electrode group and the wiring pattern is formed of a metal film.

4. The liquid crystal display device according to claim 3, wherein a light-shielding film is formed on the second substrate such that it is opposed to the wiring pattern.

5. The liquid crystal display device according to claim 1, wherein a dummy pattern is formed on the second substrate such that it is disposed in a region opposite to the wiring pattern and between the seal member and the display area.

6. The liquid crystal display device according to claim 1, wherein a dummy pattern is formed on the second substrate such that it is disposed in a region opposite to the wiring pattern and within the seal member.

7. The liquid crystal display device according to claim 1, wherein a dummy pattern is formed on the first substrate such that it is disposed in a region between the seal member and the display area where the wiring pattern is not formed, and also on the second substrate such that it is opposed to said region.

8. The liquid crystal display device according to claim 1, wherein a dummy pattern is formed on the first substrate such that it is disposed in a region within the seal member where the wiring pattern is not formed, and also on the second substrate such that it is opposed to said region.

9. The liquid crystal display device according to claim 1, wherein *an end of the wiring pattern or* an end of the common electrode group is disposed within another side portion of the seal member.

[10. The liquid crystal display device according to claim 1, wherein an end of the wiring pattern is disposed within another side portion of the seal member.]

[11. The liquid crystal display device according to claim 1, wherein the wiring pattern is formed of a metal, and a dummy pattern for display frame is formed on the first substrate such that it is disposed between the seal member and the display area where the wiring pattern is not formed.]

[12. The liquid crystal display device according to claim 1, wherein the wiring pattern is formed of a metal, and a dummy pattern for display frame is formed on the second substrate such that it is disposed between the seal member and the display area where the wiring pattern is not formed.]

13. The liquid crystal display device according to claim 1, wherein the segment electrode group comprises a wiring pattern formed of a layer in which a transparent conductive film and a metal film are laminated together.

[14. The liquid crystal display device according to claim 13, wherein the wiring pattern is formed of a metal film. ]

[15. The liquid crystal display device according to claim 13, wherein a ratio between the area of the transparent conductive film and the area of the metal film is set for each pixel of the segment electrode group.]

[16. A portable terminal comprising the liquid crystal display device of claim 1 provided therein.]

[17. Display equipment comprising the liquid crystal display device of claim 1 provided therein.]

18. A liquid crystal display device comprising:

a first substrate having a segment electrode group and an alignment film formed thereon;

a second substrate having a common electrode group and an alignment film formed thereon;

a frame-shaped seal member for joining the fist and second substrates together;

a liquid crystal layer filled between the first and second substrates and inside the seal member;

a display area provided in an area where the segment electrode group and the common electrode group are opposed to each other;

a connection terminal group for segment electrode which is formed in one peripheral region on the first substrate and external to the seal member;

*a* first [and second] connection terminal [groups] *group* for common electrode which [are] *is* formed on the first substrate and external to one side portion of the seal member;

*a second connection terminal group for common electrode which is formed on a first substrate and external to one side portion of the seal member;* a first wiring pattern formed on the first substrate such that it extends from the first connection terminal group for common electrode and passes through an area between [another] *a second* side portion of the seal member and the display area;

a first conduction portion between substrates which is disposed within [another] *the second* side portion of the seal member [or between another side portion of the seal member and the display area] for electrically connecting the first wiring pattern formed on the first substrate and a part of the common electrode group formed on the second substrate to each other;

a second wiring pattern formed on the second substrate such that it extends from a residual part of the common electrode group and passes through an area between [another] *a third* side portion of the seal member and the display area; and a second conduction portion between substrates which is disposed within [one] *the third* side portion of the seal member [or between one side portion of the seal member and the display area] *which is opposed to the second side portion of the seal member* for electrically connecting the second wiring pattern and the second connection terminal group for common electrode to each other.

[19. A portable terminal comprising the liquid crystal display device of claim 18 provided therein.]

[20. Display equipment comprising the liquid crystal display device of claim 18 provided therein.]

*21. The liquid crystal display device according to claim 1, wherein each of the wiring pattern has a first and a second parallel portions which are arranged in a direction substantially parallel to the segment electrode group,*

*wherein each of the wiring pattern further includes an oblique portion connecting the first parallel portions with the second parallel portions which is arranged obliquely to the segment electrode group in an intermediate region between the display area and the seal member.*

*22. The liquid crystal display device according to claim 21, wherein each said oblique portion has an oblique angle with respect to the segment electrode group, the oblique angle being less than 90 degrees and, wherein the oblique angle becomes smaller as the oblique portions become near the another side portion of the seal member.*

*23. The liquid crystal display device according to claim 1, wherein the wiring patterns include a wider portion within another side portion of the seal member, the wider portion being wider than other portion of the wiring patterns.*

*24. The liquid crystal display device according to claim 1, further comprising a driver IC mounted on the first substrate, which is arranged in the vicinity of the seal member, for driving the display device.*

*25. The liquid crystal display device according to claim 24, further comprising an injection inlet formed in a second side portion of the seal member, the inlet injecting a liquid crystal material into an enclosure defined by the seal member, the first substrate, and the second substrate, wherein the second side portion is opposite to the one side portion.*

* * * * *